United States Patent
Nelson

(10) Patent No.: US 7,801,770 B2
(45) Date of Patent: Sep. 21, 2010

(54) COMPUTERIZED ORDERING, WAREHOUSING, INVENTORY, SALES, AND DELIVERY COMMUNICATIONS METHOD

(76) Inventor: Jack Nelson, 628-Old Hwy. 24, Trinity, AL (US) 35673

( * ) Notice: Subject to any disclaimer, the term of this patent is extended or adjusted under 35 U.S.C. 154(b) by 1211 days.

(21) Appl. No.: 11/391,174

(22) Filed: Mar. 29, 2006

(65) Prior Publication Data

US 2006/0282345 A1    Dec. 14, 2006

Related U.S. Application Data

(63) Continuation of application No. 10/066,587, filed on Feb. 6, 2002, now Pat. No. 7,024,382.

(60) Provisional application No. 60/268,045, filed on Feb. 13, 2001.

(51) Int. Cl.
*G06Q 30/00* (2006.01)
*G06F 17/30* (2006.01)

(52) U.S. Cl. .............................. 705/26; 705/27; 705/28

(58) Field of Classification Search ..................... 705/1, 705/26–27, 28
See application file for complete search history.

(56) References Cited

U.S. PATENT DOCUMENTS

| | | | |
|---|---|---|---|
| 4,509,123 A | 4/1985 | Vereen | 364/300 |
| 4,887,208 A | 12/1989 | Schneider et al. | 364/403 |
| 4,992,940 A | 2/1991 | Dworkin | 705/26 |
| 5,721,904 A | 2/1998 | Ito et al. | 707/8 |
| 5,940,807 A | 8/1999 | Purcell | 705/26 |
| 5,956,727 A | 9/1999 | Cheng et al. | 707/102 |
| 5,987,463 A | 11/1999 | Draaijer et al. | 707/10 |
| 5,995,972 A | 11/1999 | Allgeier | 707/103 R |
| 6,018,745 A | 1/2000 | Kuftedjian | 707/200 |
| 6,023,683 A | 2/2000 | Johnson et al. | 705/26 |
| 6,058,379 A | 5/2000 | Odom et al. | 705/37 |
| 6,092,053 A | 7/2000 | Boesch | 705/26 |
| 6,115,752 A | 9/2000 | Chauhan | 709/241 |
| 6,134,557 A | 10/2000 | Freeman | 707/102 |
| 6,236,997 B1 | 5/2001 | Bodamer et al. | 707/10 |
| 6,272,472 B1 | 8/2001 | Danneels et al. | 705/27 |
| 6,662,193 B1 | 12/2003 | Christensen | 707/104.1 |
| 6,975,998 B1 * | 12/2005 | Jones | 705/8 |
| 7,016,865 B1 * | 3/2006 | Weber et al. | 705/26 |
| 7,216,092 B1 * | 5/2007 | Weber et al. | 705/26 |
| 2002/0023006 A1 * | 2/2002 | Partos et al. | 705/26 |
| 2004/0243483 A1 * | 12/2004 | Baumann et al. | 705/27 |

OTHER PUBLICATIONS

"Automated lot tracking and identification system". Ulrich Rohrer. SMST Boblingen, Germany. IEEE/SEMI Advanced Semiconductor Manufacturing Conference. 1998. [Obtained from Dialog/EIC search on Mar. 1, 2010].*

* cited by examiner

*Primary Examiner*—Jeffrey A. Smith
*Assistant Examiner*—William J. Allen
(74) *Attorney, Agent, or Firm*—Richard C. Litman

(57) ABSTRACT

A unified ordering, warehousing, accounting, inventory, sales, delivery and communications system and method. Although the system and method pertain to the furniture operations and sales, the system and method can also be used by different entities in other retail and wholesale operations. The system is accessed over the Internet by the sales representatives, dealers, manufacturers and consumers by mobile sales representatives' laptops, dealers' servers, manufacturers' servers and consumers' computers. The method utilizes the system for all aspects of the furniture industry including handling raw material, organizing inventory and coordinating communications between salespeople, customers and manufacturers.

8 Claims, 70 Drawing Sheets

COMPUTERIZED ORDERING, WAREHOUSING, INVENTORY, SALES, AND DELIVERY COMMUNICATIONS METHOD

CROSS-REFERENCE TO RELATED APPLICATION

This application is a continuation of application Ser. No. 10/066,587 filed Feb. 6, 2002, now U.S. Pat. No. 7,024,382, which claims the benefit of U.S. Provisional Patent Application Ser. No. 60/268,045, filed Feb. 13, 2001.

BACKGROUND OF THE INVENTION

1. Field of the Invention

The present invention relates to a unified ordering, accounting, warehousing, inventory, sales, delivery and communications system and method. Although the system and method pertain to furniture operations and sales, the system and method can also be used by different entities in other retail and wholesale operations.

2. Description of Related Art

Computerized methods of doing business have been prevalent over the last twenty-five years, and have allowed a very broad range of business and customer users to work and operate more efficiently. These users will include manufacturers, purchasing agents, inventory control staff, sales representatives, retailers and wholesalers. This broad range of users using computerized methods of doing business are also reflected in the related art.

U.S. Pat. No. 4,509,123 issued to Vereen outlines the use of an automated tracking process for items of manufacture and inventory, in which each item and each grouping or location of items is labeled with a unique nonvolatile machine-readable code identifying a corresponding data record maintained in a programmable digital computer. A plurality of label reading devices are utilized to report the passage or association of items to the computer, either directly in realtime or via delayed batch entry from offline storage.

U.S. Pat. No. 4,887,208 issued to Schneider et al. outlines the use of an inventory control system, and more particularly relates to such a system for controlling sales activity and inventory of special order items between a plurality of remote locations and a central location. The system is adapted to provide instant communications between retail establishments and a manufacturer, and enables the order to be confirmed at the time of purchase.

U.S. Pat. No. 5,740,425 issued to Povilus outlines a data structure and method for creating, maintaining and publishing multiple renditions of both electronic and printed, single and multiple manufacturer catalogs using a single product database. The product database includes a listing of SKUs, with each SKU corresponding to a product or a component of a product and specific product information.

U.S. Pat. No. 5,940,807 issued to Purcell outlines a system and method for matching buyers and sellers of products and services. Specifically, the system and method pertains to automated and computerized methods and systems for creating a depository for sellers to indicate inventory availability and a source for buyers to access to review those seller's inventories for purchase purposes.

U.S. Pat. No. 6,023,683 issued to Johnson et al. outlines an electronic sourcing system and method for interfacing product information found in vendor catalogs that are provided to customers and requisition and purchasing systems and methods that may use the results of product information searches.

U.S. Pat. No. 6,134,557 issued to Freeman outlines a computer program which displays a number of objects in a categorization table for ordering materials and supplies. The ordering program displays a categorization table that organizes data under successive and expandable levels of categorized headings, assigns the appropriate vendor specific names, SKU codes, part numbers, universal product codes and bar codes and then transfers this information to a merchant or vendor for processing an order.

Although each of these business systems and methods are useful in a specific application (For example, inventory control, sales, purchasing, manufacturing, etc.), what is really needed is an overall business system and method that allows for the efficient management of the relationship between retail, wholesale and manufacturing businesses.

None of the above inventions and patents, taken either singly or in combination, is seen to describe the instant invention as claimed.

SUMMARY OF THE INVENTION

The present invention is a unified ordering, warehousing, inventory, sales, delivery and communications system and method. Although the system and method pertain to furniture operations and sales, the system and method can also be used by different entities in other retail and wholesale operations. The system is accessed over the Internet by the sales representatives, dealers, manufacturers and consumers by mobile sales representatives' laptops, dealers' servers, manufacturers' servers and consumers' computers. The method utilizes the system for all aspects of the furniture industry including handling raw material, organizing inventory and coordinating communications between salespeople, customers and manufacturers.

Accordingly, it is a principal object of the invention to provide comprehensive tracking and coordination of raw materials, inventory and sales information from one central source.

It is another object of the invention to enable a sales employee to provide detailed information on any raw materials, inventory or products for sale.

It is a further object of the invention to locate and display desired products over the Internet.

Still another object of the invention is to create a bill of materials for subassemblies, giving each subassembly a SKU number and to combine subassemblies to create one assembly, with each assembly being given a unique SKU number for each finished product.

It is another object of the invention to provide an operations system and method that will reduce human errors, as well as increase an operation's efficiency and profitability.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
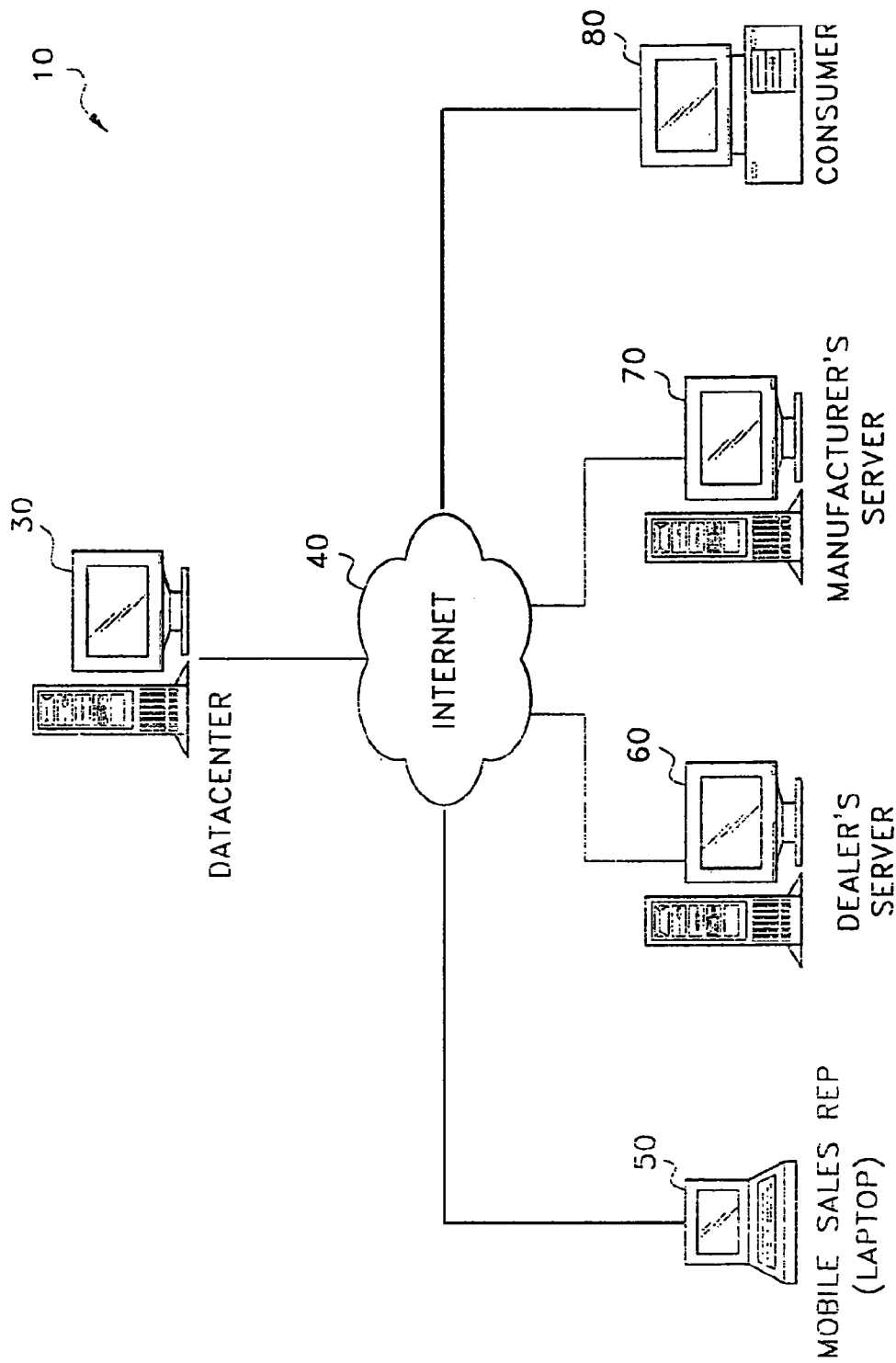
FIG. 1 is an overview of a system and method for managing furniture industry operations according to the present invention.

The present invention is a computerized ordering, warehousing, accounting, inventory, sales, delivery and communications system 10 and method 20 used by different entities, such as sales representatives, dealers, manufacturers and consumers in the furniture industry. The system 10 and method 20 can also be used in most any retail and wholesale industry. An overall configuration of the system 10 is depicted in FIG. 1. Components of the system 10 include a datacenter 30 that is accessed over the Internet 40 by sales representatives, dealers, manufacturers and consumers by mobile sales representatives' laptops 50, dealers' servers 60, manufacturers' servers 70 and consumers' computers 80. Users of the system 10 and method 20 can be any one of these different entities at various times during the overall method 20 to access and manipulate important retail and wholesale information that is contained in this system 10 and used as part of the overall method 20. Users can also use laptops, personal digital devices (PDAs) and hand held computerized devices interchangeably with the system 10 and method 20 as well.

Figure 2:
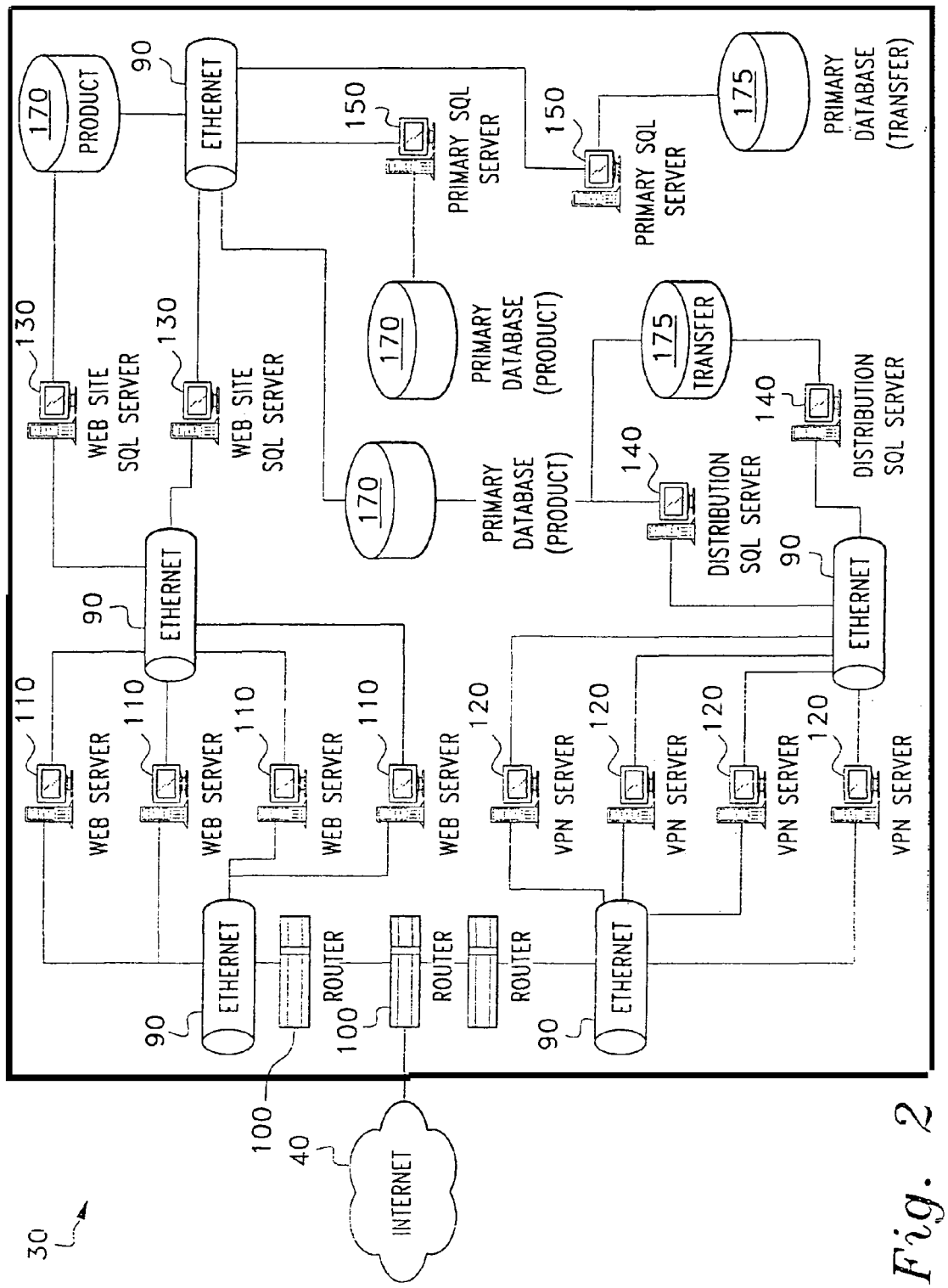
FIG. 2 is a system configuration of a datacenter according to the present invention.
Figure 3A:
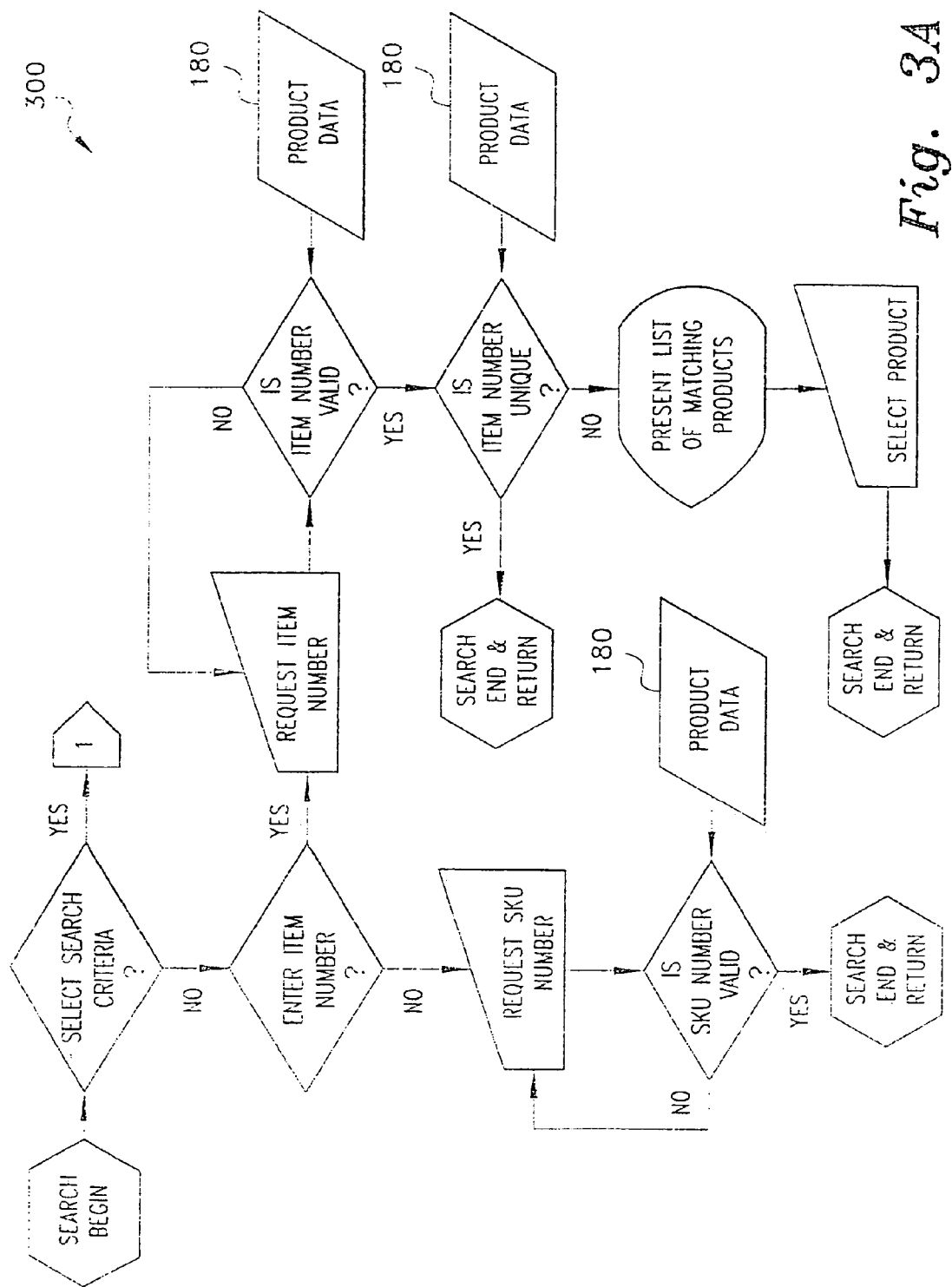
FIGS. 3A-3E are one flowchart outlining a search function according to the present invention.
Figure 3B:
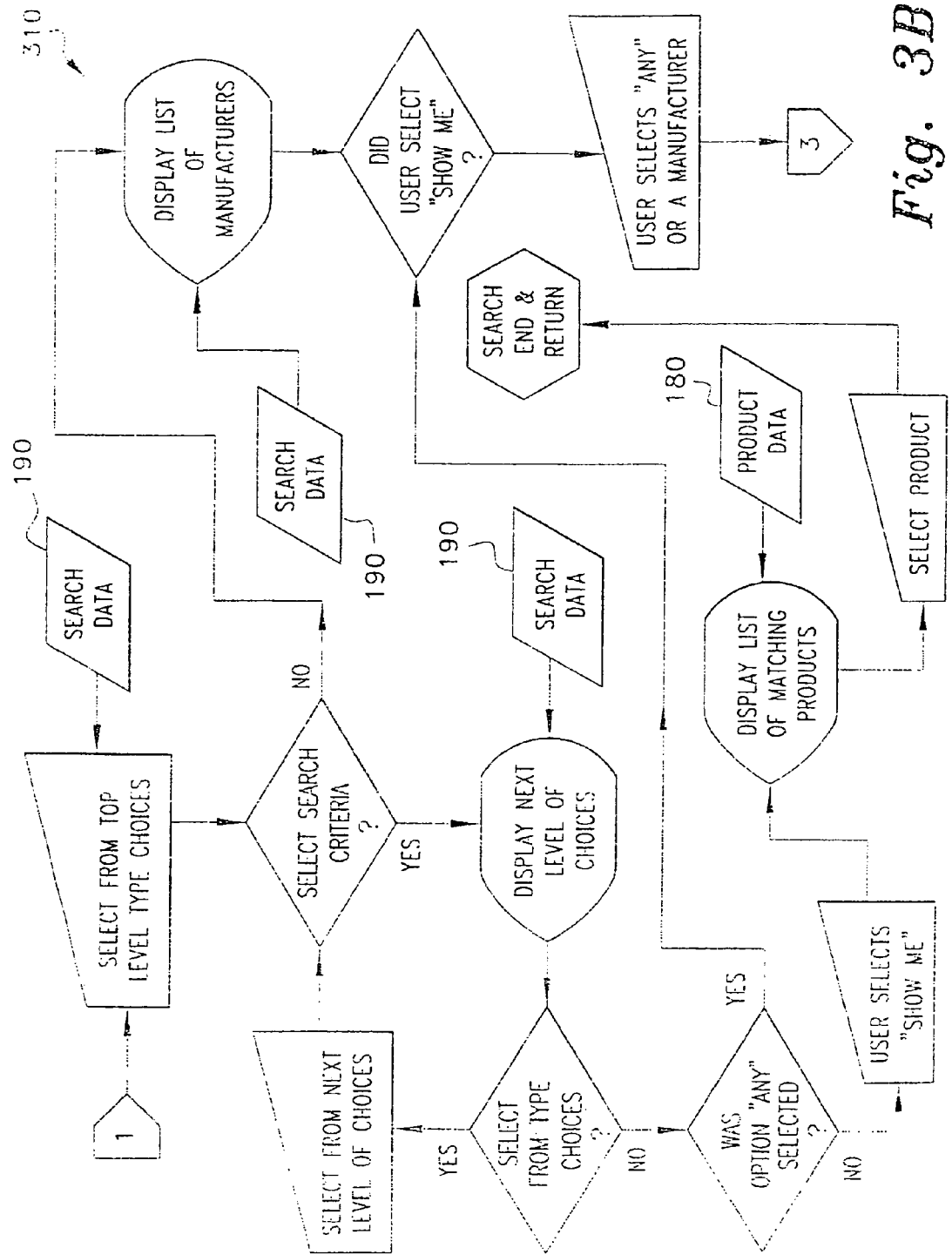
Figure 3C:
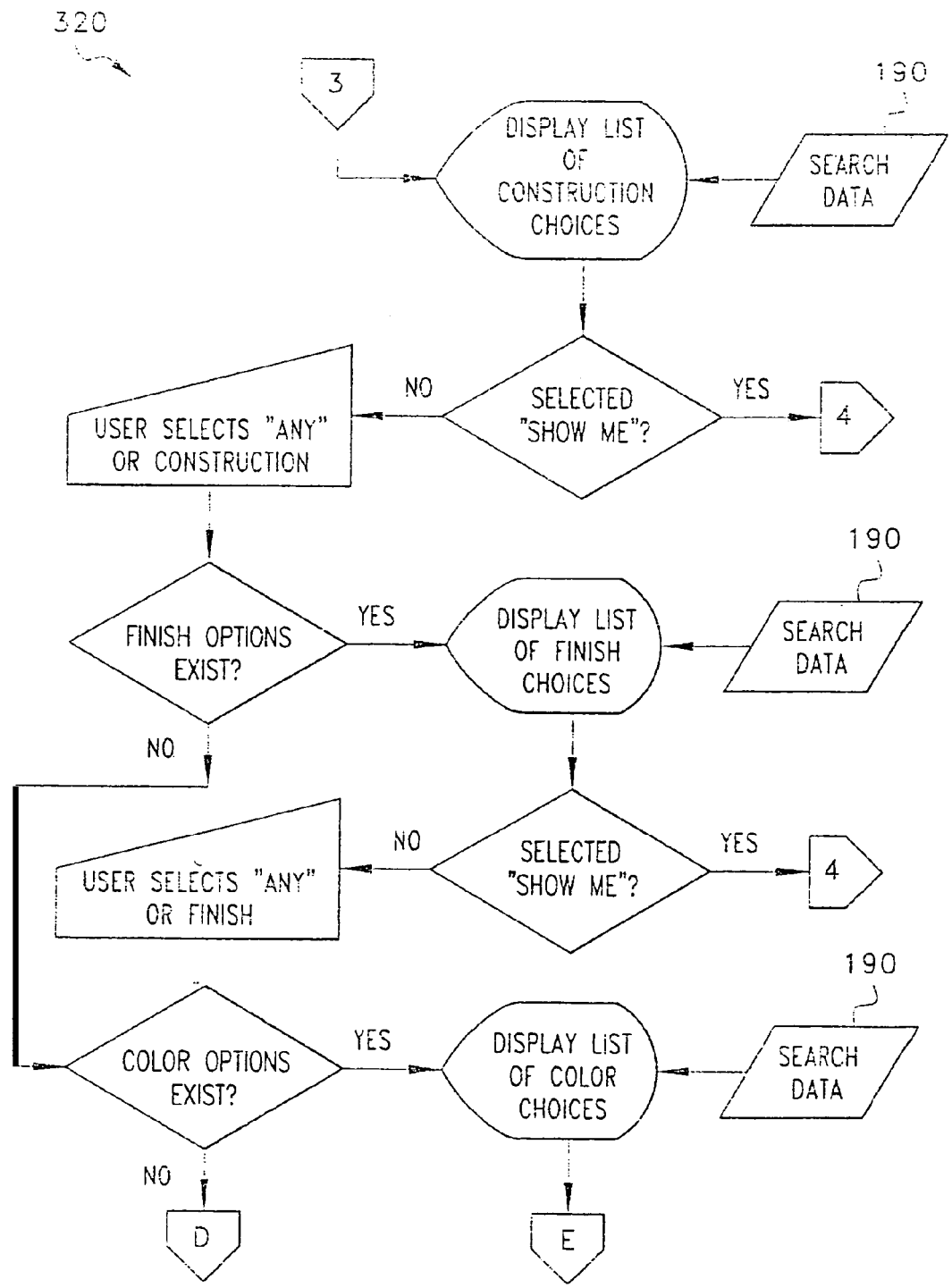
Figure 3D:
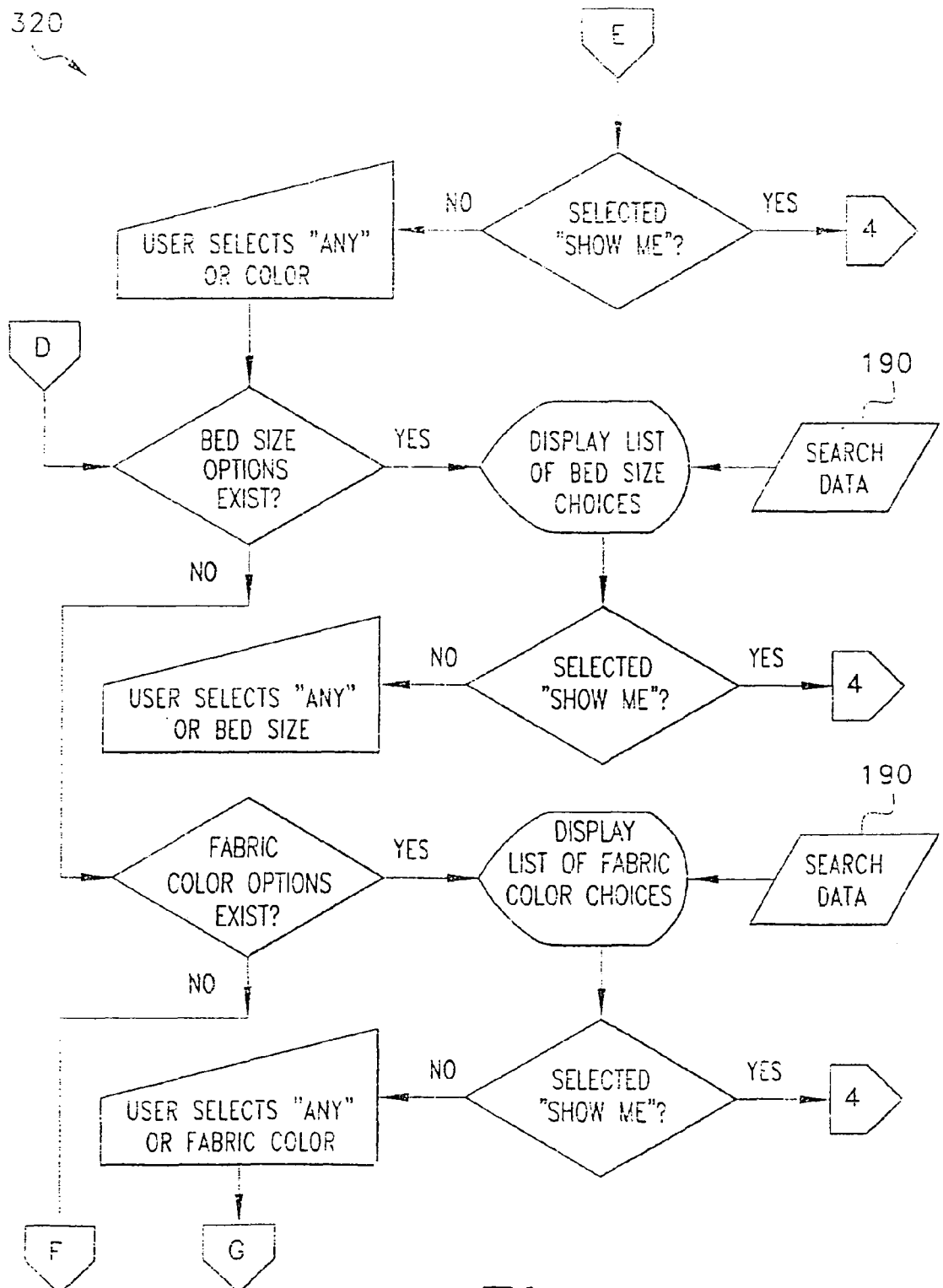
Figure 3E:
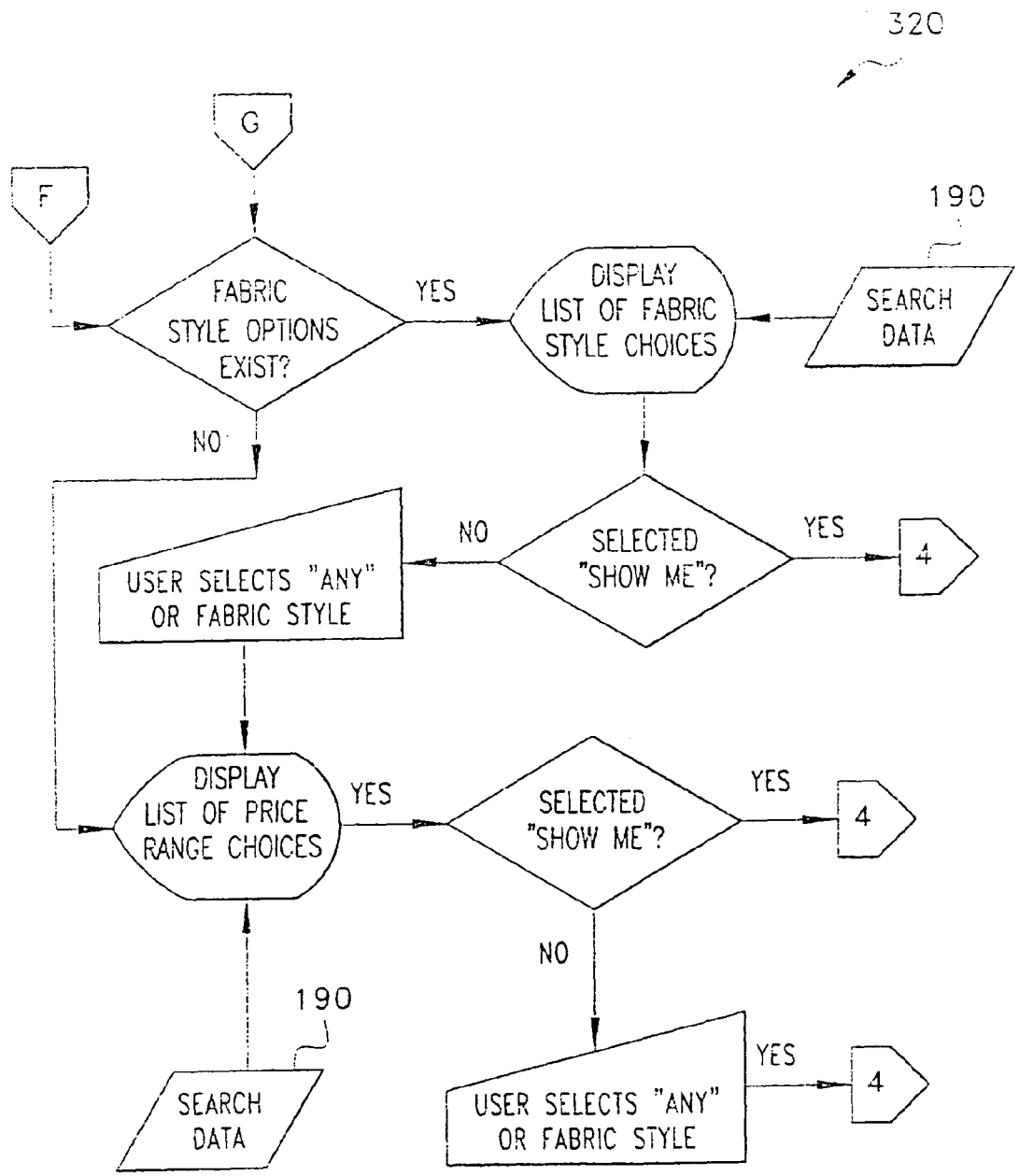

An overall configuration of the datacenter 30 is outlined in FIG. 2. The datacenter 30 is the central component of the system 10 and is comprised of a plurality of Ethernet network systems 90, a plurality of routers 100, which act as a link between the datacenter 30 and the Internet 40, a plurality of Web servers 110 that send and receive information from the different entities using the Internet 40 and a plurality of virtual private network (VPN) servers 120 that communicate with a mobile sales rep 50, a dealer's server 60 and a manufacturer's server 70, using encryption channel technology so that the information coming in and out of the datacenter 30 is safe from being intercepted and understood by unauthorized users.

The datacenter 30 is further comprised of a plurality of Web site structured query language (SQL) servers 130, a plurality of distribution SQL servers 140 that distribute and transfer data between the different entities and the datacenter 30, a plurality of primary SQL servers 150 and an electronic catalog database 160 containing a primary product data database 170 and a primary transfer data database 175 that stores product data and transfer data. These databases are directly connected to the primary SQL servers 150, with a copy of the product data primary database 170 attached to the Web Site SQL servers 130 and a copy of the primary transfer data database 175 attached to the distribution SQL servers 140.

The primary product data database 170 is also attached to the distribution SQL servers. Components of the system 10 and datacenter 30 are well-known in the related art. The primary product data database 170 includes product data 180, search data 190, fabric data 200, order parameter data 210 and pricing data 220. The primary transfer data database 175 includes sales data 230, sales order data 240, purchase order data 250, inventory data 260, bill of lading data 270 and customer data 280.

Data from both data databases 170,175 are an integral part of the overall method 20 of the invention. The overall method 20 comprises the steps of searching for desired products by an item number, a SKU number and a provided search category and displaying the desired products and product attributes found by the search. This includes a SKU number, a manufacturer name, a PEG image, a list price, a discount price, a sale price, assembling components, a fabric name, a fabric number, a fabric style, a color, a grade, a finish, a cleaning code and instructions, matching products, a bed size, item variants and inventory information.

The method 20 is further comprised of the steps of selecting, deleting and updating desired products to a selection basket 290, including available quantities and prices of the desired products, exchanging and updating inventory, raw material, purchase order, sales order and selection basket 290 data with the datacenter 30 (that is accessed over the Internet 40), starting a manufacturer's production order, editing the final product, scanning the final product, determining a customer's credit worthiness for the amount of a sales order, determining a delivery schedule, establishing routing and loading procedures for the product and establishing shipping and receiving procedures.

The first step of the overall method 20 is depicted in FIGS. 3A-3E and 4C, which begins with offering the user the choice of searching for desired products by item number, storekeeper's unit (SKU) or via a search category 300,310,320. If the user chooses to search by item number, a box is provided on a Web page to accept the input of the item number. Once provided, the number is verified against the product data 180. The product data 180 is either a complete item number or the beginning portion of one or more item numbers or the beginning of one or more item numbers.

If verification fails, the user is returned to reenter the item number. If the verification is acceptable, and is an exact match to one product, that product is displayed on a Web page. If the item number was determined to be the beginning of multiple item numbers, the matching results are displayed. The user may then select one to display. If the user chooses to search by SKU, a box is provided on the Web page to accept the input of the SKU's number. Once provided, the number is verified against the product data 180 to determine that it is a valid SKU number. If the verification is successful, the matching product is displayed on the Web page.

Beginning by getting the user's selection from the top level of the category selected, it is determined whether there are any subcategories for this selection. If so, the list of subcategories is displayed and the user is asked to select either a subcategory, skip to the next selection or stop the search. If a subcategory is selected, it is again checked for other subcategories. If there are no subcategories, the user will continue to make a manufacturer's selection. If the search is stopped, the matching products are displayed using JPEG technology that is provided to the system 10 and is well-known to those of ordinary skill schooled in the related art.

A list of possible manufacturers are then displayed for the product type selected. A choice of a particular manufacturer can be selected by the user, or the user may skip the selection and stop the search. If the user selects a manufacturer or chooses to skip a selection, the choice is noted by the system 10 and the user continues. If the search is stopped, the matching products are displayed for selection.

Possible choices for product construction are displayed on the system's Web page. The user has a choice of skipping this option and selecting another option or choosing to end the search. If the user skips or chooses an option, the choice is noted and the search continues to the next selection.

It is then determined if the previous selections lead to a product with possible finish selections. If not, the user can skip to the next selection. If selections exist, a list of possible choices for finishes are displayed. The user also has a choice of skipping this selection, selecting one of the options, or choosing to end the search. If the user skips or chooses an option, the choice is noted and the search continues.

It is then determined if the previous selections lead to a product with possible color selections. If not, this selection is skipped. If selections exist, a list of possible choices for colors are displayed. The user has the choice of skipping this selection, selecting one of the options or the user can choose to end the search. If the user skips or chooses an option, the choice is noted and the search continues to the next selection.

It is then determined if the previous selections lead to a product with possible bed size selections. If not, this selection is skipped. If selections exist, a list of the possible choices for bed size is displayed. User has the choice of skipping this question, selecting one of the options, or choosing to end the search. If the user skips or chooses an option, the choice is noted and the search continues to the next selection.

It is then determined if the previous selections lead to a product with possible fabric color selections. If not, this selection is skipped. If selections exist, a list of possible choices for fabric color are displayed. User has the choice of skipping this selection, selecting one of the options or choosing to end the search. If the user skips or chooses an option, the choice is noted and the search continues to the next selection.

It is then determined if the previous selections lead to a product with possible fabric style selections. If not, this selection is then skipped. If selections exist, a list of possible choices for fabric style is displayed. The user has a choice of skipping this selection, selecting one of the options or can choose to end the search. If the user skips or chooses an option, the choice is noted and the search continues to the next selection.

Finally, a list of possible price range choices are then displayed. The user has the choice of skipping this selection, selecting a price range option, or can choose to end the search. If the user skips or chooses an option, the choice is noted and the search continues. The user can select a "show me" button on the Web page to end the search. By matching the user's selections against the product data 180, a list of matching products is generated. The user can then select a particular desired product from the list.

Figure 4A:
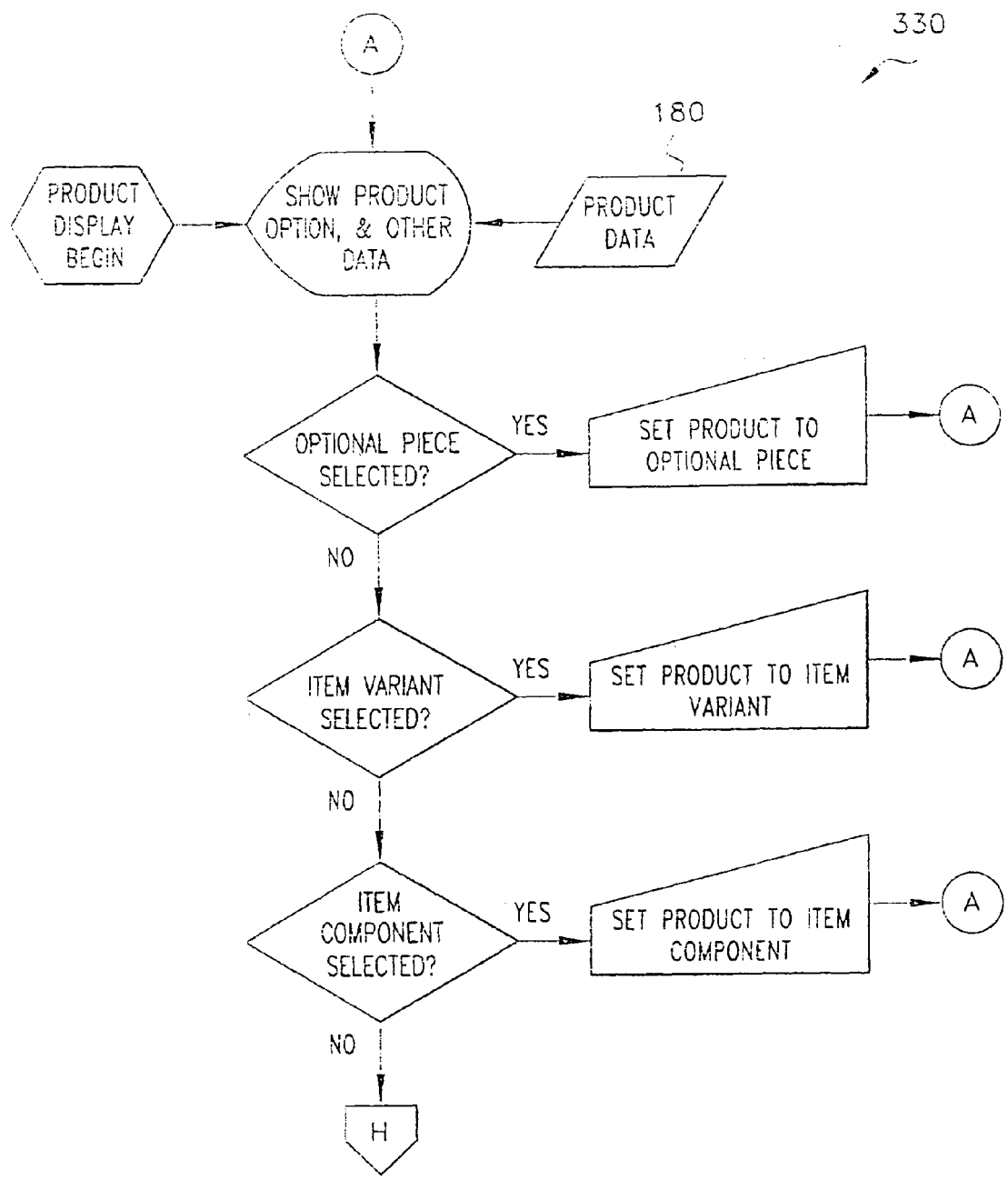
FIGS. 4A-4E are one flowchart outlining a product display function according to the present invention.
Figure 4B:
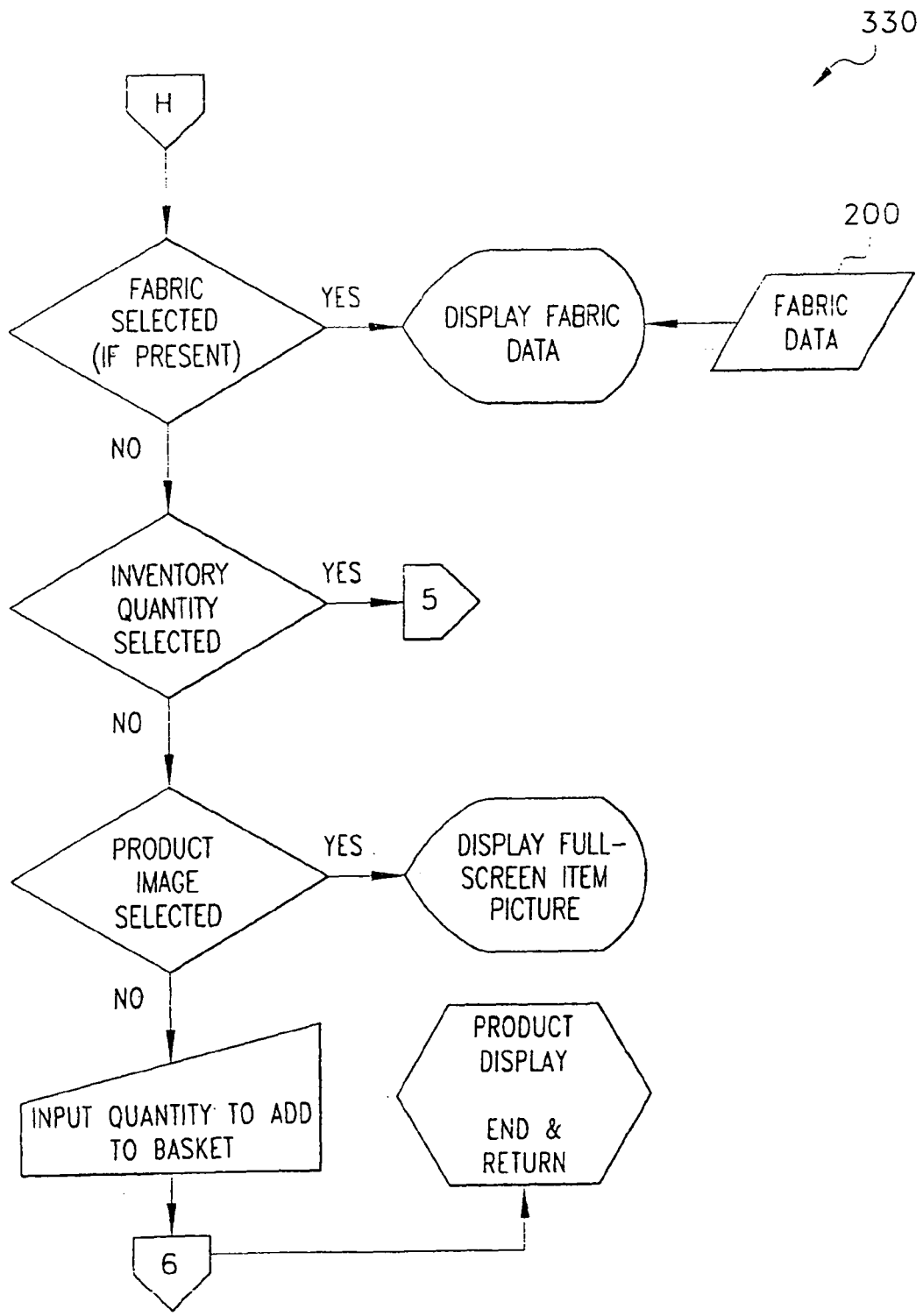
Figure 4C:
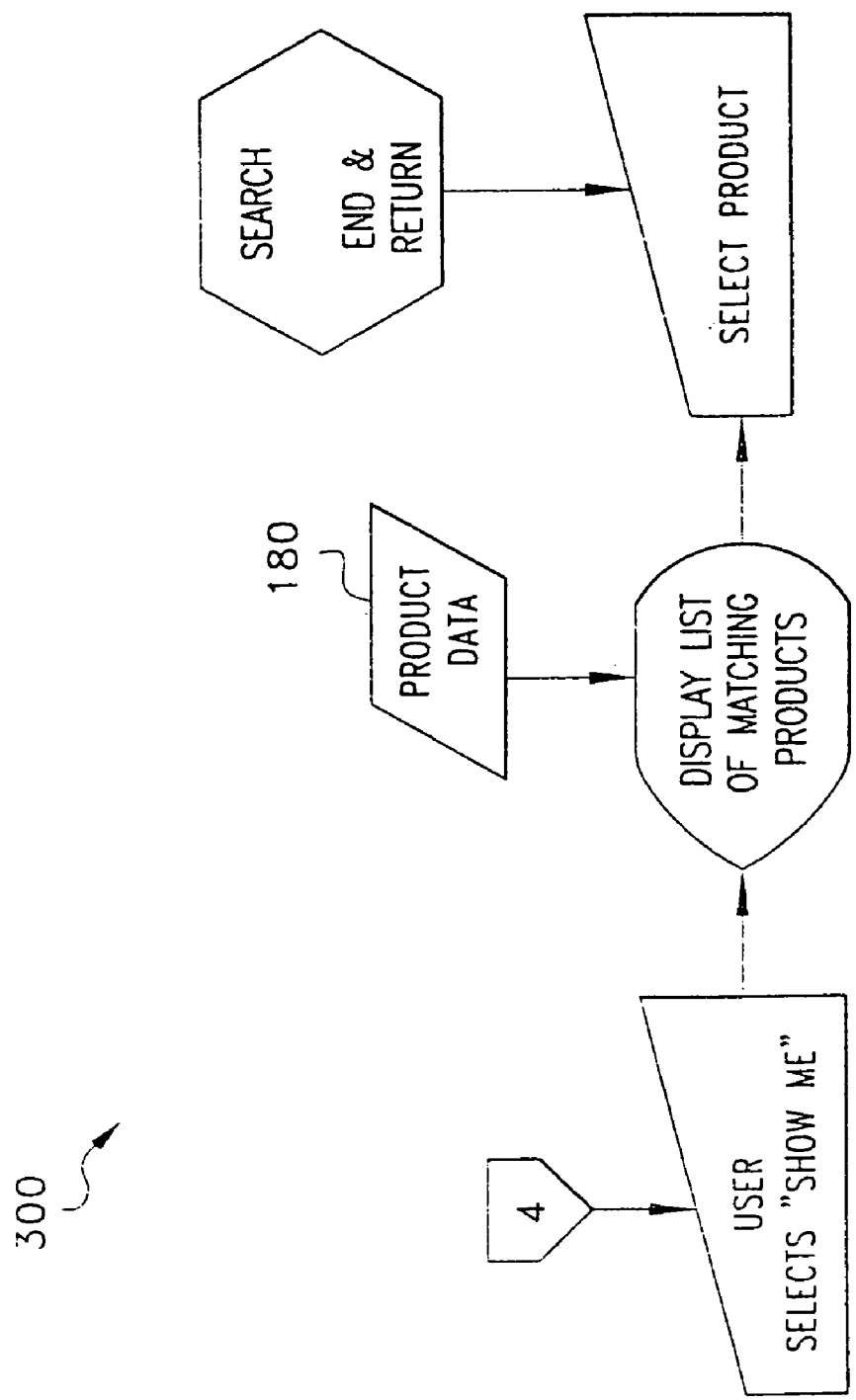

Given a particular product from some previous function (most likely the previously described search function), the user can access product data 180 to display information on a particular product 330. This is depicted on FIGS. 4A-4B and 4E. Specifically, this product data includes the SKU number, the manufacturer, a JPEG image of the product, the list price, the discount price, the sales price (if applicable), item components, fabrics, features and benefits, product variants (e.g. same core product with a different finish, fabric, color, etc.) and optional products.

If an optional product is selected, the optional product is sent back and processed through the product data 180 information. The same is true if a product variant or item component is selected, the product variant and item component are processed through the product data 180 information.

If one of the fabrics are selected, information on that particular fabric is displayed, a JPEG image, fabric name, fabric number, style, color, grade, cleaning code and instructions are also provided. If an item's PEG image is requested, a full screen image of the product is displayed. Note that the technology involved with producing an item's PEG image is well-known to those of ordinary skill schooled in the related art, and is not a point of novelty with this system 10 or method 20.

If information on a product's inventory is selected for a particular SKU, various inventory locations, slots and quantities of where the SKU is currently stored are provided. A display of the quantity of the SKU currently on order or to be produced is also provided, the status and quantities of any inter-warehouse transfers, a list of all open sales orders with this SKU, the line quantities and the quantities reserved for each order and a historical record of all sales of this SKU are provided.

If the quantity entered is added to the selection basket 290 for a given SKU number of a product added, a determination concerning whether a line already exists for this SKU is done. If a line already exists, the new quantity is added to the currently existing quantity. If not, a new line is created with the SKU and quantity requested. The submitted SKU price is also verified with pricing data 220 and included in the new line.

Figure 4D:
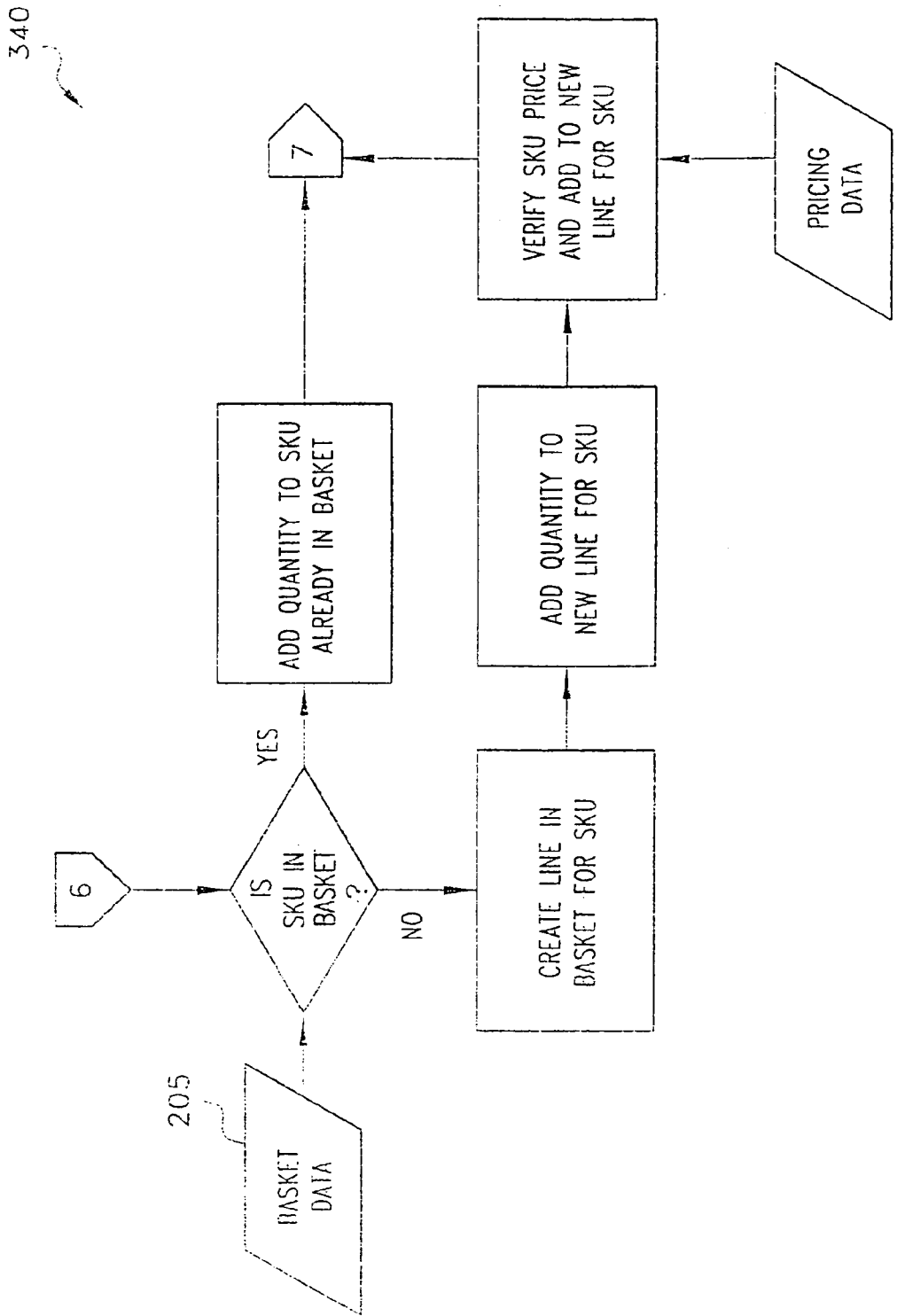
Figure 4E:
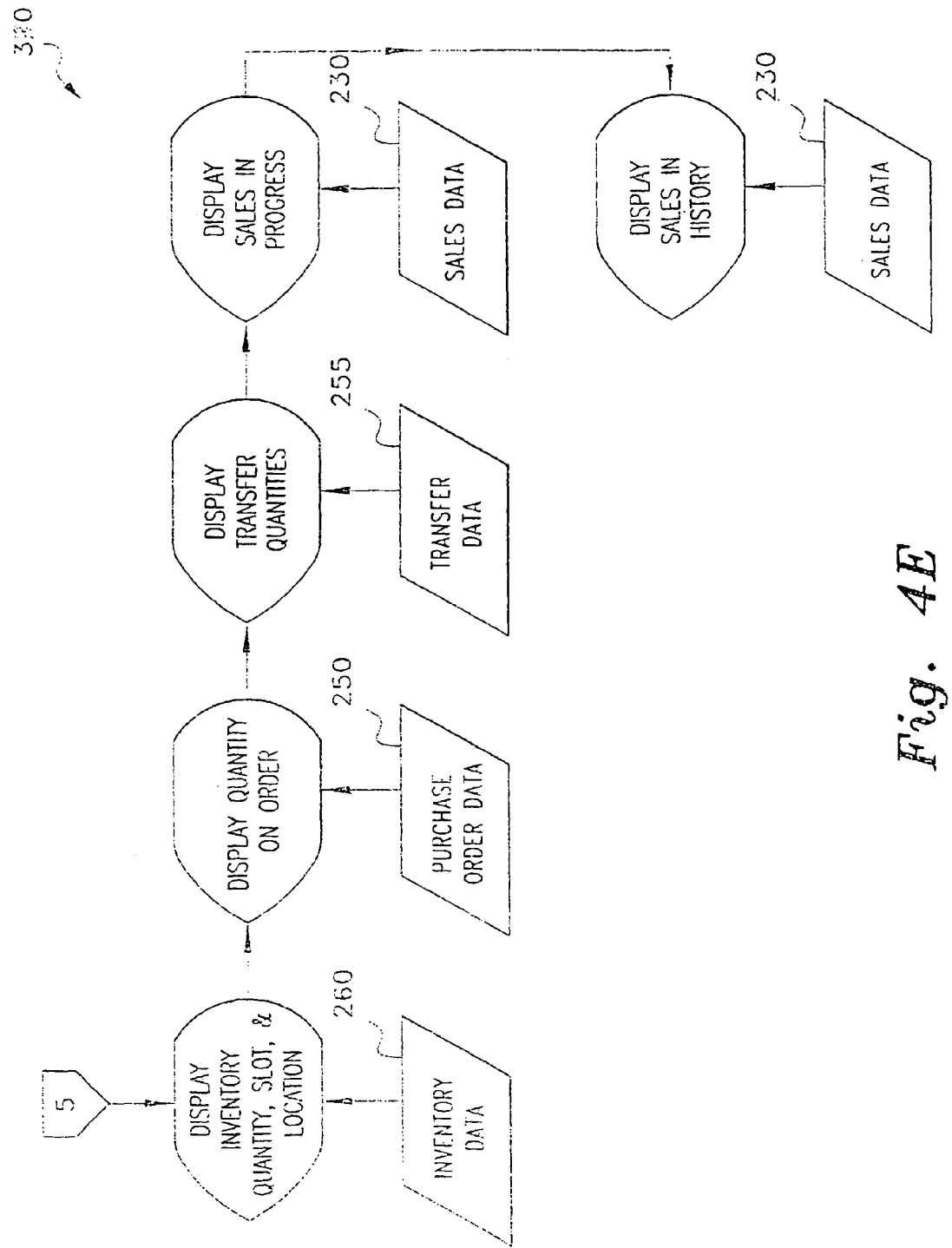
Figure 5A:
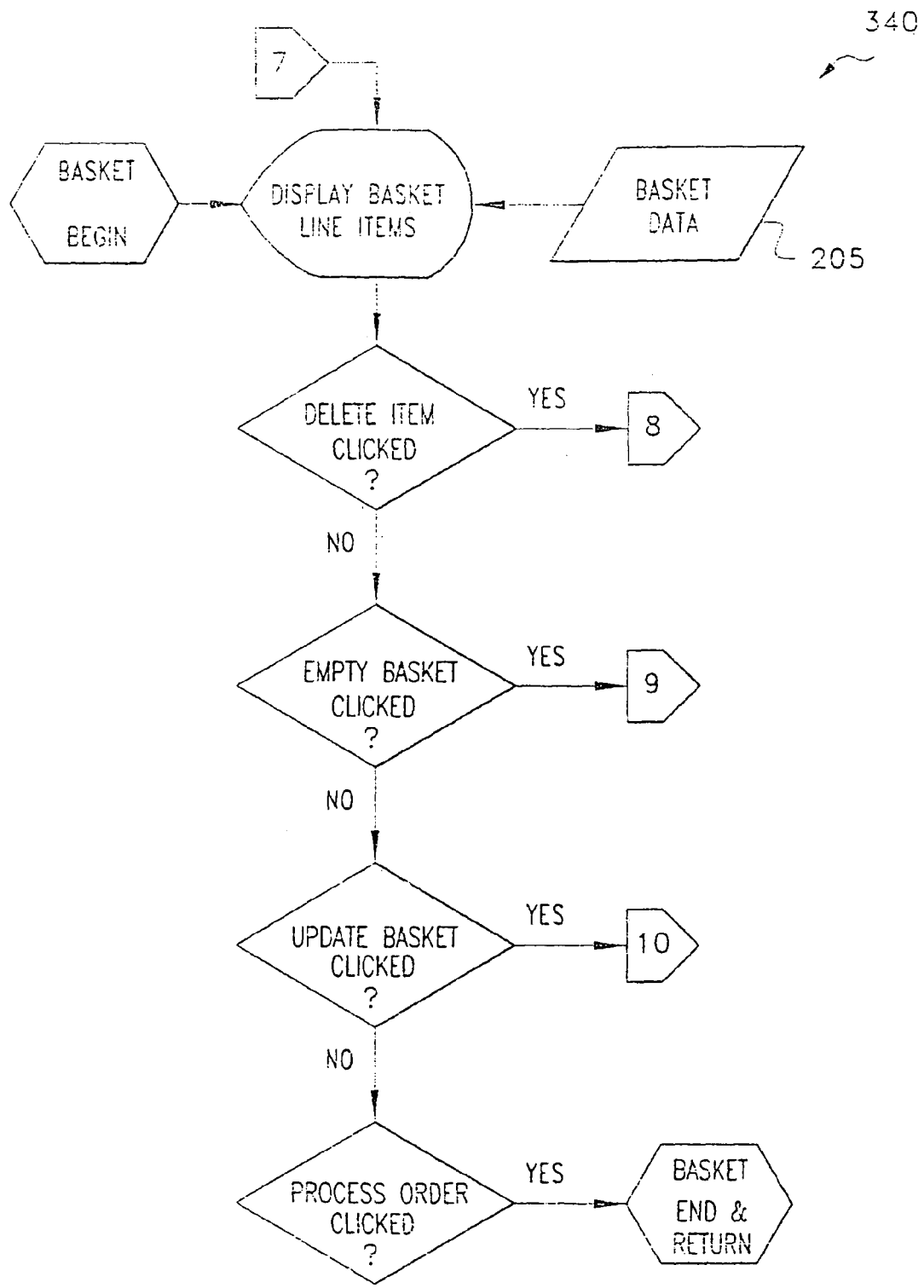
FIGS. 5A-5B are one flowchart outlining a selection basket function according to the present invention.
Figure 5B:
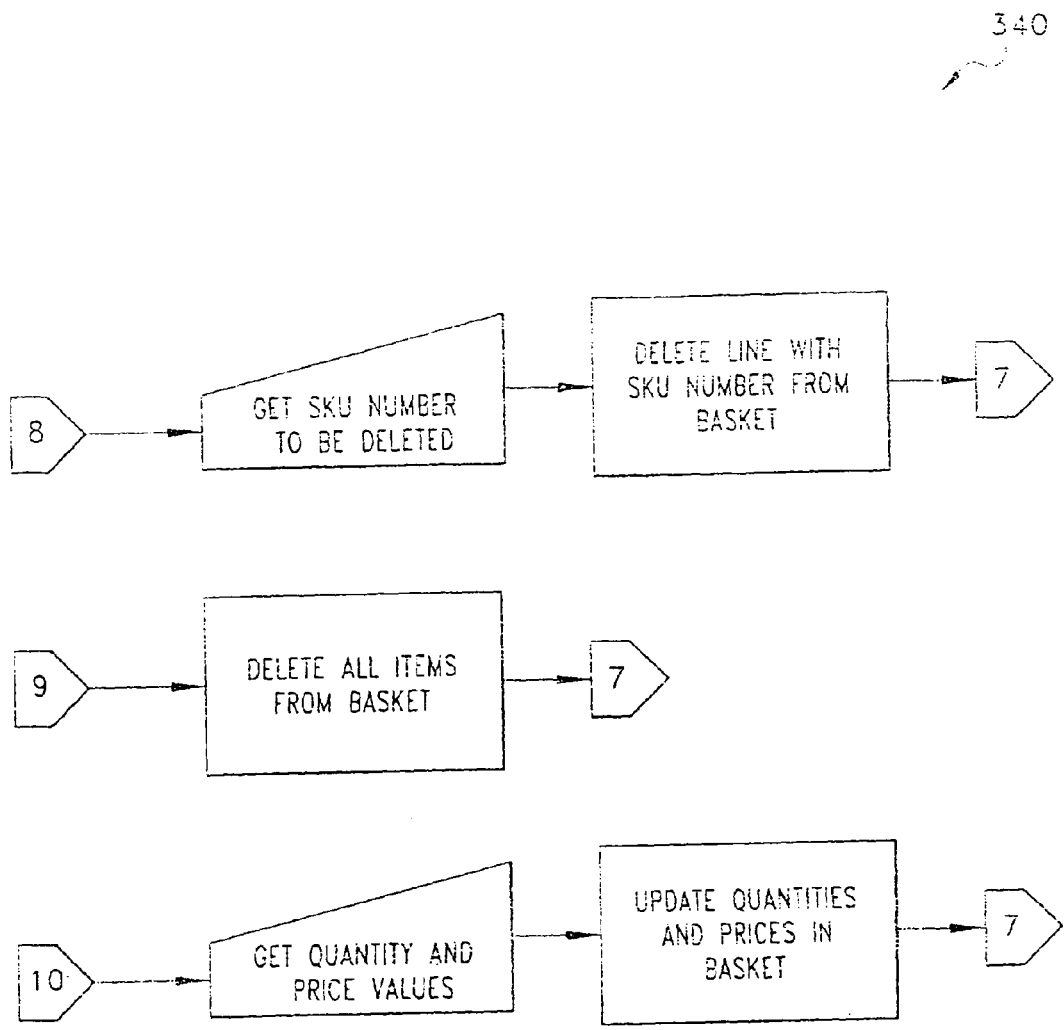

FIGS. 5A-5B and 4D continue with outlining selection basket 290 details 340. The selection basket 290 retrieves the line items and displays with them the quantity and unit price of the line items. The user can delete line items, as well as empty and update the selection basket 290. If an item is deleted, the SKU number for the deleted item is deleted from the selection basket 290. If the selection basket 290 is updated, quantity and price values for each line item in the selection basket 290 are retrieved, and the selection basket 290 is updated. The user would then process the adjusted order.

Figure 6:
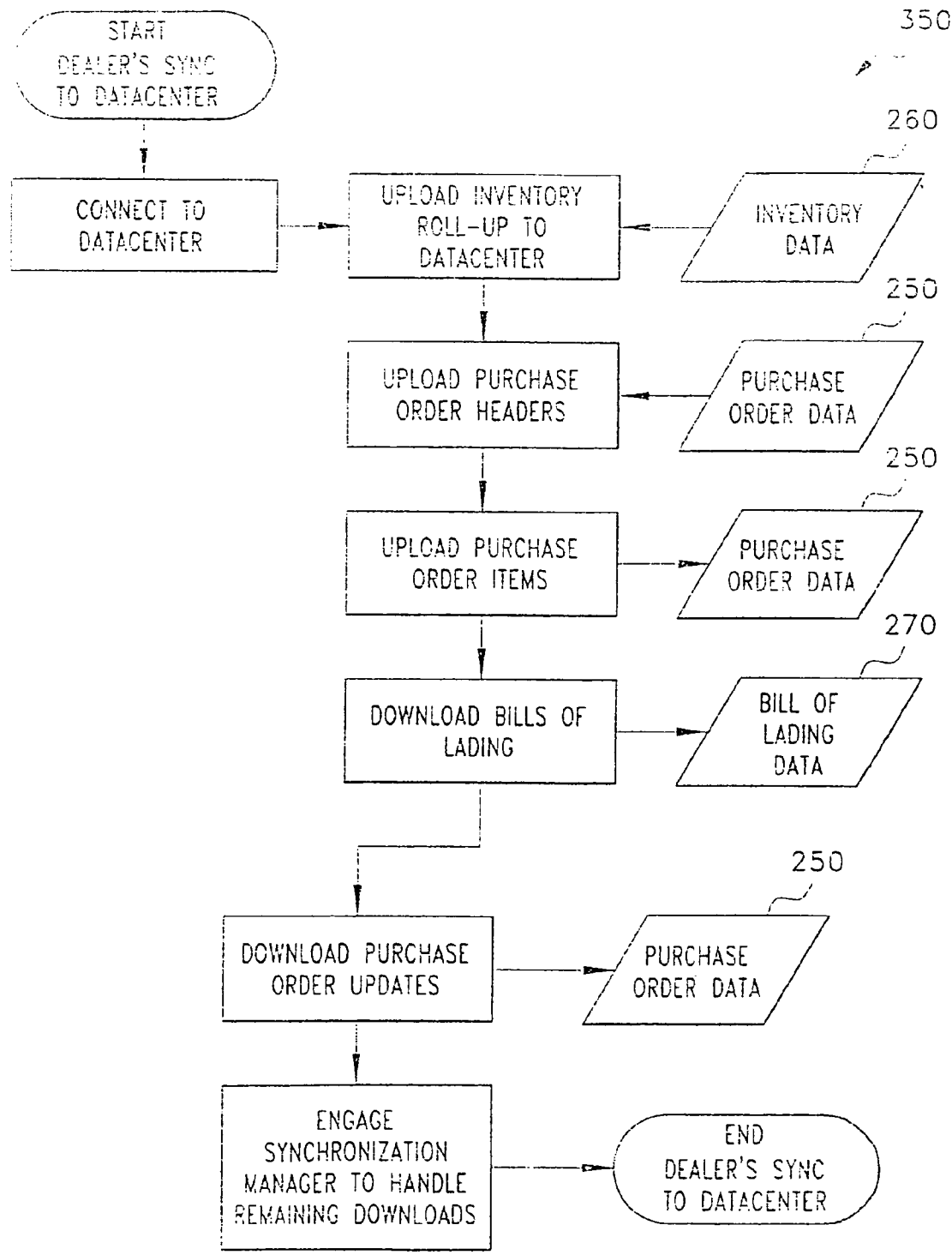
FIG. 6 is a flowchart outlining a dealer synchronization to the datacenter.

FIG. 6 synchronizes a dealer's server 60 with the datacenter 30 and connects the dealer to the datacenter 30,350. The best mode for doing this is done by first connecting to the Internet 40 and then forming a connection with the Virtual Private Networking Servers 120 of the datacenter 30. An overall inventory statement for SKUs and their quantities are transmitted to the VPN servers 120. As previously noted, the VPN servers 120 utilize encryption channel technology, so that the information coming in and out of the datacenter 30 is safe from being intercepted and understood by unauthorized users.

Figure 7:
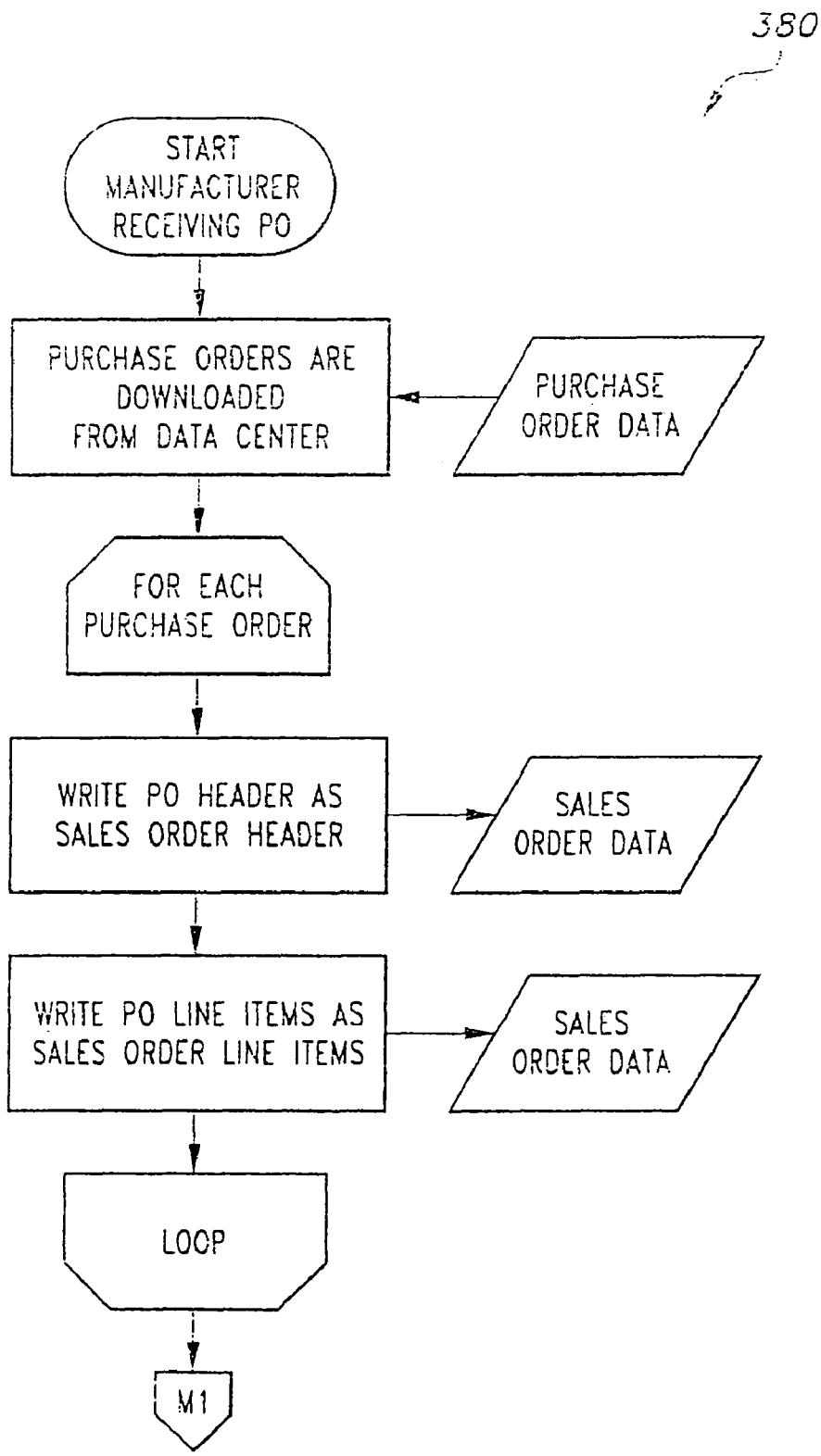
FIG. 7 is a flowchart outlining the procedures for a manufacturer receiving a purchase order.

According to FIG. 7, any pending purchase orders' headers and line items are sent to the datacenter 30,380. Any bills of lading 360 which a manufacturer may have sent on products enroute to a dealer are also received, as well as any changes (mostly acknowledgements and price updates) which a manufacturer may have entered on a purchase order. A Microsoft Synchronization Manager 370 is used to download any product data 180 or search data 190 connected to any distribution servers 140.

Manufacturers can download new purchase order (PO) headers and items from the datacenter 30. For each PO, the PO header is written as a sales order header, and the PO line items are written as sales order line items. After all are written, the process enters the sales order processing until approvals are obtained.

Figure 8:
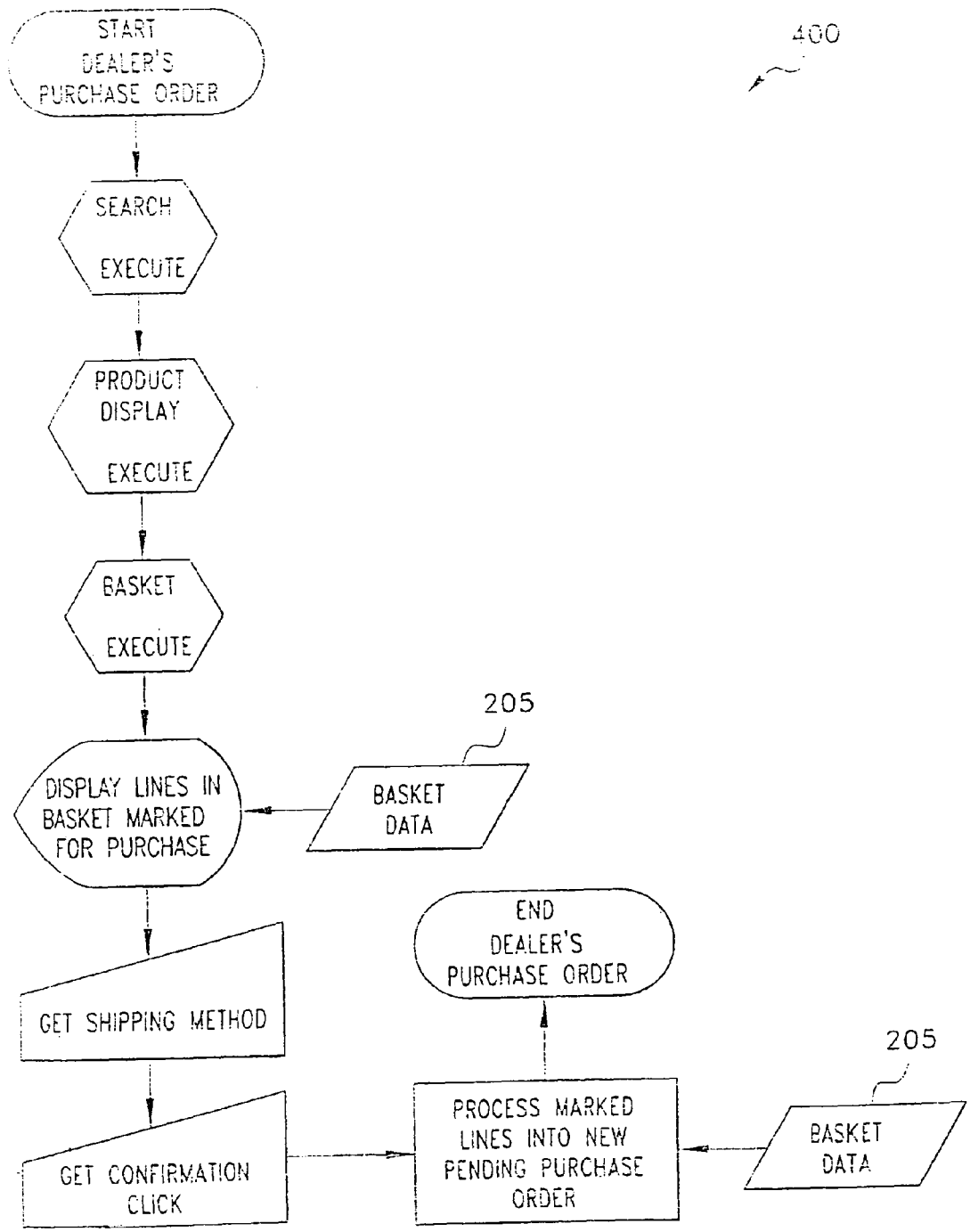
FIG. 8. is a flowchart outlining the procedures for a dealer generating a purchase order.

FIG. 8 depicts the creation of a dealer's purchase order 400. A purchase order is started by selecting the items to be entered on the purchase order. This selection is done using the search, product display and basket functions described in FIG. 3A thru FIG. 5B to create the selection basket 290. Once items are in the selection basket 290 and the user chooses to process the order, those items which have been marked for purchase appear in a final screen review. The user then selects the shipping method and confirms the order. Purchase order header and line items are written to the datacenter 30 and stored for later upload to the datacenter 30.

When a dealer places a purchase order with the manufacturer, the purchase order reaches the manufacturer's servers 70 and converts the dealer's purchase order into a factory sales order.

Required General Ledger entries are completed and the system 10 checks if inventory is available to fill the order. If the inventory is available, the system 10 reserves inventory to fill the order, verifies pricing on the dealer's order and makes any necessary changes. Any freight charges, special handling charges and necessary sales taxes are added as line items. This will enable the dealer to inventory merchandise on a true cost per item basis in realtime.

The sales order will also go to the credit department for approval. When the sales order is approved and released, it will go to the acknowledgement department to be acknowledged. Once the sales order is acknowledged, an acknowledgement number and approximate shipping dates are assigned.

This information is released to production or shipping and the products are reserved or backordered. The dealer's purchase order is updated to the dealer's system as soon as acknowledgement is completed, provided the dealer is online. If the dealer is not online, then his system is updated when he reconnects and synchronizes to the system 10.

Figure 9:
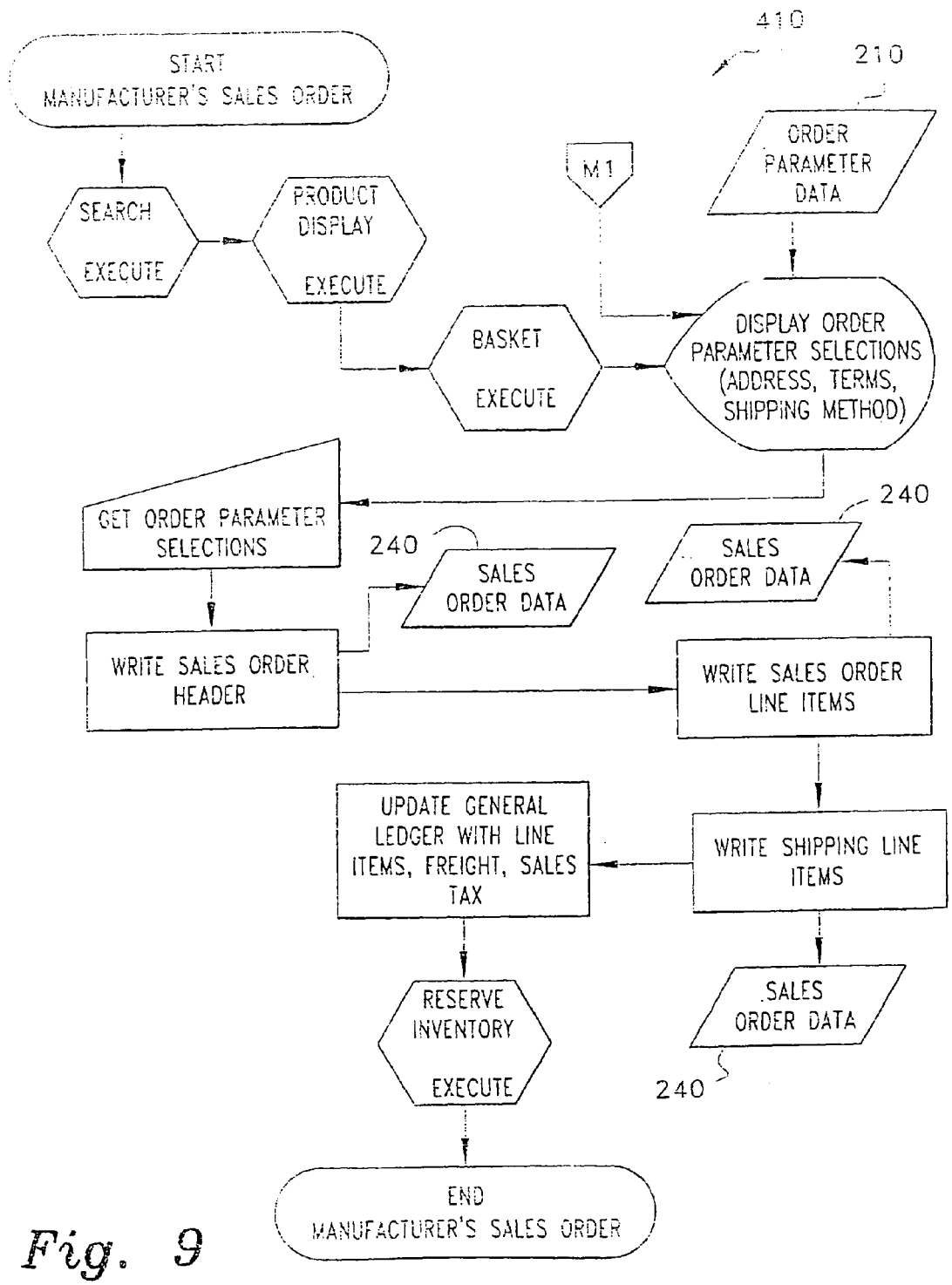
FIG. 9 is a flowchart outlining the procedures for a manufacturer generating a sales order.

According to FIG. 9, a sales order starts by selecting the items to be entered on the sales order 410. This selection is done using the search, product display and basket 290 functions. Once the items are in the basket 290 and the user chooses to "process order", the user is presented with a list of order parameters to set. Those order parameters include, but are not limited to, bill to and ship to addresses, payment terms, shipping method, partial or complete shipments and the salesperson. Those parameters are taken and included with other customer data in the sales order header.

Those basket 290 line items (which were marked for purchase) are copied into the sales order line items. Sales order processing is now executed for credit approval, and further processing is halted until it completes. From the line items, the shipping line items are written, which include breaking down any groups or sets into component shipping cartons. While being written, the General Ledger is updated with the values of the sale. Inventory is then reserved. The auto-reorder function is called to determine any shipping lead times. The returned lead time is saved as an estimated ship date on the sales order, and a customer purchase order if available. User is then forwarded to the sales order review display.

Figure 10A:
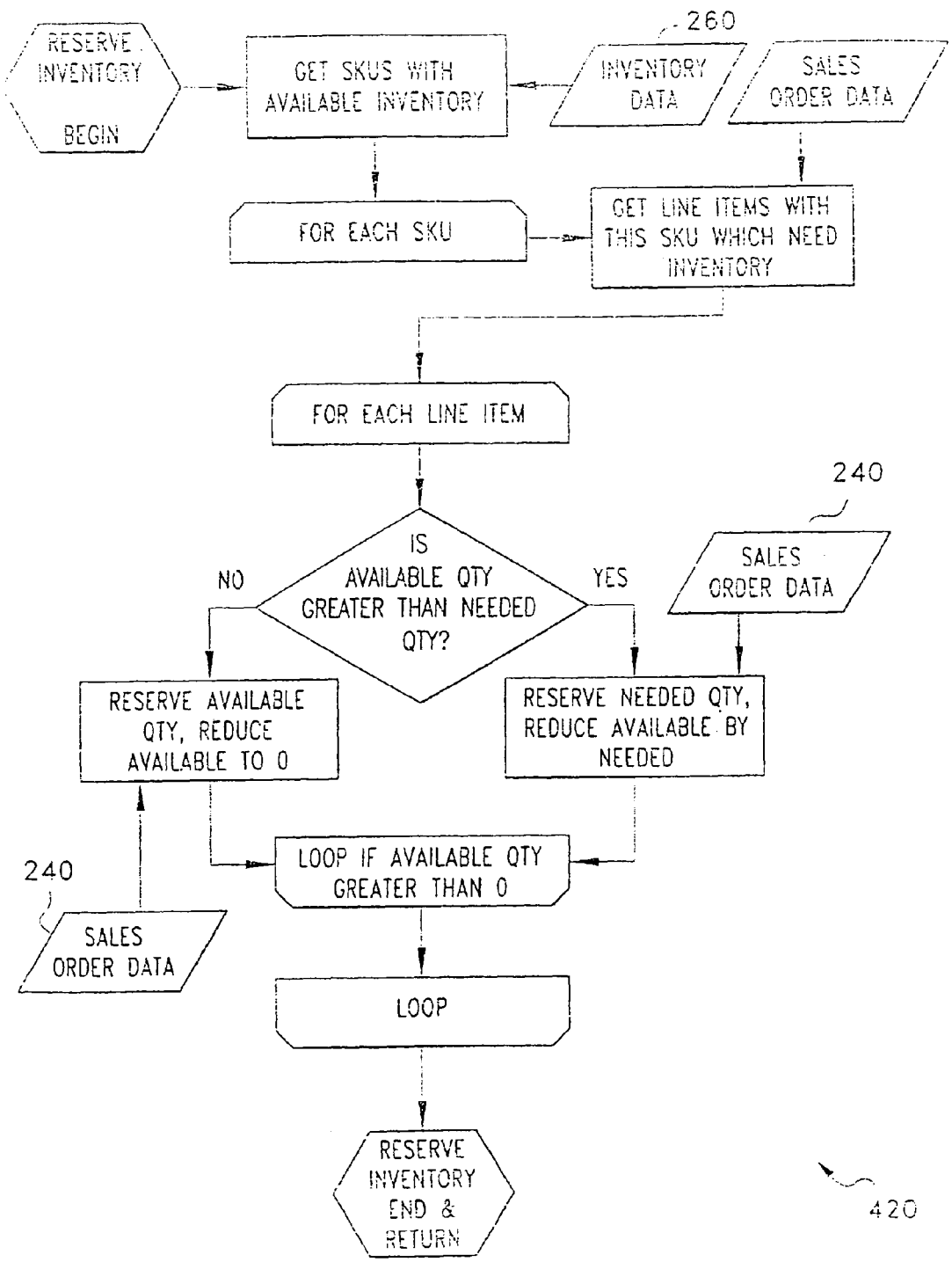
FIG. 10A is a flowchart outlining reserve inventory procedures.

FIG. 10A depicts how reserve inventory is used and accounted for in the system 420,10. First, a list of SKUs with quantities not currently reserved, is obtained from inventory data 260. For each of these SKUs, a list of shipping line items are obtained from the sales order data 240, which need inventory reserved for shipment.

If no line items exist, no work is done. For each line which does exist, it is first determined if the current inventory available is sufficient to fill this line item. If so, the needed quantity for this line is marked and the available inventory is reduced accordingly. If not, then the quantity available is applied to the current line item and the available quantity is reduced to zero. The evaluation of the shipping lines continues until the available quantity is zero or no more lines exist. This is done for each SKU with available inventory.

Figure 10B:
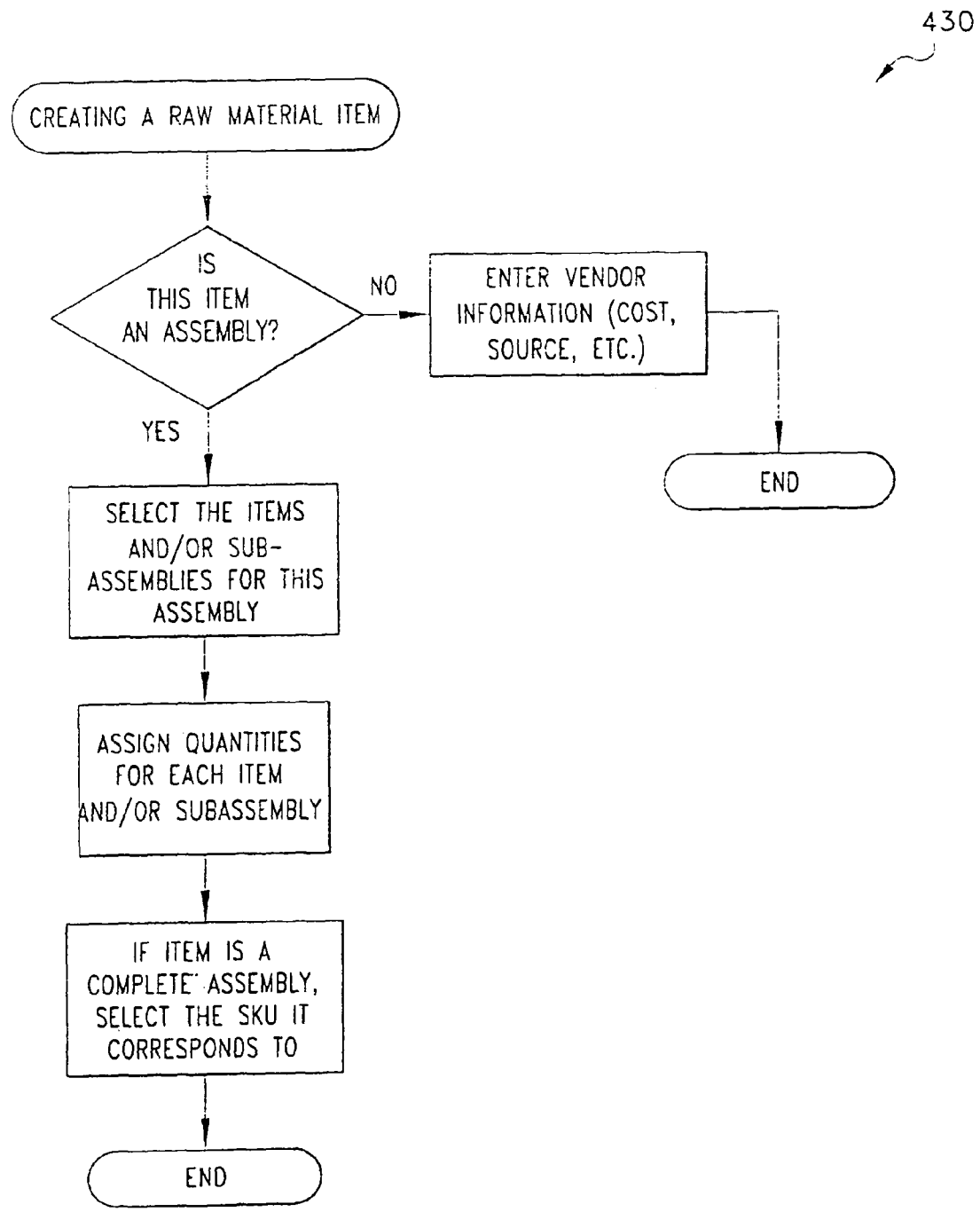
FIG. 10B is a flowchart outlining procedures for creating a raw material item.
Figure 10C:
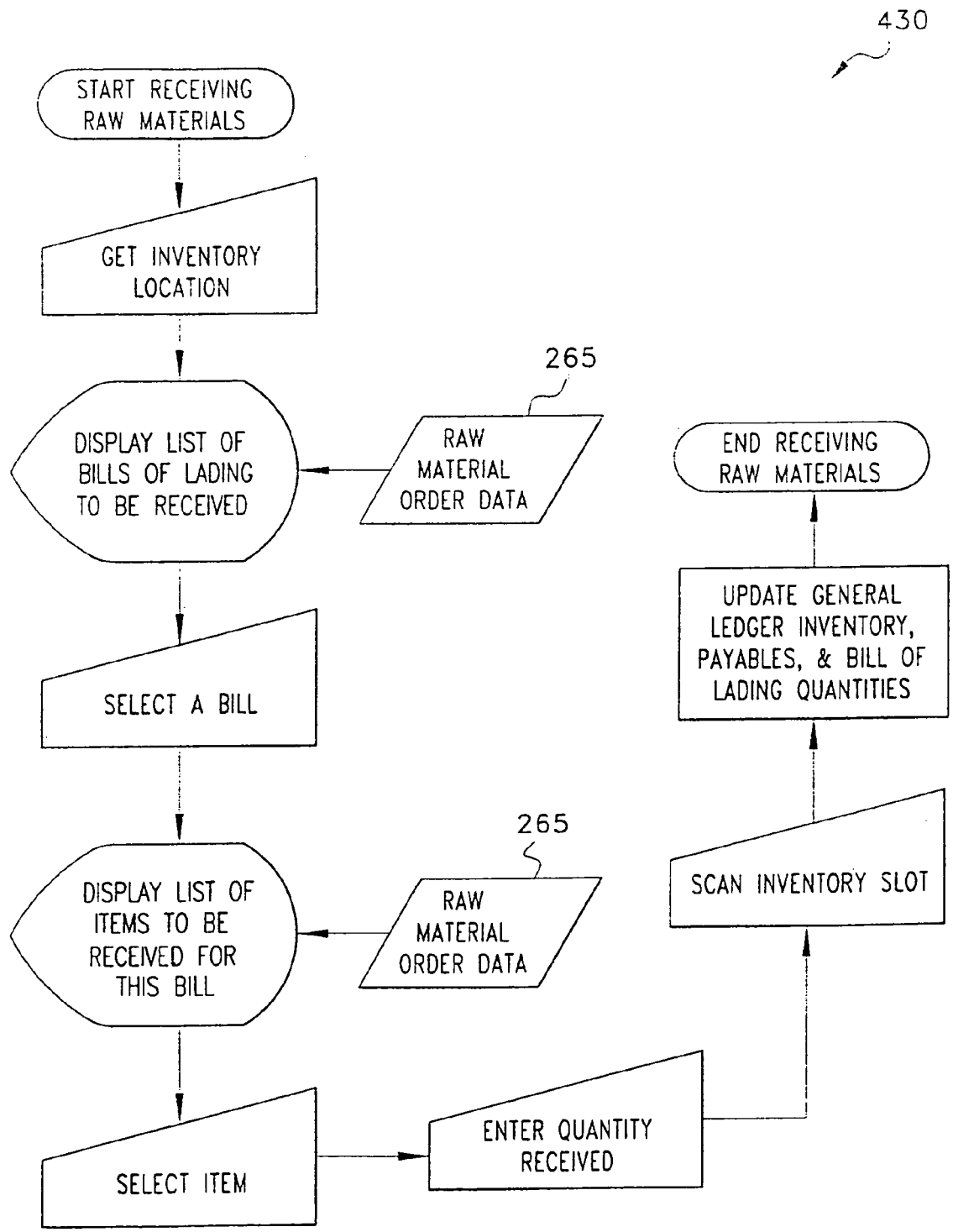
FIG. 10C is a flowchart outlining procedures for receiving raw materials.

FIGS. 10B-10C outlines how to use and account for raw material 430. In creating a raw material item, it must first be determined if the item is an assembly. If not, specific vendor information, such as costs and sources, are entered into the system 10. If yes, select the items and sub-assemblies for this assembly and assign quantities for each item and subassembly. If an item is a completed assembly, select the SKU it corresponds to.

In receiving any raw material, the inventory location of the raw material must be known. A list of bills of lading 360 to be received and displayed are obtained from the raw material order data. A bill of lading 360 is then selected by a user and a list of items to be received for this bill of lading 360 is displayed. An item is selected from the list with its quantity and inventory slot also provided. General Ledger entries of inventory payable and bill of lading 360 quantities are also adjusted accordingly.

A manufacturer can enter raw materials in the electronic catalog database 160. Once the electronic catalog 35 is produced, the manufacturer can place orders for raw materials simply by pointing and clicking on a displayed raw material item. The order can then be sent to the supplier electronically for acknowledgement and fulfillment.

When raw materials arrive, they are scanned into inventory in realtime, where the raw material inventory quantities and costs are adjusted. Once received, the purchase order is converted to an invoice (charging only for the items received) and a check can be written to the supplier. Items that are not received will remain on the purchase order for future processing or deletion.

A bill of materials for subassemblies is also created, with each subassembly given a SKU number. Subassemblies can be combined into one assembly and be given a unique SKU number for each product. Where a company chooses to list only one assembly, then all parts needed to produce the single finished product would equal one assembly and have only one SKU number. Note that subassemblies are a group of parts that have been fastened together to create a section of a whole, and an assembly is simply a SKU number that represents a group of raw materials and subassemblies that have been designated to create a finished product.

It is necessary to catalog all subassemblies and to produce a production order for subassemblies when giving subassemblies a unique SKU number and serial number. The subassemblies are also scanned into inventory and are maintained with an inventory status. When a production order for subassemblies is produced, raw materials used to create these subassemblies are reserved.

When subassemblies are produced and given a SKU number and serial number, raw materials inventory (quantity and cost) are reduced and inventory of subassemblies are increased. The same number of raw materials products are sent to the selection basket 290 of their respective vendors. Whether SKU numbers and serial numbers are given to subassemblies and are inventoried is optional, on a per item basis.

When a production order is generated for a finished product using subassemblies, inventory of the subassemblies are reserved. Once the finished product is produced and scanned into inventory, the inventory of the subassemblies are reduced and the same number of subassemblies are sent to the selection basket 290. When a production order is generated for a finished product using an assembly made up of raw material parts only and no subassemblies are involved, raw materials inventory will be reserved at the time the production order is generated.

Once that finished product is produced, given a SKU number, a serial number and a bar code label are applied to the product and scanned into inventory. Inventory of raw materials are reduced and raw materials that are used are sent to the selection basket 290 of their respective supplier.

To place a production order, a manufacturer would go into the electronic catalog and create a production order by simply pointing and clicking on the products they want to produce. A work order is produced by the system 10 and goes to production, where it is given a job number, production date and line number, if applicable. Bar code labels would be printed or be printed at such time as is asked for by a production supervisor. The job would then go to the production line and await production.

Once the product is produced, inspected, boxed and the barcodes labels are applied and scanned into a holding area, they are automatically uploaded into a stocker's hand held computer and are ready to be warehoused. Product serial number, warehouse number, slot number and employee badge information are scanned in, as well as automatically recording the date, the time and the person scanning and stocking items.

Figure 11:
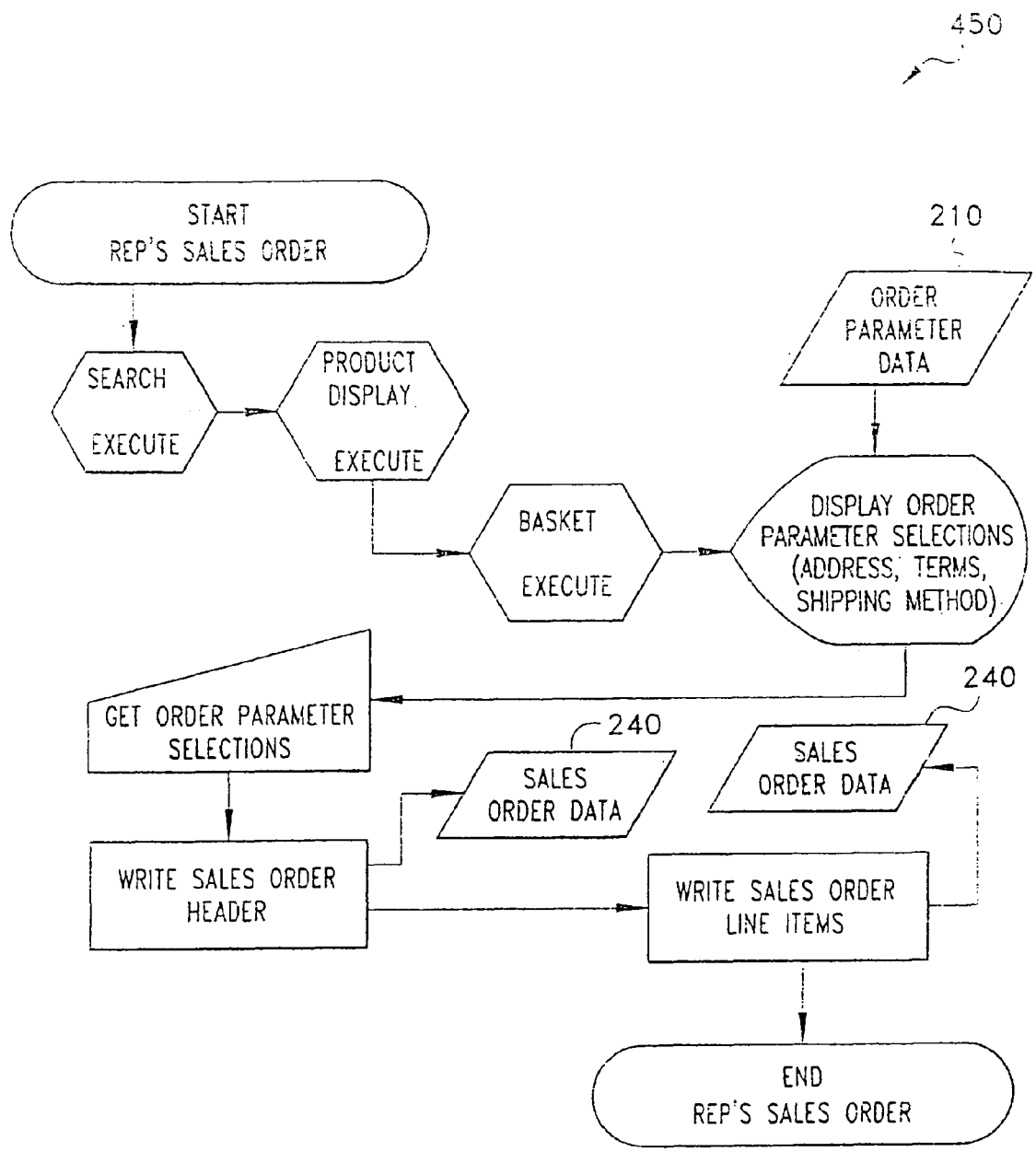
FIG. 11 is a flowchart outlining procedures for creating a representative's sales order.

FIG. 11 outlines the steps involved with a sales representative placing a sales order 450. As with other orders, the selection of items for the order is done using the search, product display and selection basket 290 functions described in FIG. 3A to FIG. 5B. Once the items are in the selection basket 290 and the user chooses to process the order, the user is presented with a list of order parameters to set.

Those order parameters include bill to and ship to addresses, payment terms, shipping method, indication of a partial or complete shipment and indication of the salesperson for the order. Those parameters are taken and included with other customer data 280 in the sales order header. Those selection basket 290 line items, which were marked for purchase, are copied into the sales order line items. Since this order is to be sent to the representative's company through the datacenter 30, no General Ledger entries are created at this time. No shipping items are written and no inventory is reserved.

Figure 12:
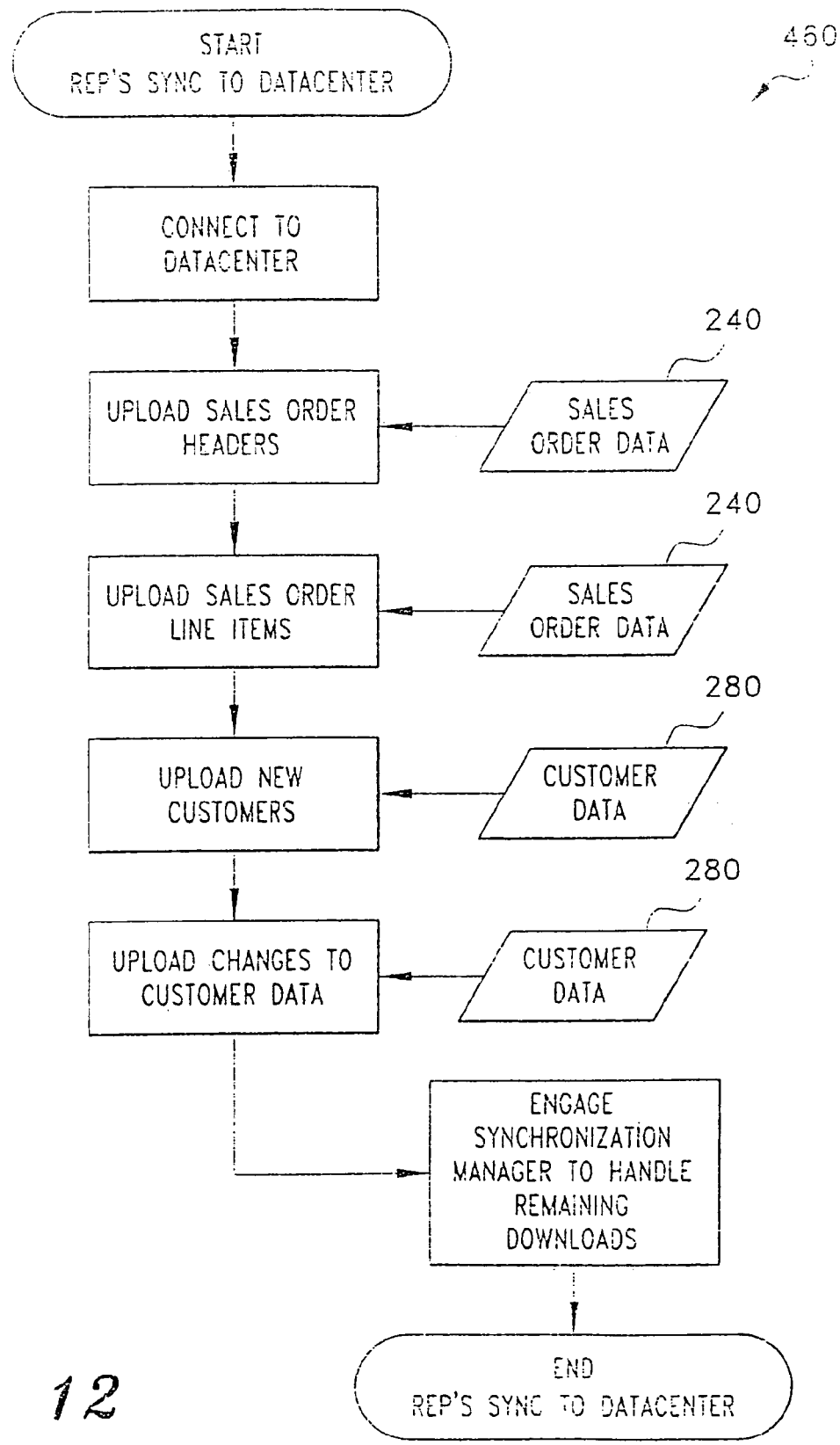
FIG. 12 is a flowchart outlining procedures for synchronizing a sales representative to the datacenter.

FIG. 12 outlines a sales representative being synchronized to the datacenter 460,30. The sales representative must first be connected to the datacenter 30. As indicated previously, the best mode for this is done by first connecting the sales representative to the Internet 40 and forming a VPN server 120 connection with the datacenter 30. Any new sales order headers and line items are transferred to the datacenter 30 for forwarding to the sales representative's home company. The Microsoft Synchronization Manager 370 should be activated to connect with the distribution servers 140 and to download any updated product data 180 and search data 190, as well as any customer data 280 and sales order data 240 replicated from the home company intended for this sales representative.

Figure 13A:
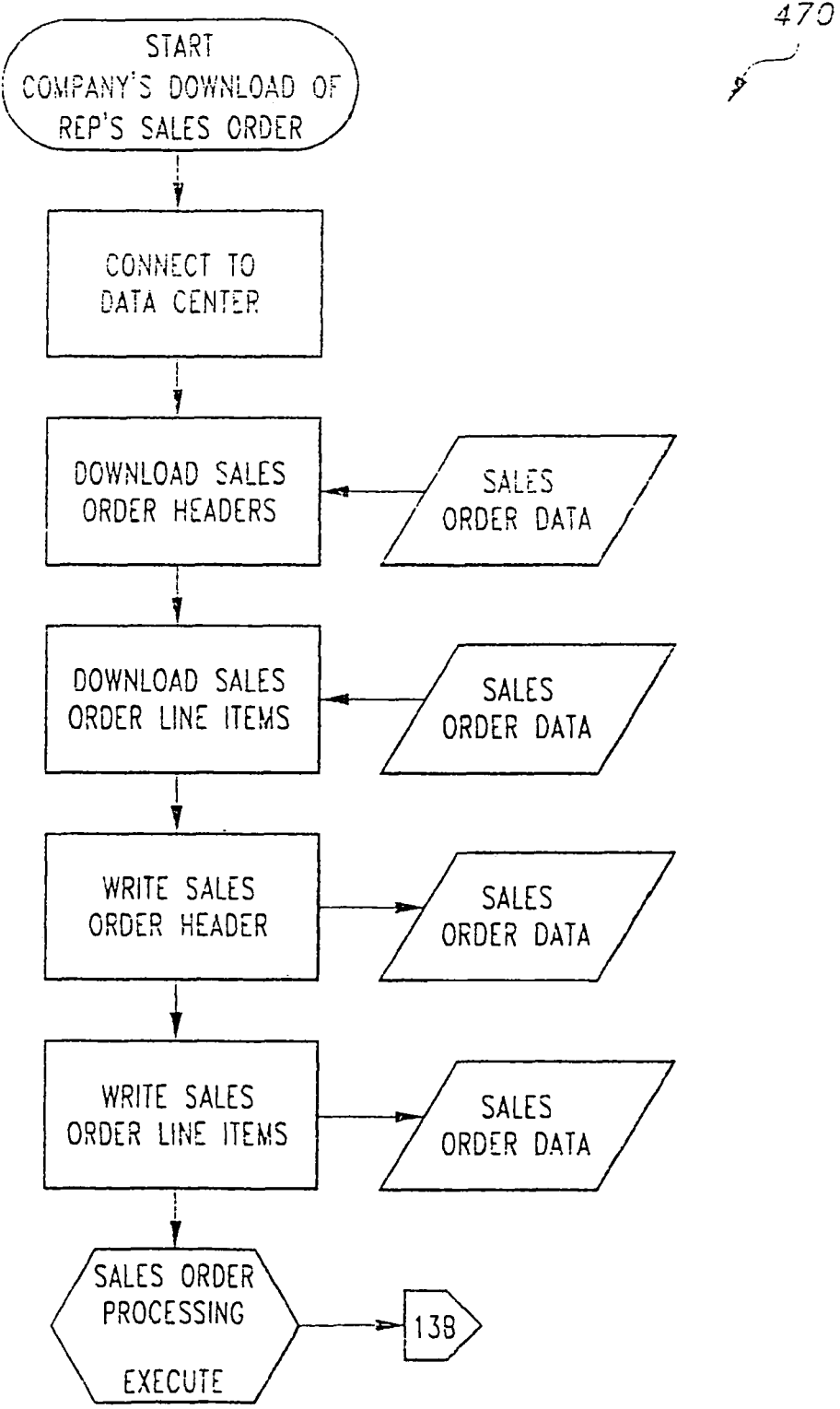
FIGS. 13A-13B are a flowchart outlining procedures for a company's download of a sales representative's order.
Figure 13B:
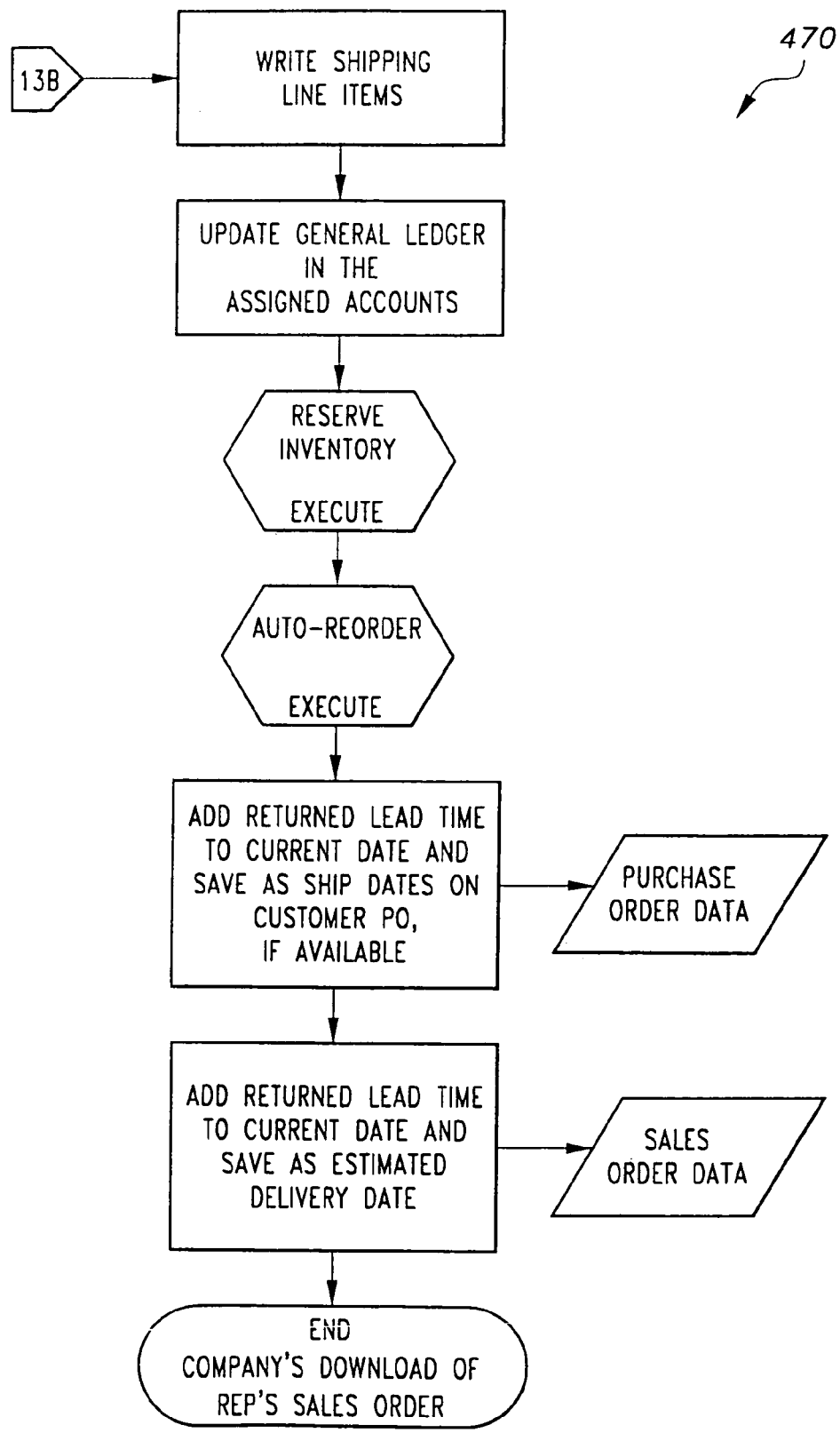

FIGS. 13A-13B depict home company downloading sales order headers and line items from the datacenter 30,470. Sales order headers and line items are written into the sales data 230. Sales order processing is now executed for credit approval, and further processing is halted until it completes. From the line items, the shipping line items are written, which include breaking down any groups or sets into component shipping cartons. While being written, the General Ledger is updated with the values of the sale. Inventory is then reserved. The auto-reorder function is called to determine any shipping lead times. The returned lead time is saved as the estimated ship date on the sales order and customer purchase order if available.

Figure 14:
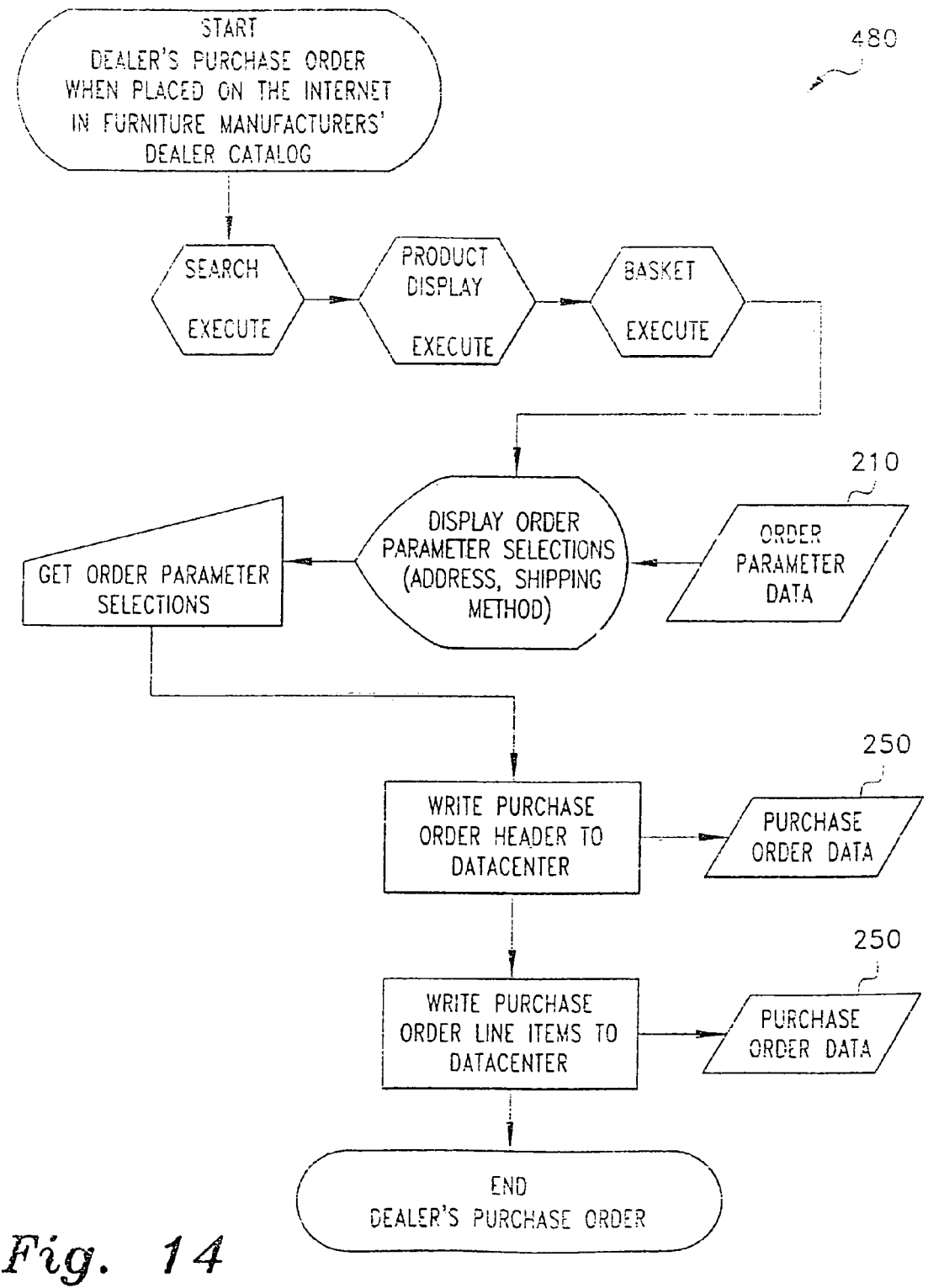
FIG. 14 is a flowchart outlining procedures for a dealer generating a purchase order.

FIG. 14 depicts the generation of a dealer's purchase order 480. Manufacturer's have the option of allowing dealers which do not use the system 10 themselves to still communicate with the manufacturer through the datacenter 30. A dealer may enter their purchase orders at the datacenter's Web site. As with other orders, the selection of items for the order is done using the search, product display and selection basket 290 functions outlined in FIG. 3A thru FIG. 5B.

Once the items are in the selection basket 290 and the user chooses to process the order, the user is presented with a list of order parameters to set. These order parameters include bill to and ship to addresses, shipping method information and indication of a partial or complete shipment. Those parameters are taken and included with other customer data 280 in the purchase order header. These selection basket 290 items which were marked for purchase are copied into the purchase order data 250 line items. The purchase order data 250 is held at the datacenter 30 for later retrieval by the manufacturer.

Figure 15:
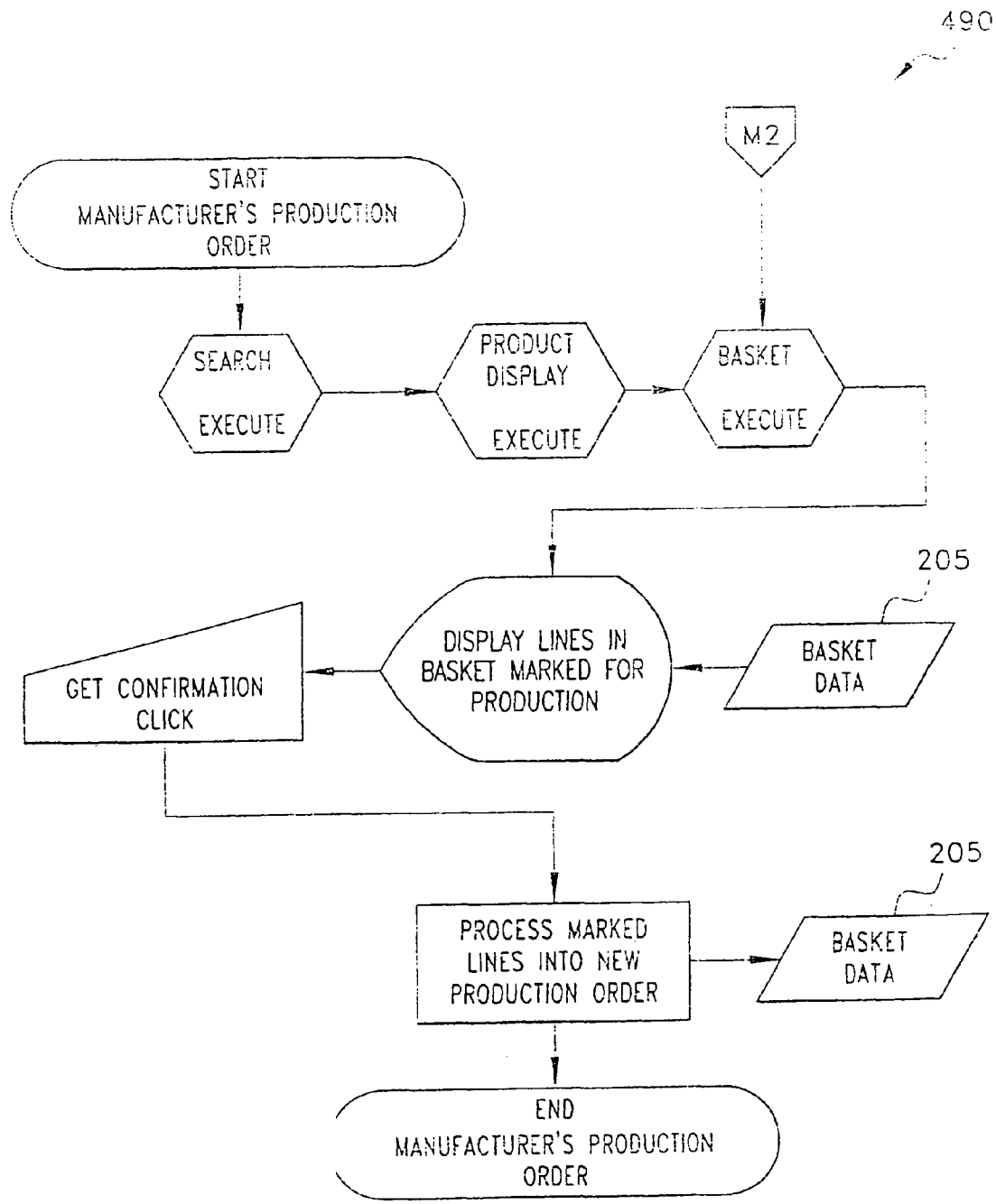
FIG. 15 is a flowchart outlining procedures for generating a manufacturer's production order.

According to FIG. 15, as with other orders, the selection of items for the orders are done using the search, product display and basket 290 functions 490. Once the items are in the basket 290 and the user chooses to "process order", those items which have been marked for production appear in a final review screen. The user then clicks "confirm order". A production order header and line items are then written to the datacenter 30. The auto-reorder function is also called to process any assemblies, sub-assemblies and raw materials needed to fill this order.

Figure 16:
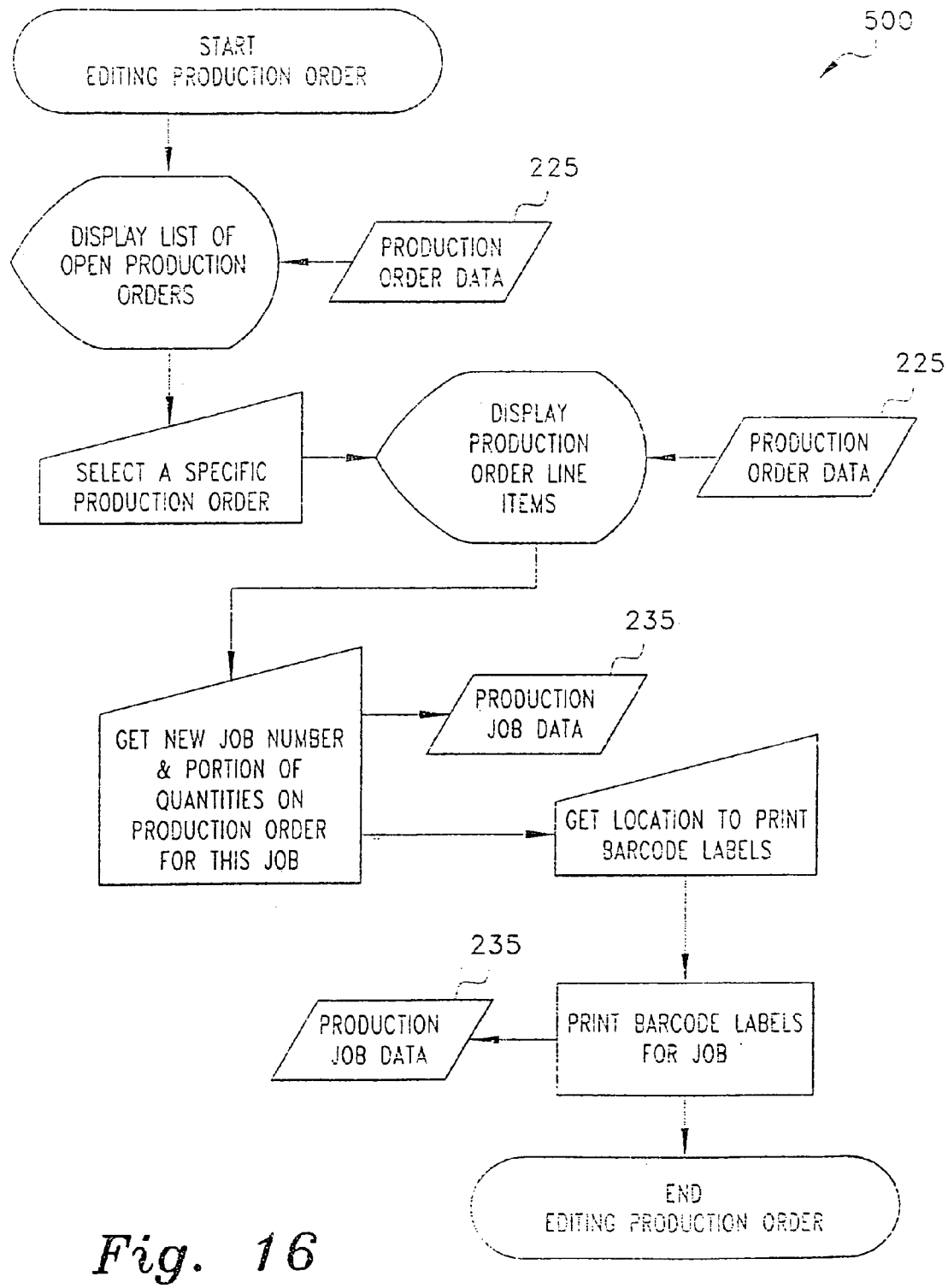
FIG. 16 is a flowchart for outlining procedures for editing a production order.

FIG. 16 depicts the editing of the production order 500. The user begins by reviewing a list of open production orders and selecting a particular one to review. Production line items are presented, along with dates and quantities already produced. The user may then enter a new production job number, date, and assign any remaining quantities of any line items to be produced. After submitting the new job, the user is asked where to print serialized barcode labels. After a location is selected, labels are printed for the job.

Figure 17:
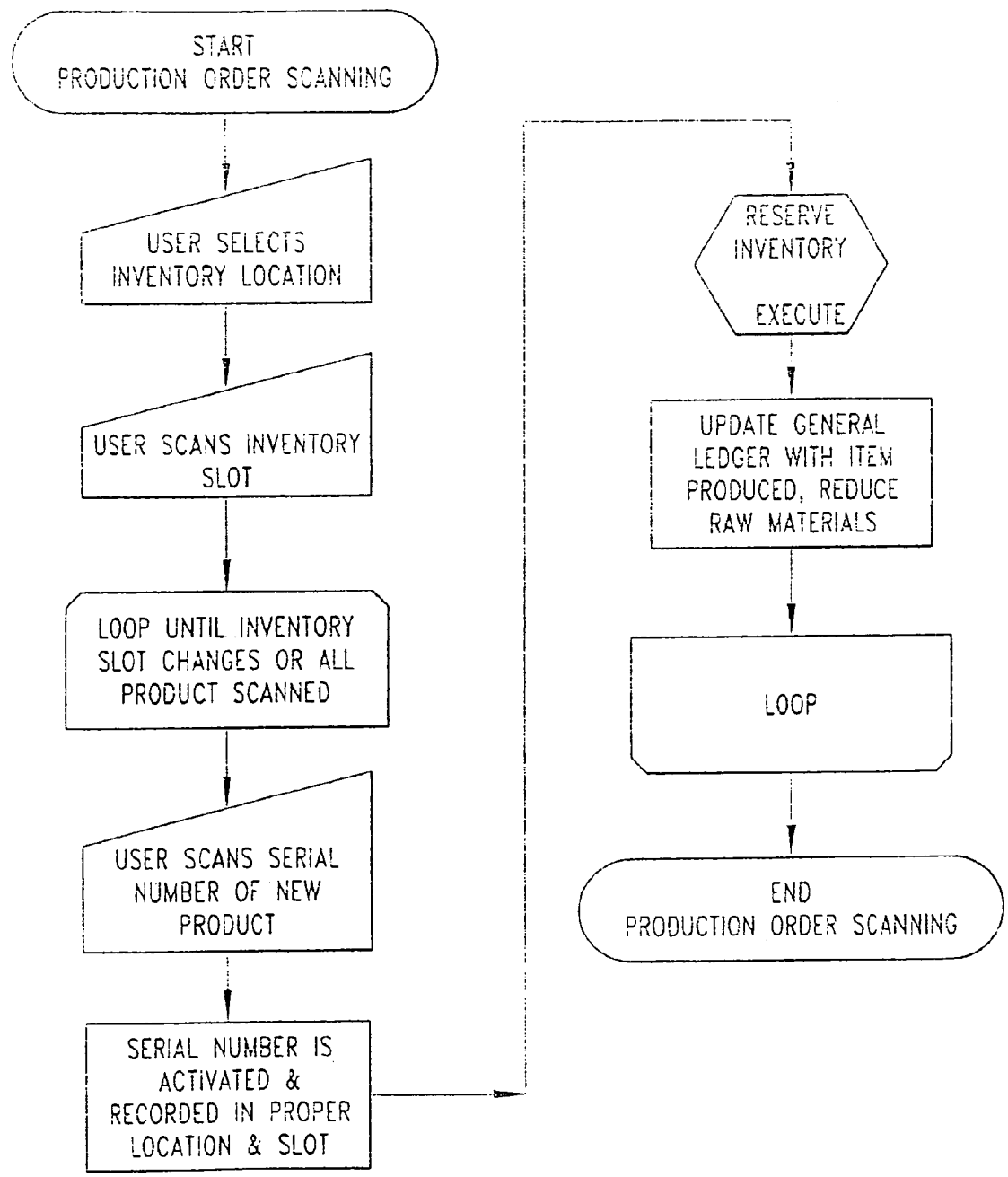
FIG. 17 is a flowchart outlining procedures for scanning a production order.

FIG. 17 depicts the production order scanning procedures 510. Using a hand held scanner, the production option is accessed. The user enters the inventory location and scans the inventory slot. While putting away newly manufactured product into the given slot, the user scans the serial number of the product to activate it into inventory. Reserve inventory executes, General Ledger entries are updated and raw material inventory is reduced.

Figure 18:
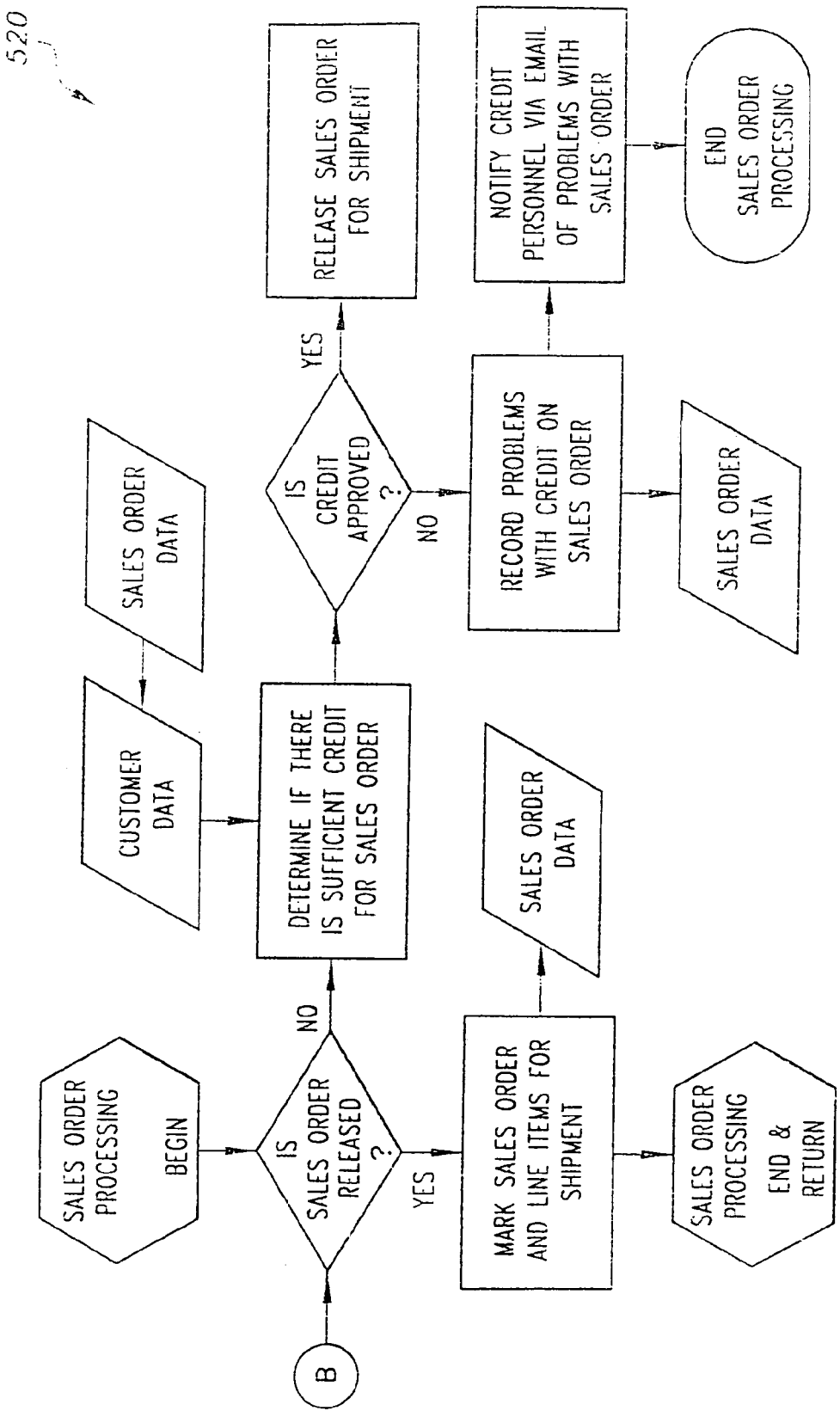
FIG. 18 is a flowchart outlining procedures for processing a sales order.

FIG. 18 is a set of internal steps for order processing 520. First, is the sales order in question released? If not, determine if there is sufficient credit available to the customer for the order. If there is, the order is approved and released for shipment and the process begins again. If credit is not approved, then the reasons are included with the notes on the order and an update is sent via e-mail to credit personnel. If the sales order is released, then the order and its line items are marked for shipment and the order can now move ahead.

If a sales order is indicated to ship complete, and all merchandise is in stock and available for shipping, the sales order is sent to inspection, for the inspection of the product to be shipped. If no inspection is required, the order will appear in deliveries to be scheduled. If all of the merchandise is not available for shipment, the sales order will show up in inspection when all merchandise is available for shipment.

If the sales order is indicated for partial shipment, and the merchandise is available for shipment, then the order will appear in inspection to be inspected. After inspection, the sales order will appear in sales orders scheduled for delivery. When a sales order is scheduled for delivery, it will be given a shipping date and go to routing to be assigned to the appropriate carrier, which is also assigned a truck number, route number and stop number.

The sales order is then released to the warehouse for loading. All shipping information is downloaded to a loader's hand held computer. The loader pulls the merchandise, scans the truck number and the serial numbers of the merchandise to be loaded. There is also an option to scan the truck number once and then load all of the merchandise, scanning only the serial numbers of the products. The loader can also choose to scan the truck number with each individual item's serial number for each individual piece of merchandise being loaded. The date, the time and the employee identification assigned to the hand held computer doing the scanning are automatically recorded. If the merchandise is delivered by a common carrier or is picked up by a dealer, the invoice is totaled on the merchandise being shipped. A copy including all SKU numbers and serial numbers are forwarded to the dealer for payment. The invoice then can serve as a bill of lading 360 for the dealer, who is then ready to receive the merchandise.

If the merchandise is delivered by company truck, once the truck is loaded, the truck driver's hand held computer is synchronized and all of the delivery information is downloaded to the hand held computer used by the loader. The invoice is sent to the receiving dealer and includes a list of the merchandise shipped, SKU numbers and serial numbers. After the merchandise is delivered and scanned to the customer, the truck driver synchronizes his hand held computer, uploading delivery information to the manufacturer's servers 70. The sales order is completed, inventory is reduced, and the shipped merchandise is charged to a customer's account.

Figure 19:
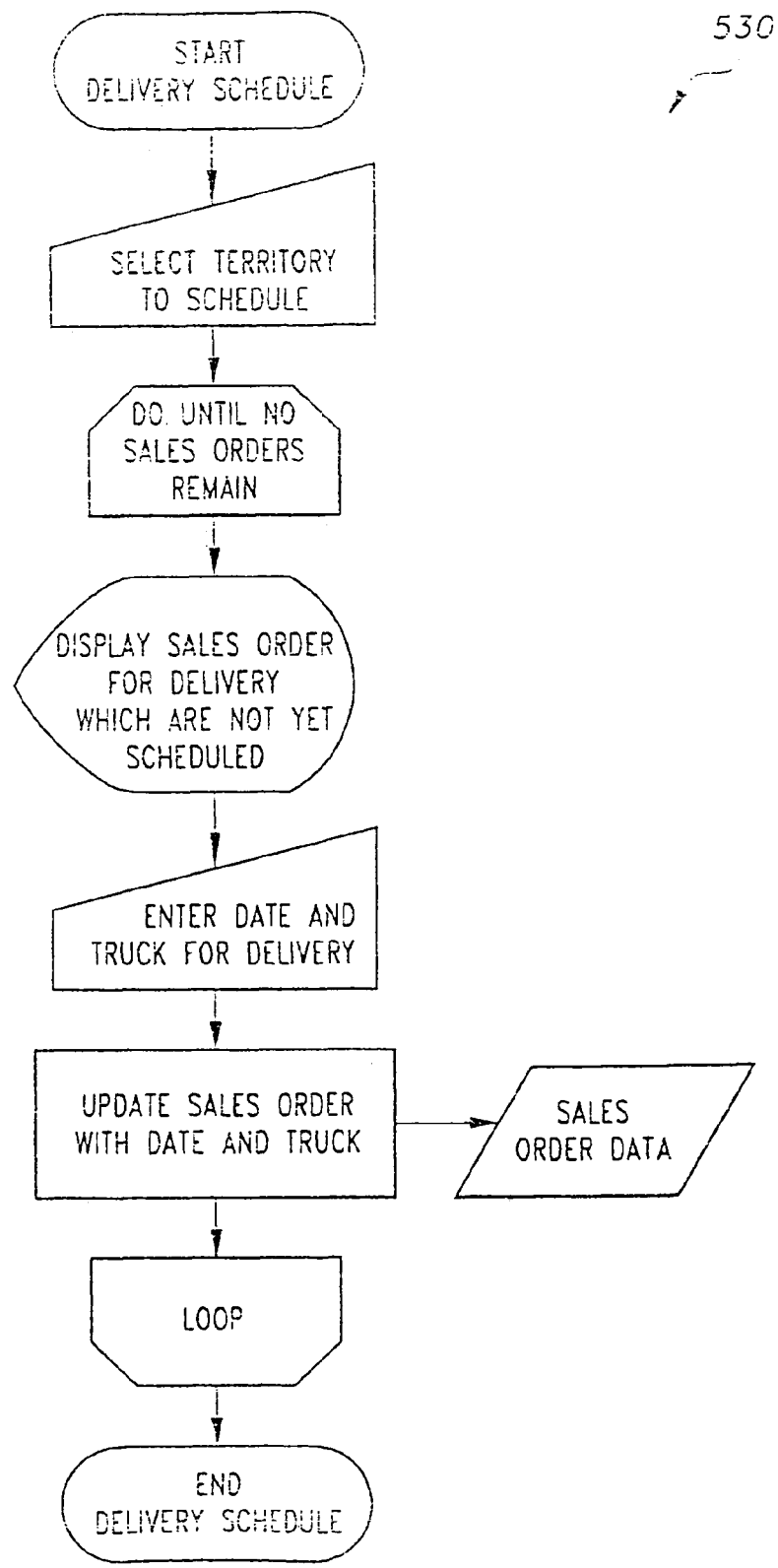
FIG. 19 is a flowchart outlining procedures for generating a delivery schedule.

FIG. 19 depicts the development of a delivery schedule 530. The user is presented with a list of delivery orders which have not been scheduled. For each order, there is a field for the delivery date and a selection for a delivery truck. User provides the values for an order on the list. The sales order data is updated and moved into the appropriate delivery route. The order is then removed from the delivery schedule list.

Figure 20:
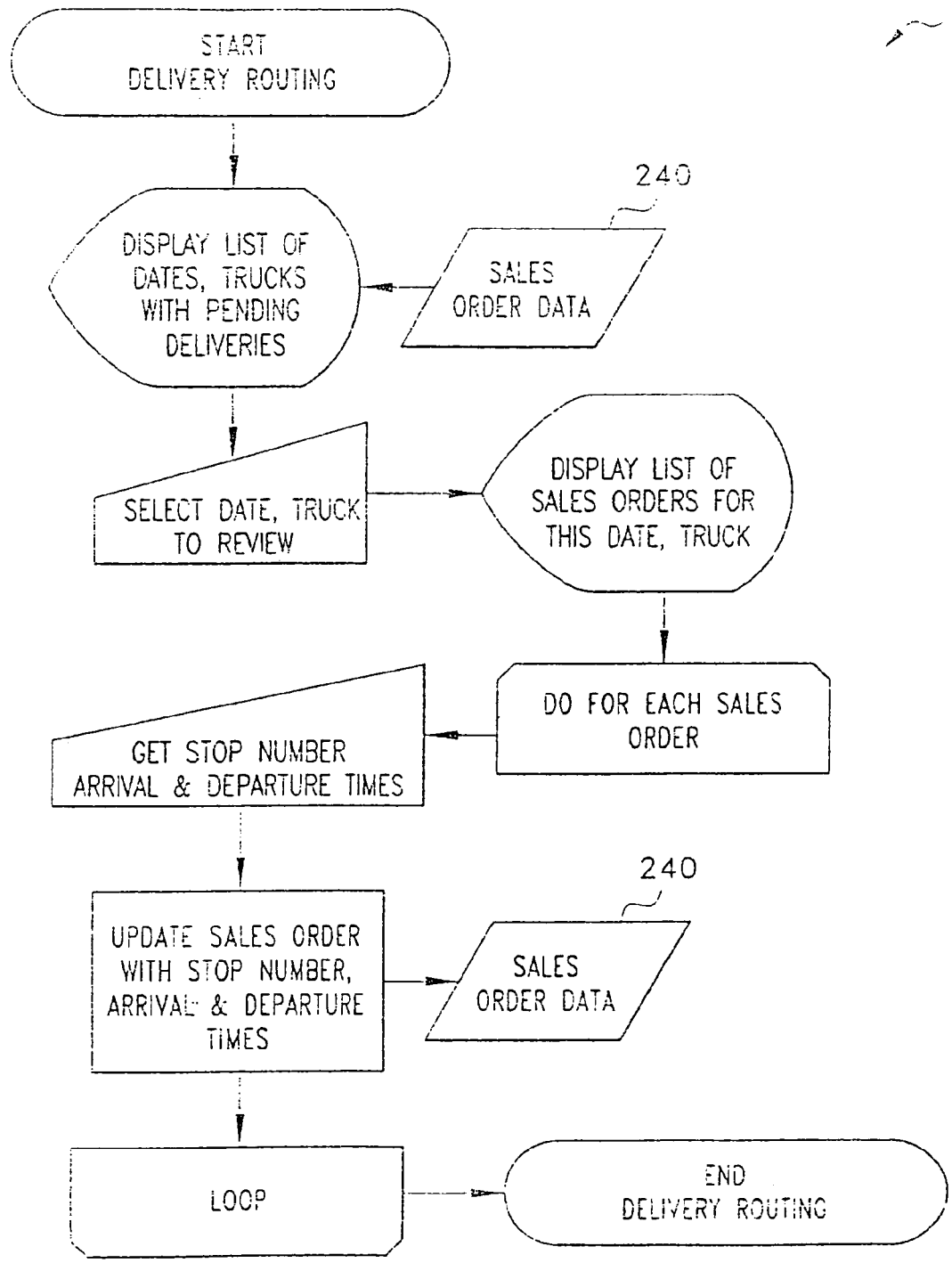
FIG. 20 is a flowchart for outlining delivery routing procedures.

FIG. 20 depicts the steps involved with the delivery routing of the final product 540. The user is presented with a list of pending delivery dates and truck numbers. A specific date and truck number is selected and the system 10 returns a list of final products on this route. Each order has fields for estimated arrival and departure times for the stop, plus a selection for a stop number. Times and stop numbers are then assigned to each final product and the entire batch is saved at once.

Figure 21:
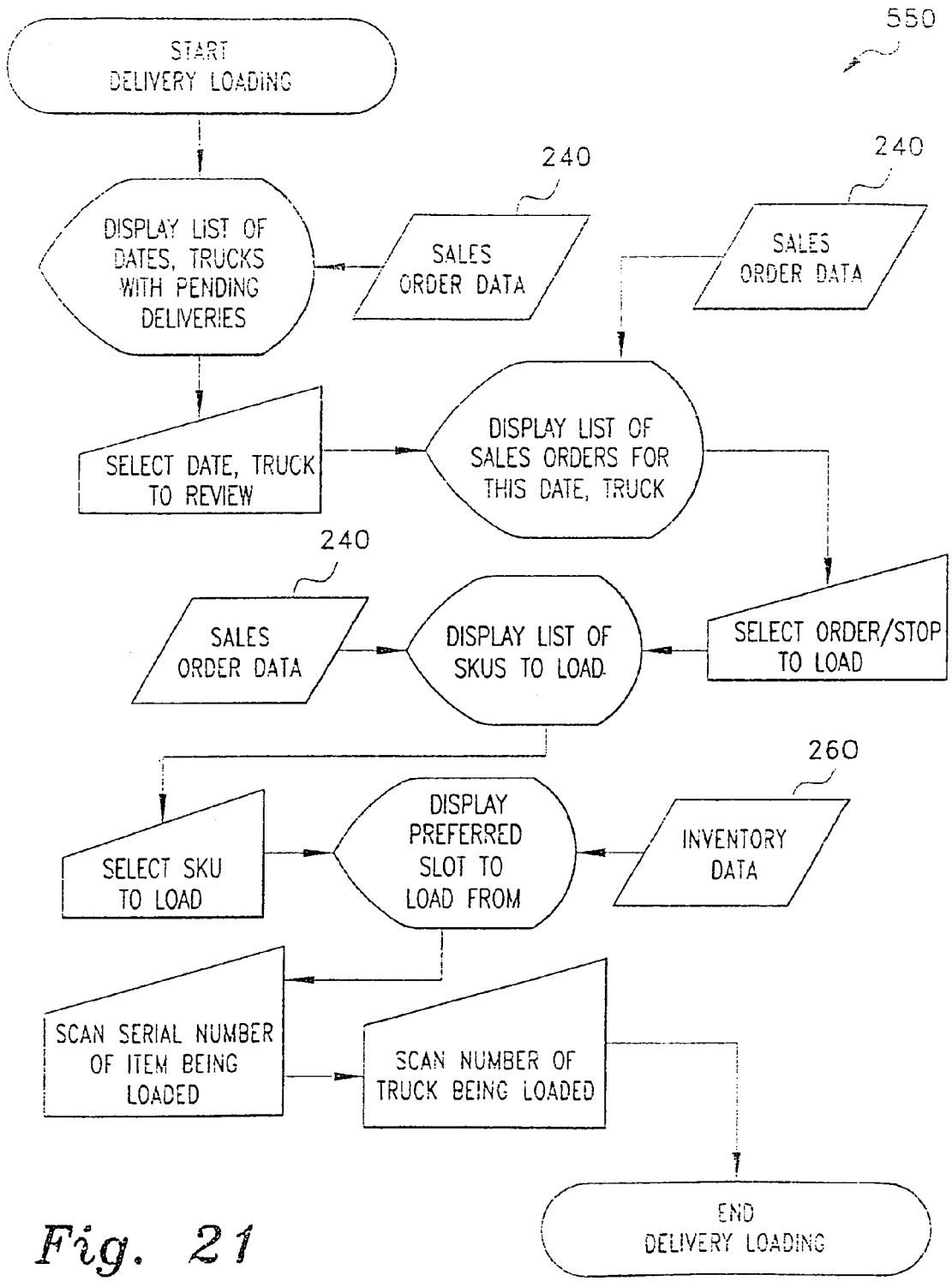
FIG. 21 is a flowchart for outlining delivery loading procedures.

FIG. 21 depicts quick delivery loading procedures 550 involved with the system 10. Using a hand held scanner, the loading function is accessed. A user is presented a list of dates and truck numbers for pending deliveries. A specific date and truck number is selected and the system 10 returns a list of sales orders for these selections, a specific sales order is selected and the system 10 returns a list of SKUs for this order. A specific final product is selected and the system 10 returns a list of SKUs for this final product. A specific SKU is selected and the system 10 returns the preferred inventory slot and location to pull the final product from.

The user scans the serial number of the item being loaded. The serial number is verified and the user is asked to scan the truck item that is being loaded for verification. The quantity of this SKU needed is reduced by one. This repeats until all SKUs have been loaded. It then repeats for each final product and then returns to the date and truck number listing.

Figure 22:
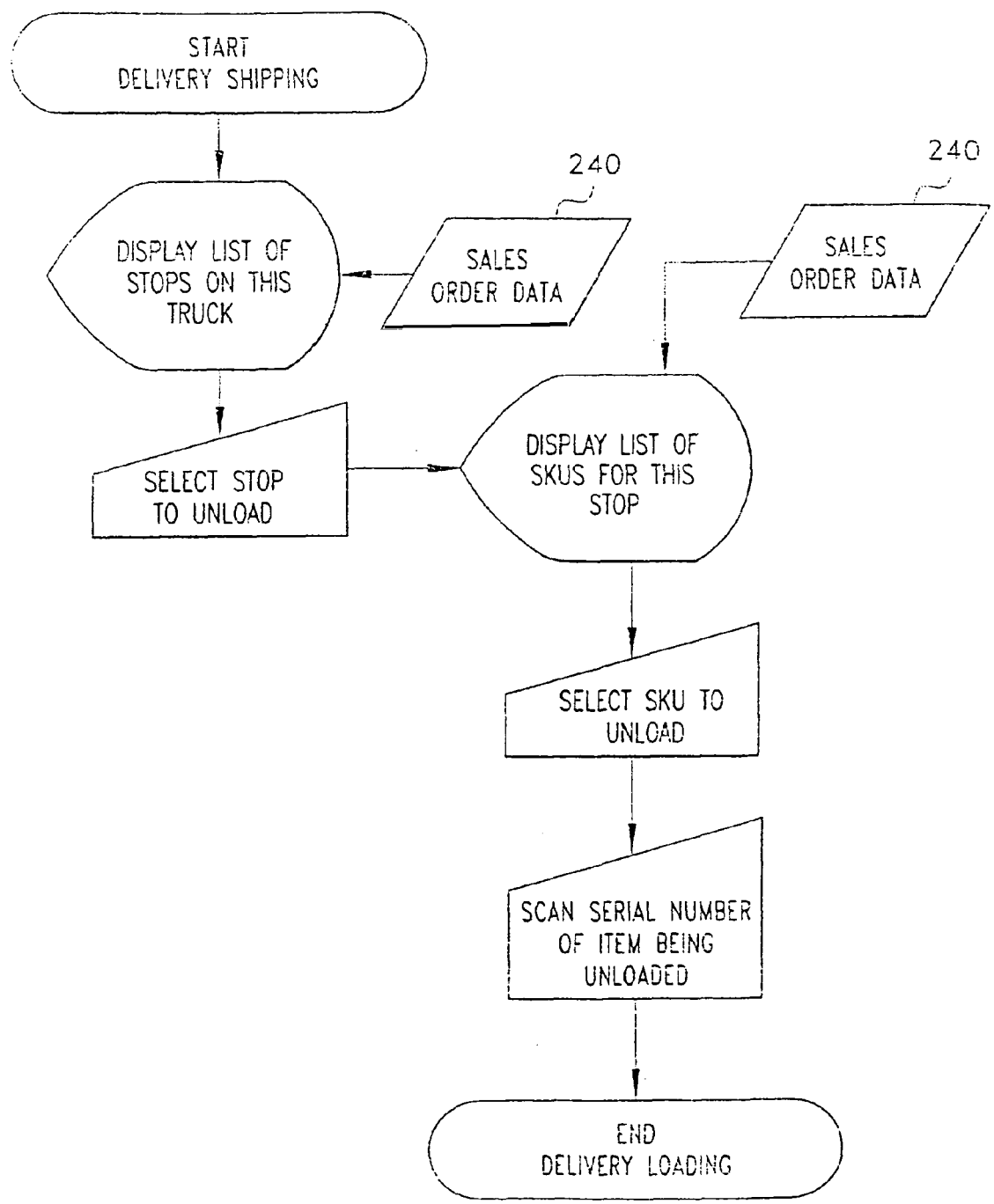
FIG. 22 is a flowchart for outlining delivery shipping procedures.

FIG. 22 depicts the delivery shipping procedures 560 involved with the system 10. Using a hand held scanner, batch-mode software is accessed and the delivery shipping is selected. User is presented a list of stops for their current truck number and date. A stop to unload is selected. A list of SKUs for this stop is presented and one is selected to unload. The user scans the serial number of one of the final products of this SKU. The serial number is verified and the loaded quantity is reduced by one.

Figure 23A:
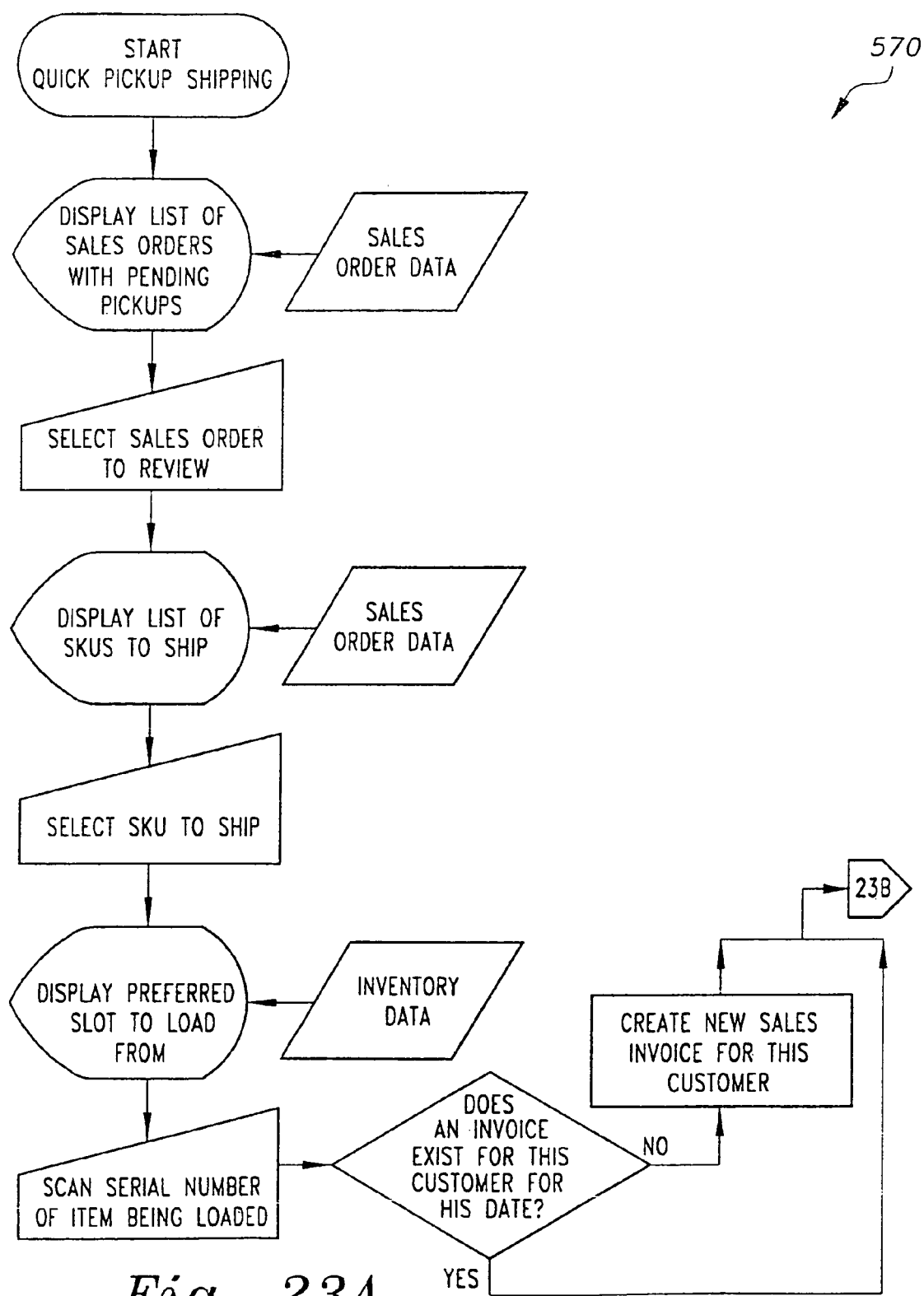
FIGS. 23A-23F are a flowchart for outlining pickup shipping procedures.

FIG. 23A depicts quick pickup procedures where a user selects quick pickup from a handheld menu 570. A list of sales orders with pending and uninspected pickups are presented. User selects an order and a list of SKUs to be shipped is presented. User selects an order to ship and a list of SKUs to be shipped is presented. User then selects a SKU. A list of inventory locations, slots and quantities are presented for the user to choose from. User pulls the item from the selected slot and scans its serial number for shipment. Appropriate General Ledger entries are made and the serial number is removed from inventory. The salesperson's commission rate is determined for the commission class of the SKU shipped, and the total of that rate times the amount of the item shipped is credited to the salesperson's draw account.

Figure 23B:
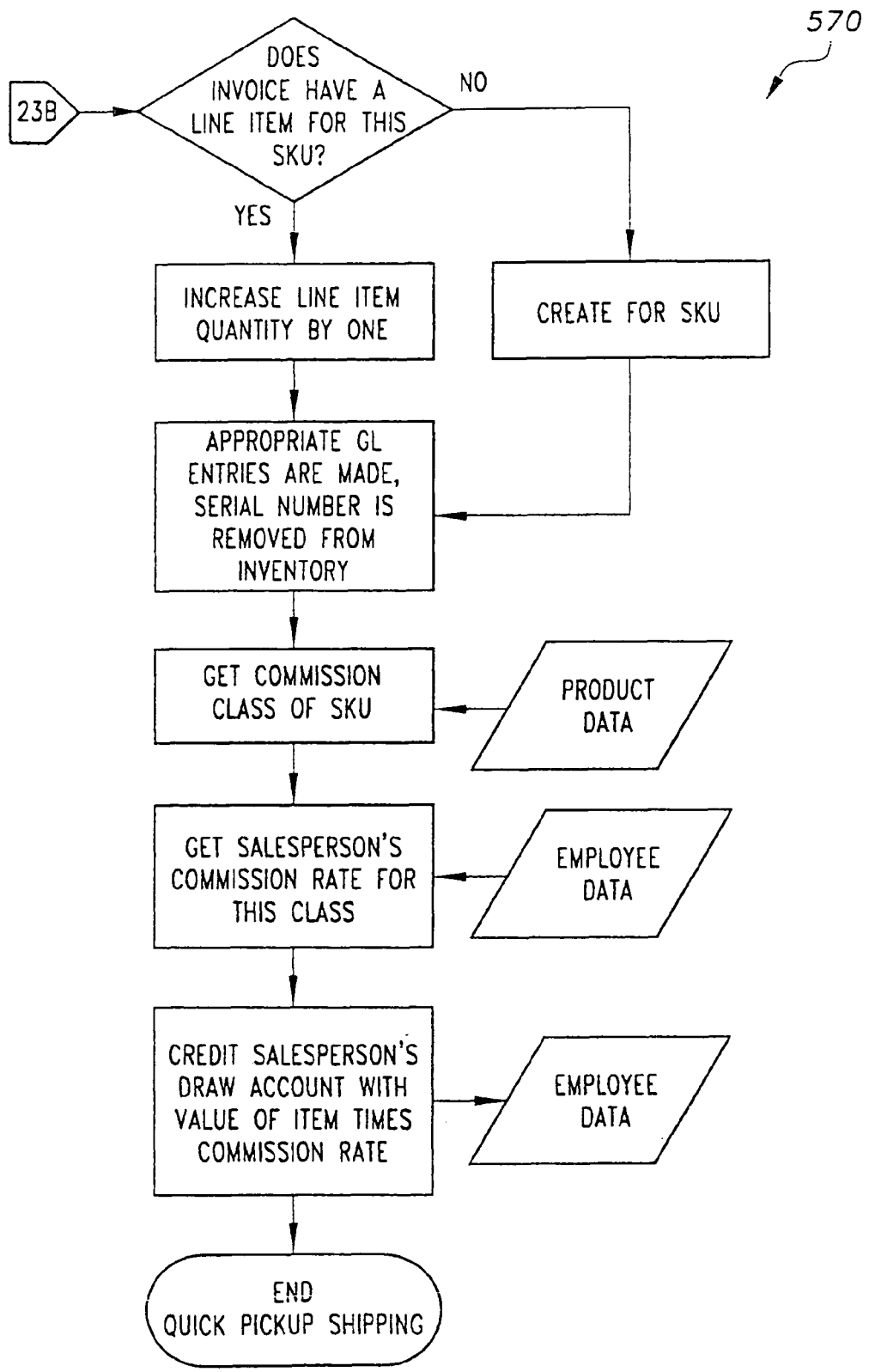

FIG. 23B depicts pickup inspection procedures. User selects pickup inspection from a hand held menu. A list of sales orders with pending and uninspected pickups are presented. User selects an order to pull. A list of SKUs to be pulled is presented. User then selects a SKU. A list of inventory locations, slots and quantities are presented for the user to choose from. User pulls the item from the selected slot and scans its serial number. User then scans the slot where the item is placed for inspection.

Figure 23C:
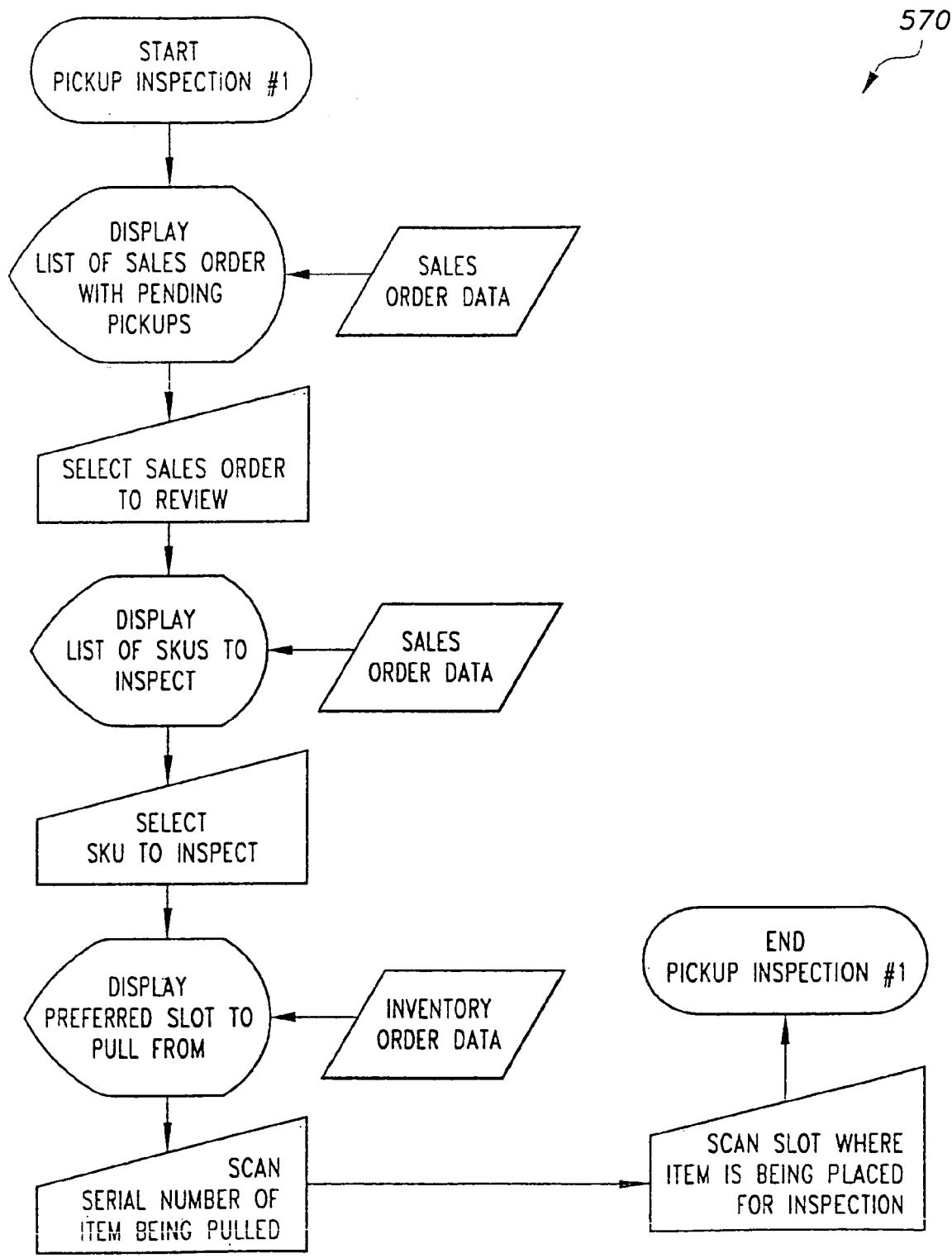
Figure 23D:
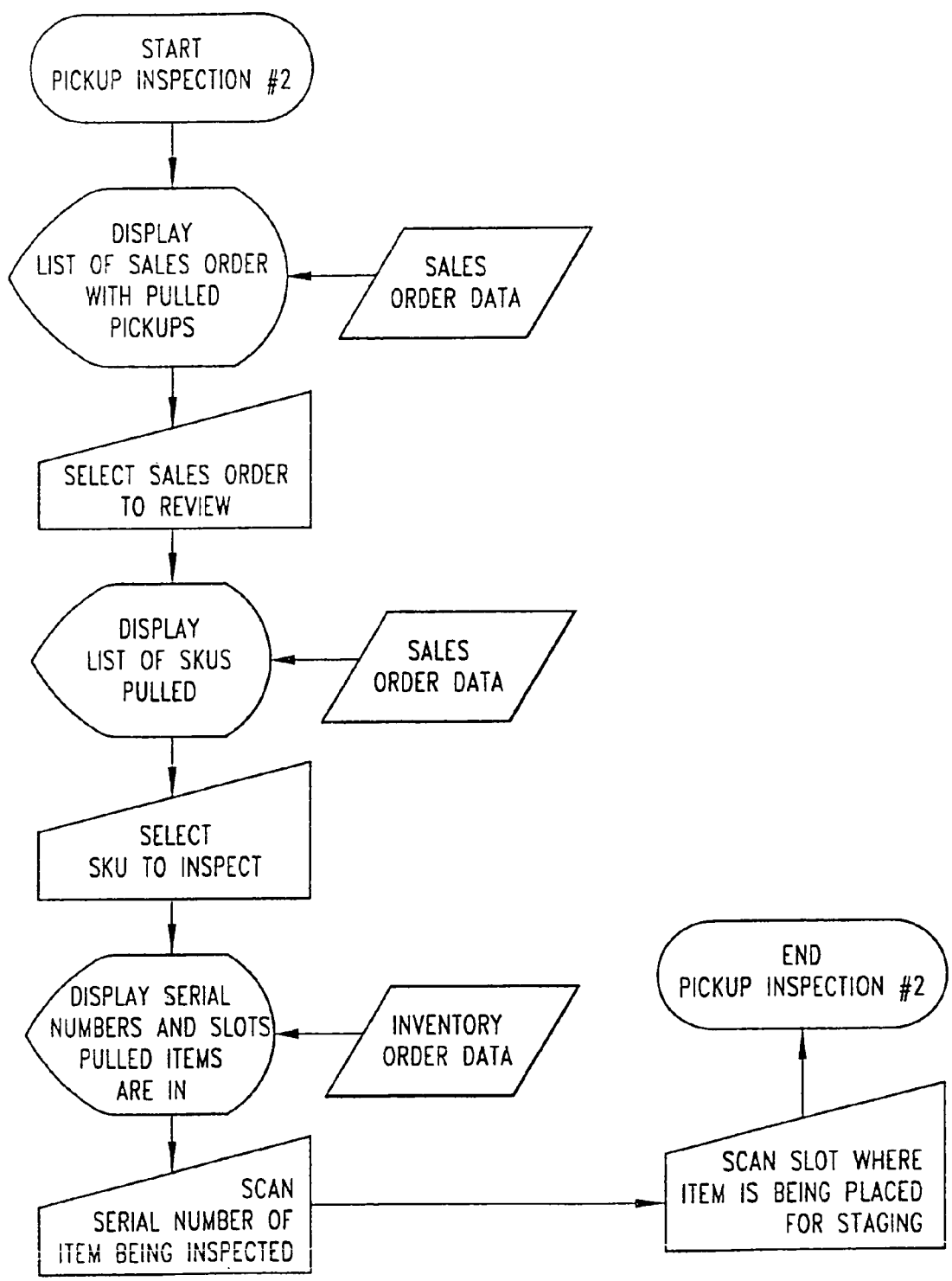

FIGS. 23C-23D depict pickup inspection completion procedures. User selects pickup inspection completion from a hand held menu. A list of sales orders with pulled pickups are presented. User then selects a SKU. A list of inventory locations, slots and serial numbers are presented for the user to choose from. User inspects a particular item and scans its serial number. User then scans the slot where the item is placed for staging.

Figure 23E:
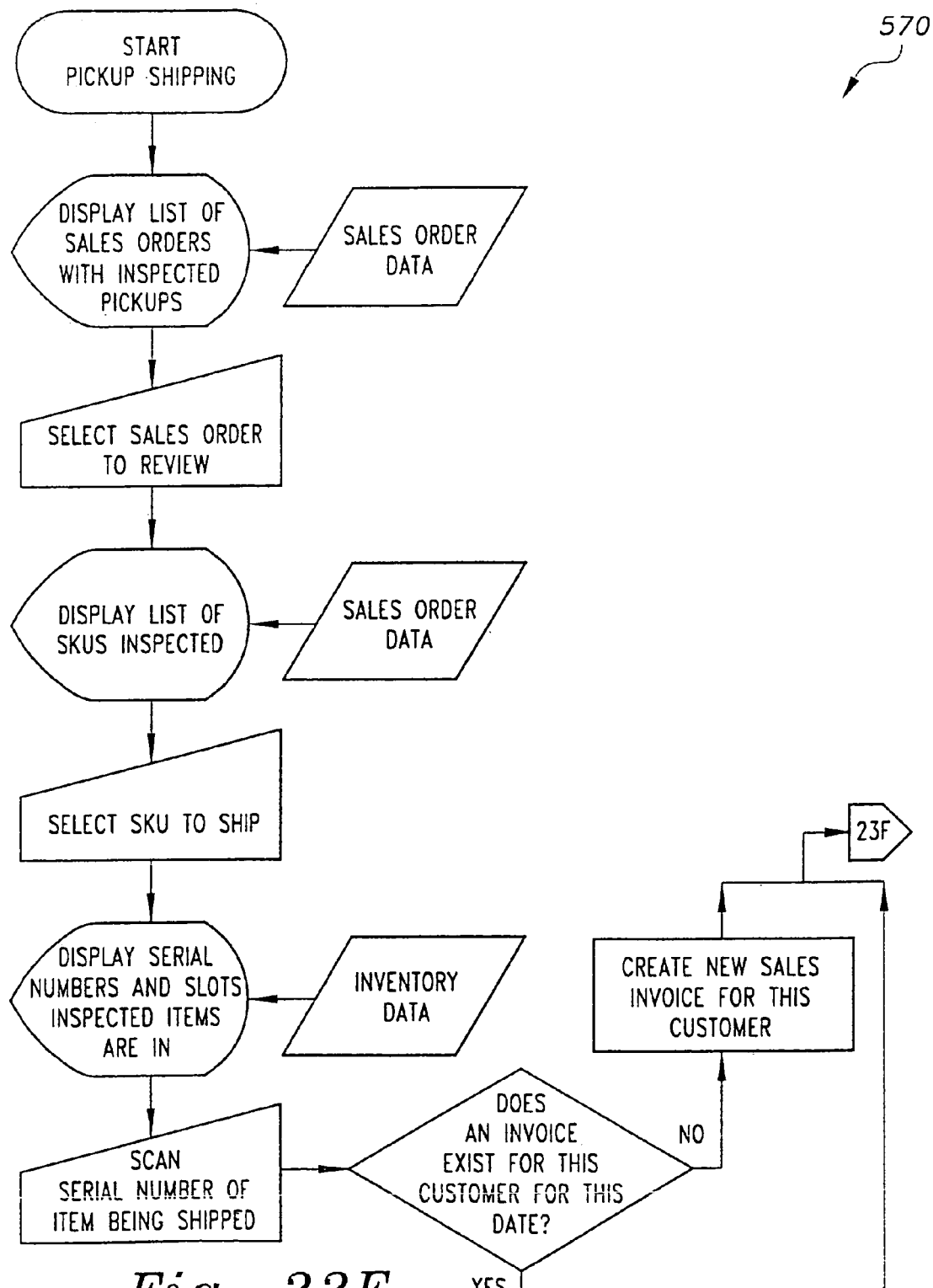
Figure 23F:
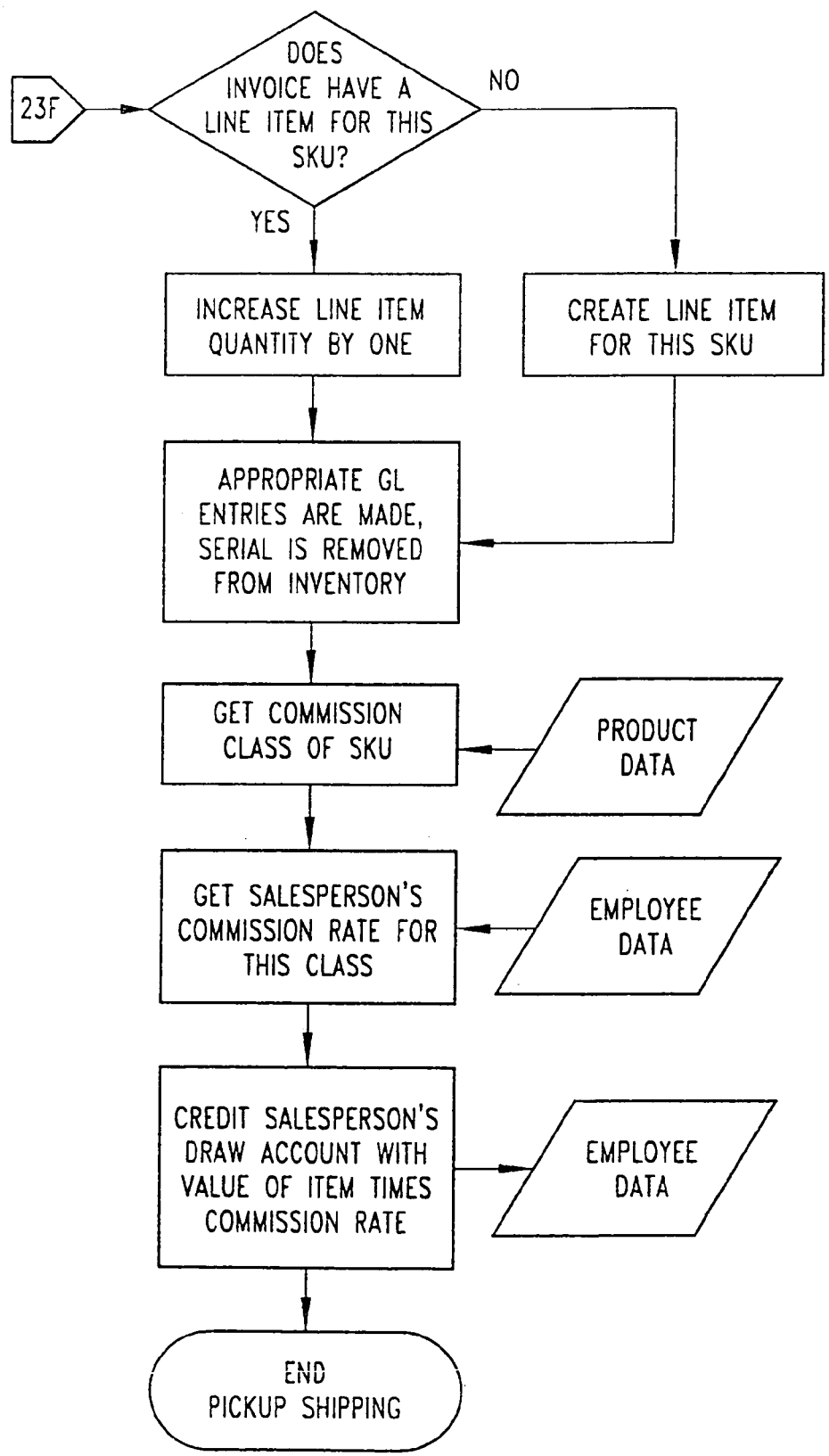

FIGS. 23E-23F depict pickup shipping procedures. User selects pickup shipping from a hand held menu. A list of sales orders 410 with inspected pickups are presented. User selects a SKU and a list of inventory locations, slots and serials numbers are presented for the user to choose from. User pulls the item from the selected slot and scans its serial number for shipment.

The shipped item is included in a sales invoice for the customer it was delivered to. First, a check is made to see if the customer has an open invoice for the shipping date. If none exists, one is created. Next, a check is made to see if there is a line item on the invoice for the SKU which was delivered. If none exists, one is created, otherwise the quantity of the line is increased by one. Appropriate General Ledger entries are made and the serial number is removed from inventory. The salesperson's commission rate is determined for the commission class of the SKU shipped and the total of that rate times the amount of the item shipped is credited to the salesperson's draw account.

Figure 24:
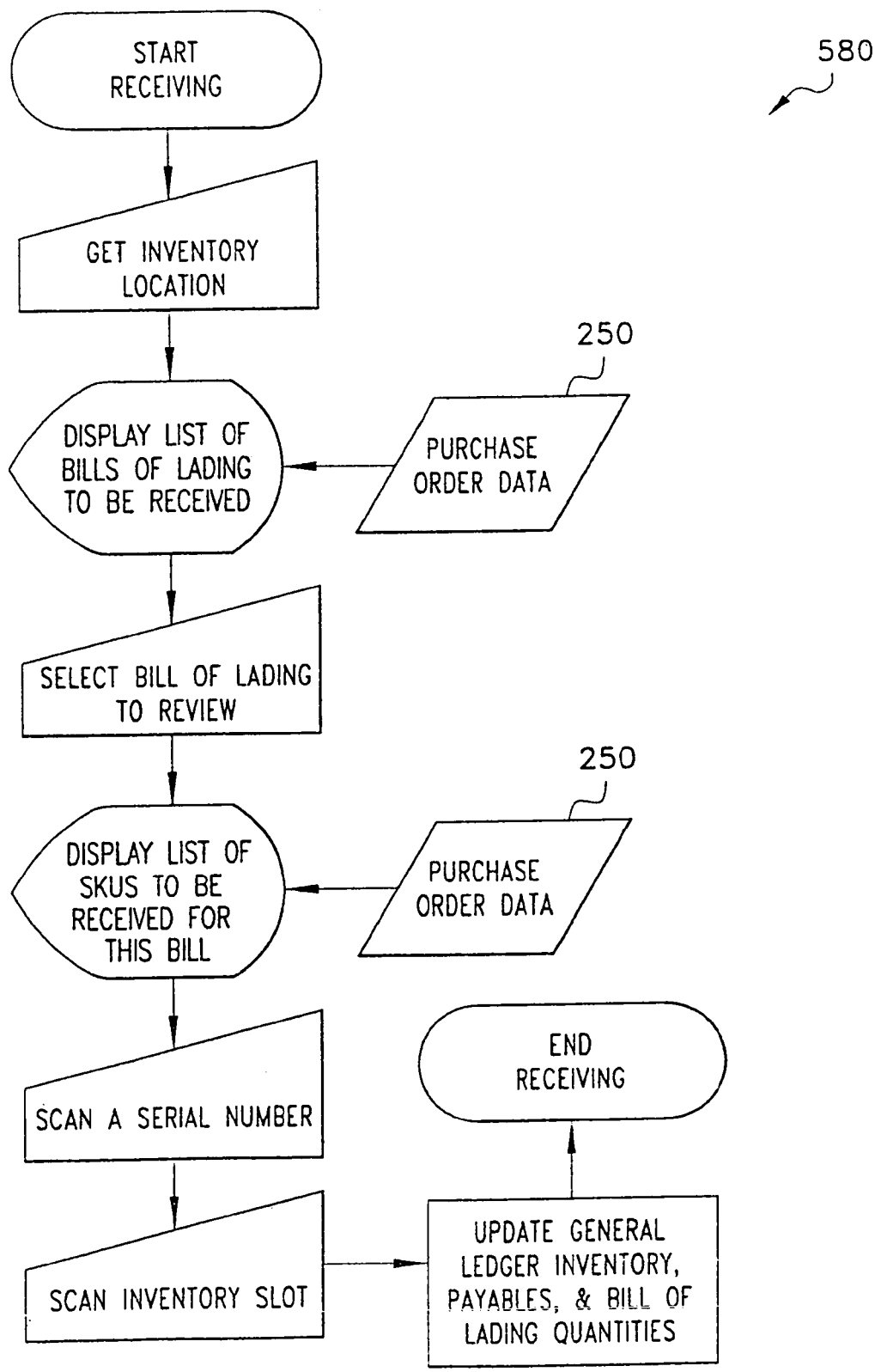
FIG. 24 is a flowchart for outlining receiving procedures.

FIG. 24 depicts the receiving procedures involved with the system 10,580. Using a hand held scanner, the receiving function is accessed. The user is asked to enter the inventory location and a list of bills of lading 360 to be received is displayed. A specific bill of lading 360 is selected and a list of SKUs for this bill is returned. The user scans the serial number of one of the final products to be received. User is then asked to scan the inventory slot that the final product is put into. General Ledger entries are updated for inventory and accounts payable and the quantity of this SKU on the current bill of lading 360 is reduced by one. The display of the SKUs for this bill of lading 360 is repeated.

The functions of the system 10 can also be utilized by salespersons on a retail sales floor. Each salesperson should have his or her own hand held computer, when working customers on the sales floor. By scanning the SKU number of a product, the hand held computer will display all information about the product, including the construction price, the weight, the cubic feet, the finish, the color, the warrantee and the availability of the product. This prevents the salesperson from having to leave the customer to look up information to answer a consumer's question.

When working with customers on the sales floor, a salesperson can note on their palm pilot computer any items the customer is interested in and can also place items on a sales order by simply scanning and clicking. When finished, the customer's information is entered, the sales order is produced and e-mailed to the customer's e-mail address. A copy can also be printed and given to the customer on the spot if desired.

The sales order then goes for credit approval. If the credit department approves the order, it is released to the warehouse for inspection. The sales order is then inspected and SKU numbers and serial numbers are scanned and additional information such as the time and date of the inspection and the person who did the inspection are also added.

The sales order then goes to be scheduled. The sales order is given a delivery date and truck number. The order then goes to delivery routing, where it is given a stop number and estimated times of arrival and departure. Only items that were previously inspected can be loaded. If other items are scanned to be loaded, the palm pilot computer will indicate if there is no record of that particular item.

If an order is being shipped by common carrier or picked up by the customer, when the sales order is scanned out, the bill of laden 360 along with the serial numbers of the merchandise will be sent to the customer's e-mail with expected time of delivery. The sales order will be converted into an invoice and inventory will be reduced and charged to the customers account.

If the sales order is shipped by company truck, the bill of laden 360 will be sent to customers via e-mail with an approximate time of delivery. The sales order will wait for uploading of deliveries from a delivery truck hand held computer. When deliveries are completed and uploaded, sales orders will be converted into invoices, invoicing only items that were successfully delivered. Inventory will be reduced and sold items will be placed on a purchase order for reordering, and a copy of the invoice can be e-mailed or snail mailed to customers.

All of this takes place by pointing and clicking on a computer. The data entries are reduced to entering ordered quantities, new customer information and specific notes only. The only other paperwork that is required is the printing of the barcode labels.

All information from all manufacturers, manufacturer's sales representatives and retail dealers will flow through the system 10. The system's 10 hardware components, software components and electronic catalogs will be provided to all manufacturers, dealers and distributors and will be kept current at all times.

Figure 25A:
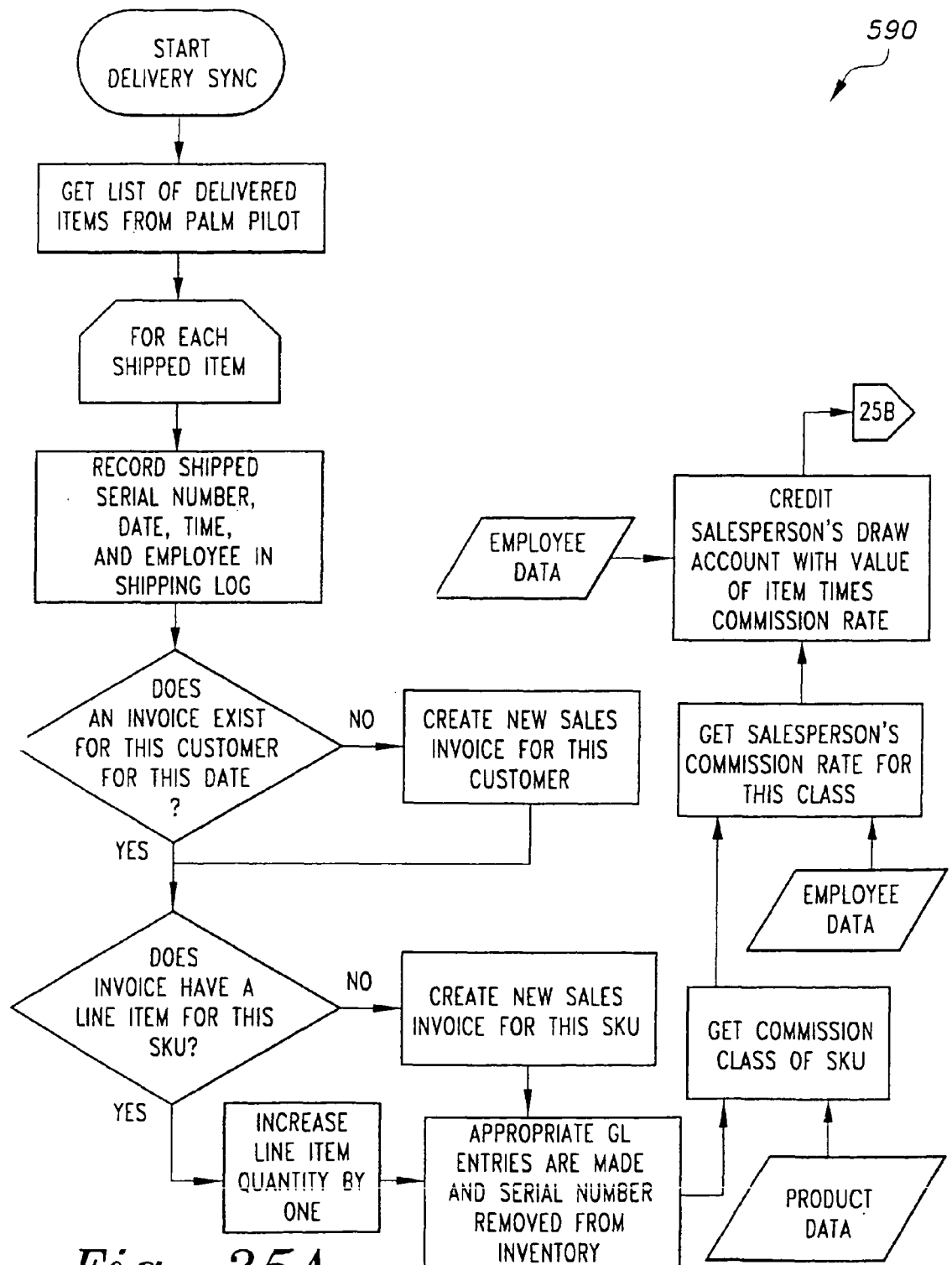
FIGS. 25A-25B are a flowchart for outlining delivery synchronization procedures.
Figure 25B:
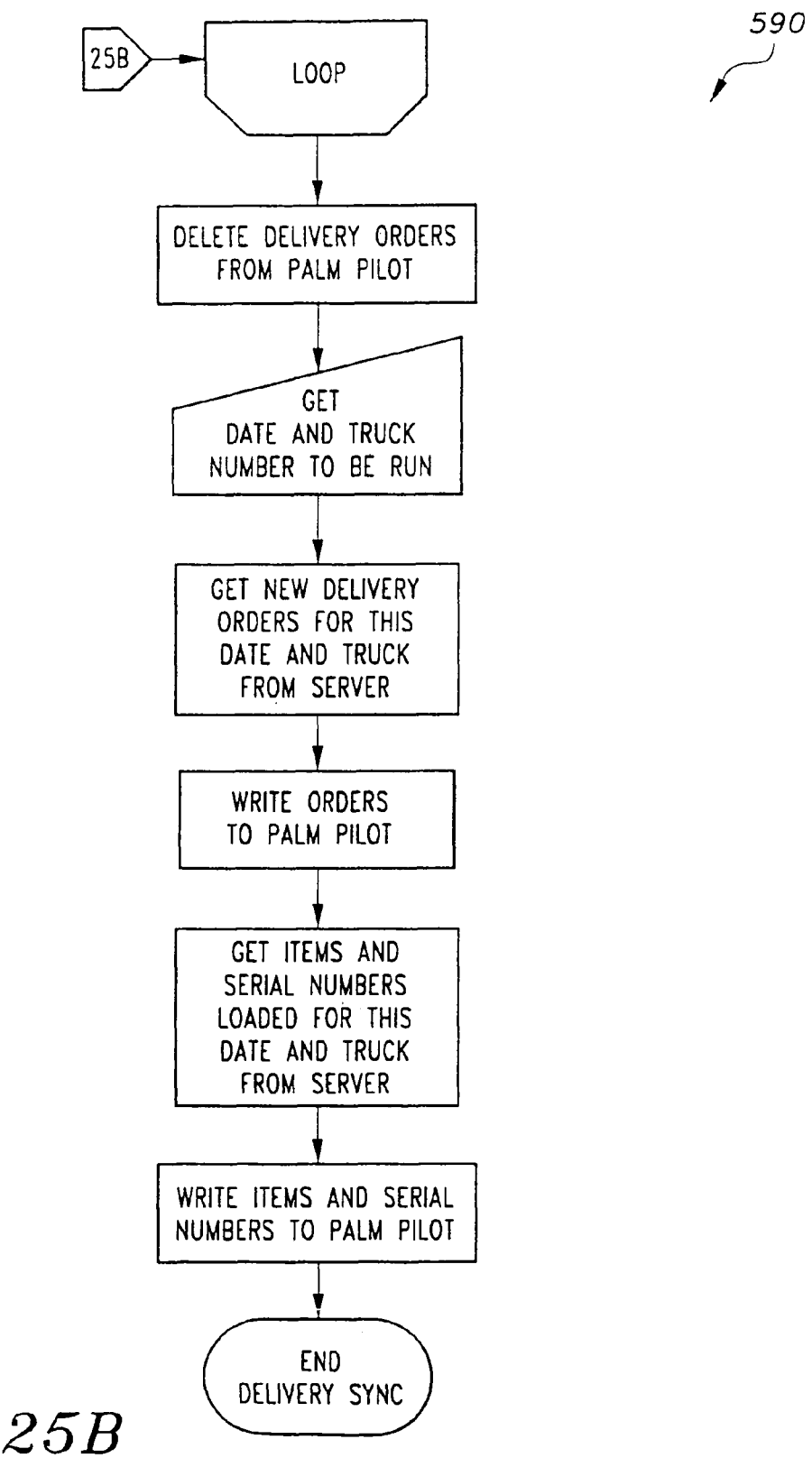

As depicted in FIGS. 25A-25B, hand held computer files are accessed and a list of delivered items is retrieved 590. Each delivered item is then recorded in the shipping log. The recorded data includes the serial number, date, time and employee. In addition, the shipped item is included in a sales invoice for the customer it was delivered to. First, a check is made to see if the customer has an open invoice for the shipping date. If none exists, one is created. Next a check is made to see if there is a line item on the invoice for the SKU which was delivered. If none exists, one is created, otherwise the quantity of the line is increased by one. Appropriate General Ledger entries are then made and the serial number removed from inventory.

The salesperson's commission rate is determined for the commission class of the SKU shipped and the total of that rate times the amount of the item shipped is credited to the salesperson's draw account. After all delivered items have been processed, all delivery information is deleted from the hand held computer. Using a delivery date and truck number provided by the user, a list of delivery orders matching those criteria are obtained from the server 60 and copied to the hand held computer. Then, a list of loaded merchandise for those orders is also obtained from the server 60 and copied to the hand held computer.

Figure 26:
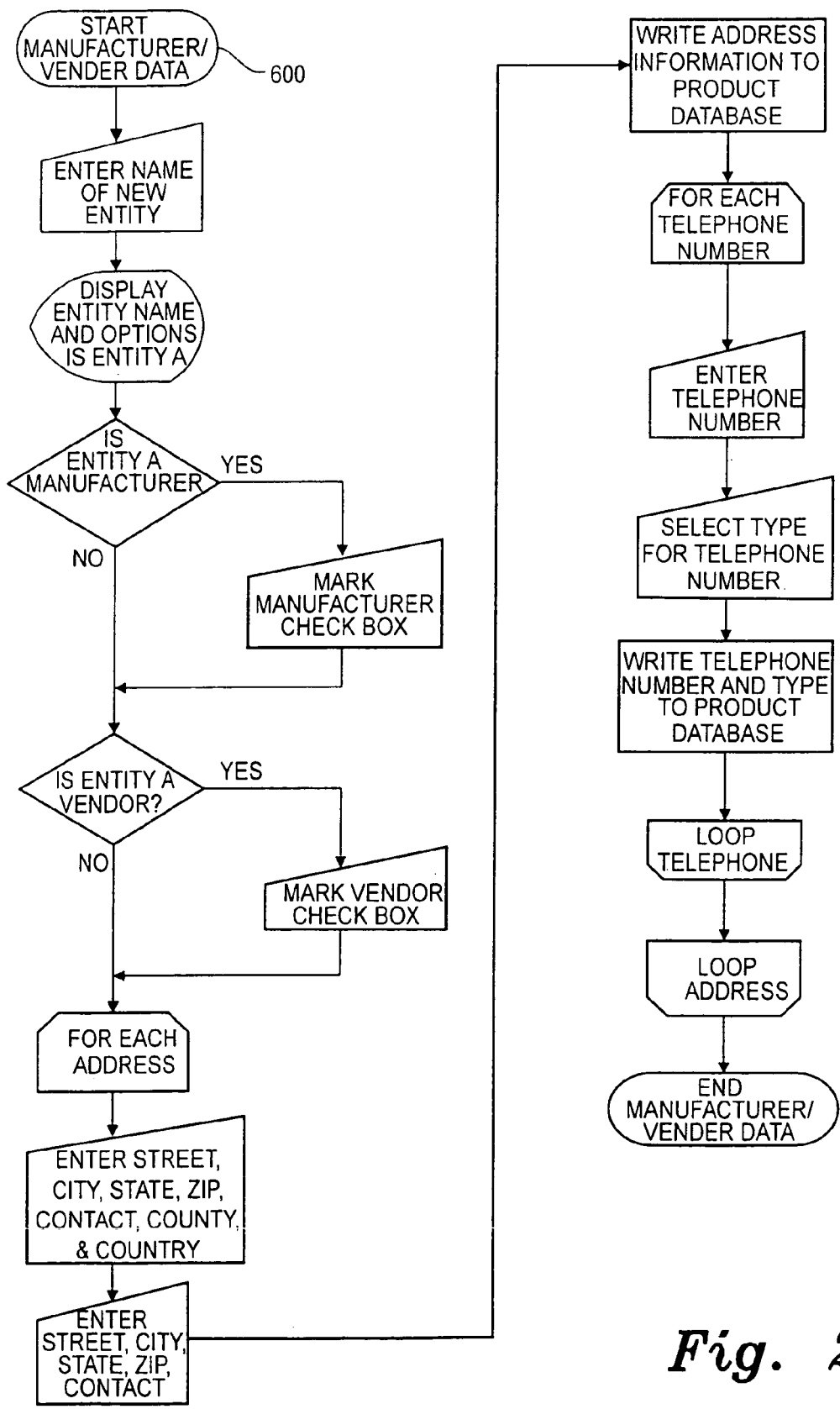
FIG. 26 is a flowchart for outlining manufacturer and vendor data entry information.

As depicted in FIG. 26, data is entered on a manufacturer or vendor by first entering the name of the entity 600. Next, a user must set if the entity is a manufacturer, vendor or both. The user may then enter a plurality of addresses for the entity. The addresses consist of a short description, street, state, city and zip code. Each address may also have a number of telephone numbers included as well. Telephone numbers are also entered along with an indication of the type of telephone being used (business, home, mobile, wireless, etc.).

Figure 27:
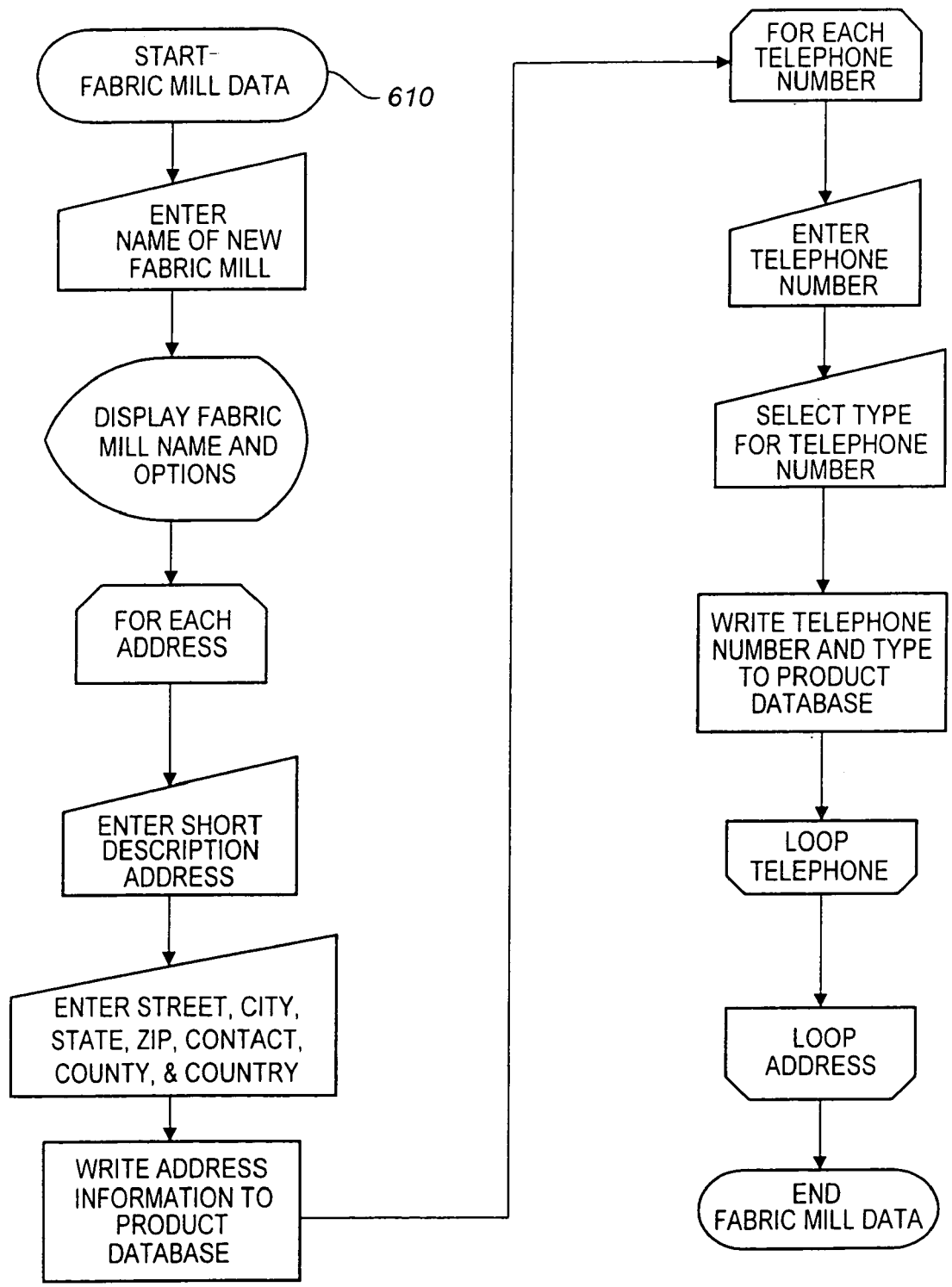
FIG. 27 is a flowchart for obtaining fabric mill data.

As depicted in FIG. 27, entering data on a fabric mill is accomplished by first entering the name of the mill 610. The user may then enter a plurality of addresses for the fabric mill. The addresses consist of a short description, street, state, city and zip code. Each address may also have a number of telephone numbers included as well. Telephone numbers are also entered along with an indication of the type of telephone being used (business, home, mobile, wireless, etc.).

Figure 28:
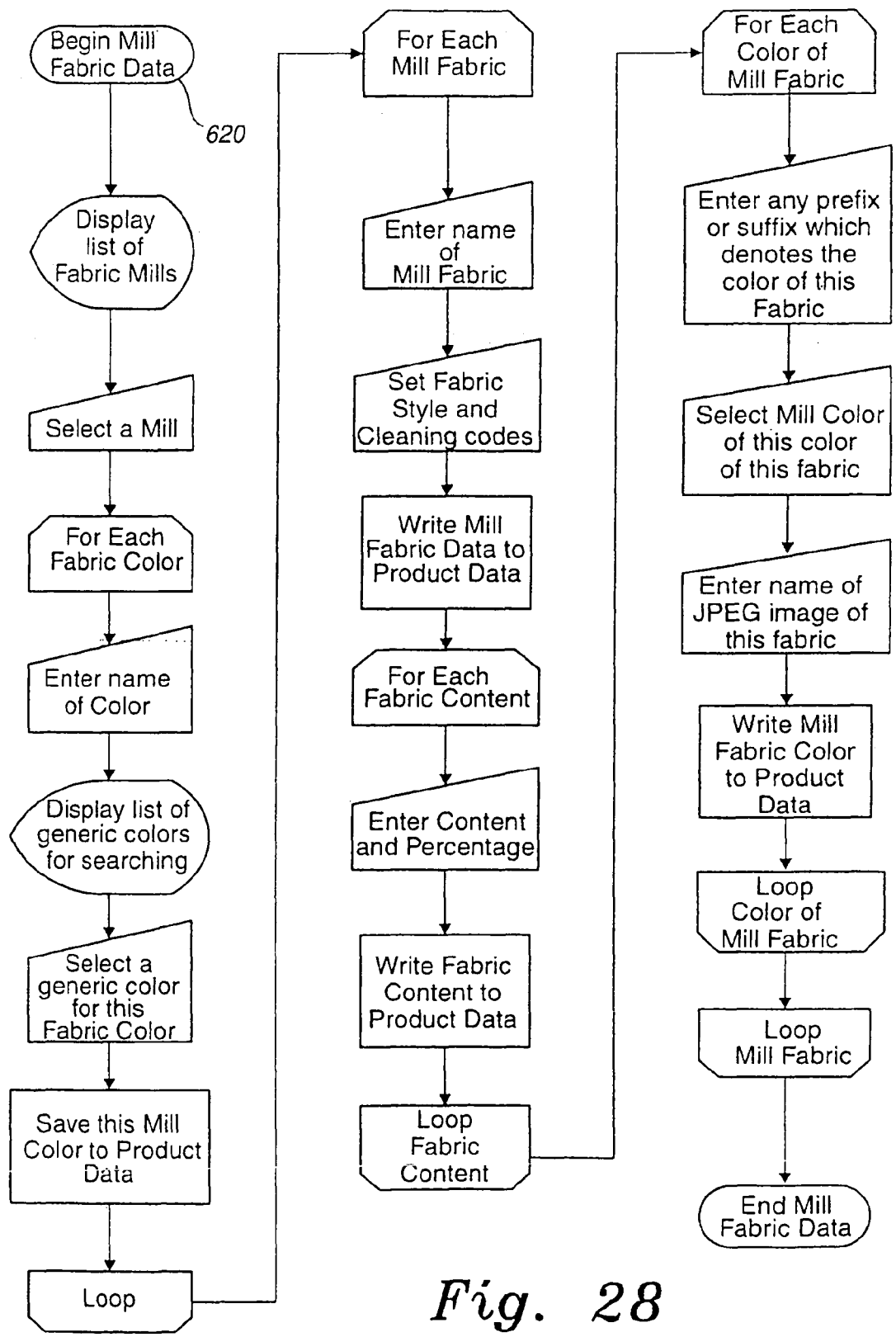
FIG. 28 is a flowchart for obtaining mill fabric data.

As depicted in FIG. 28, a particular mill is selected from a list 620. Then, each fabric color the mill uses is entered using its name and a selection of a generic search color is done. Once the fabric colors are entered, the base information (without regard for color) on each fabric is entered. Generally this information consists of the name of the fabric, style and cleaning code. The percentage contents of the fabric are also entered. Then, each color of the base fabric is entered by providing any prefix or suffix which is applied to the base fabric name to denote the color. The name of the JPEG file of the fabric is also entered, as is the selection of a fabric color from the previously provided options.

Figure 29:
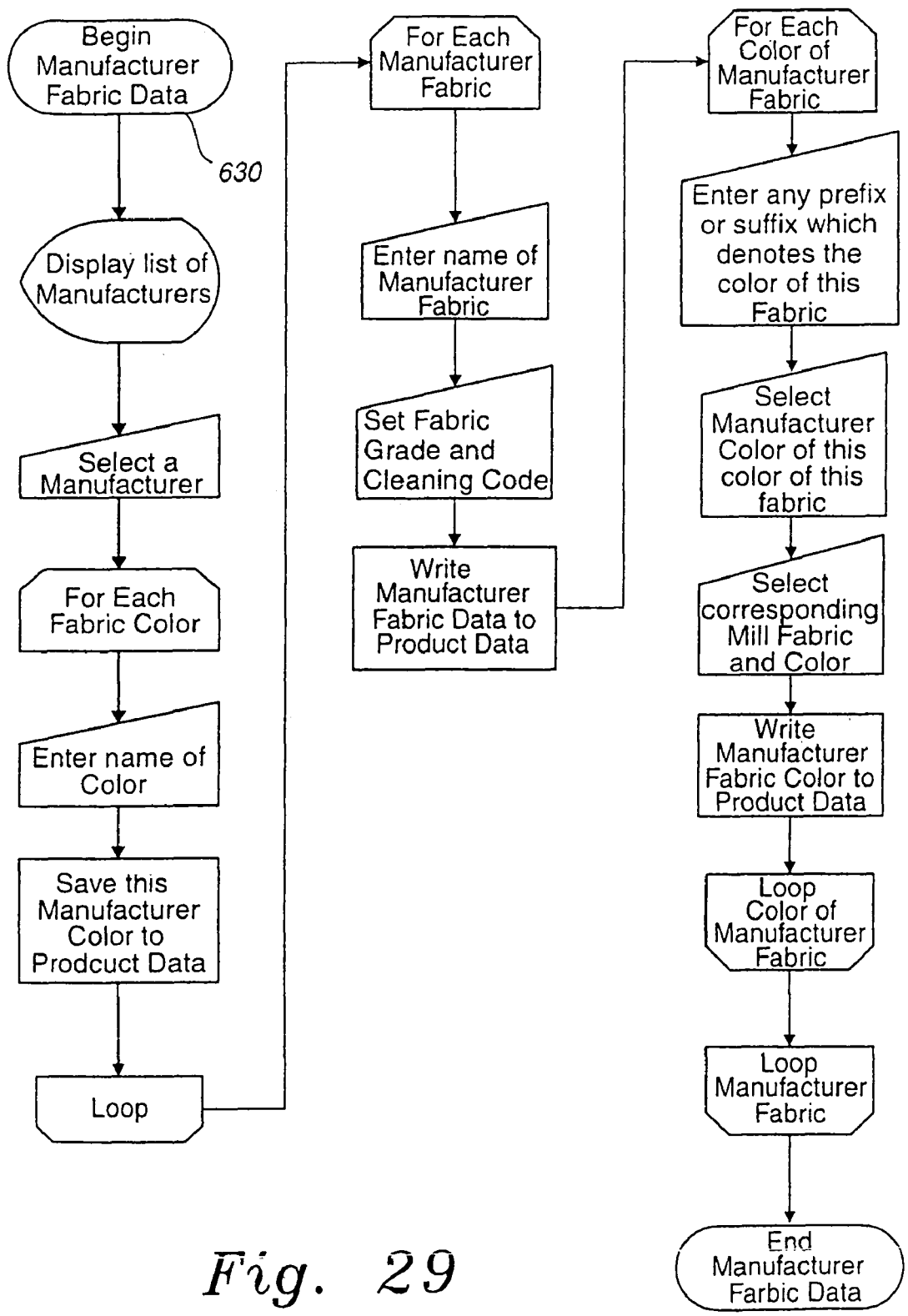
FIG. 29 is a flowchart for obtaining manufacturer fabric data.
Figure 30:
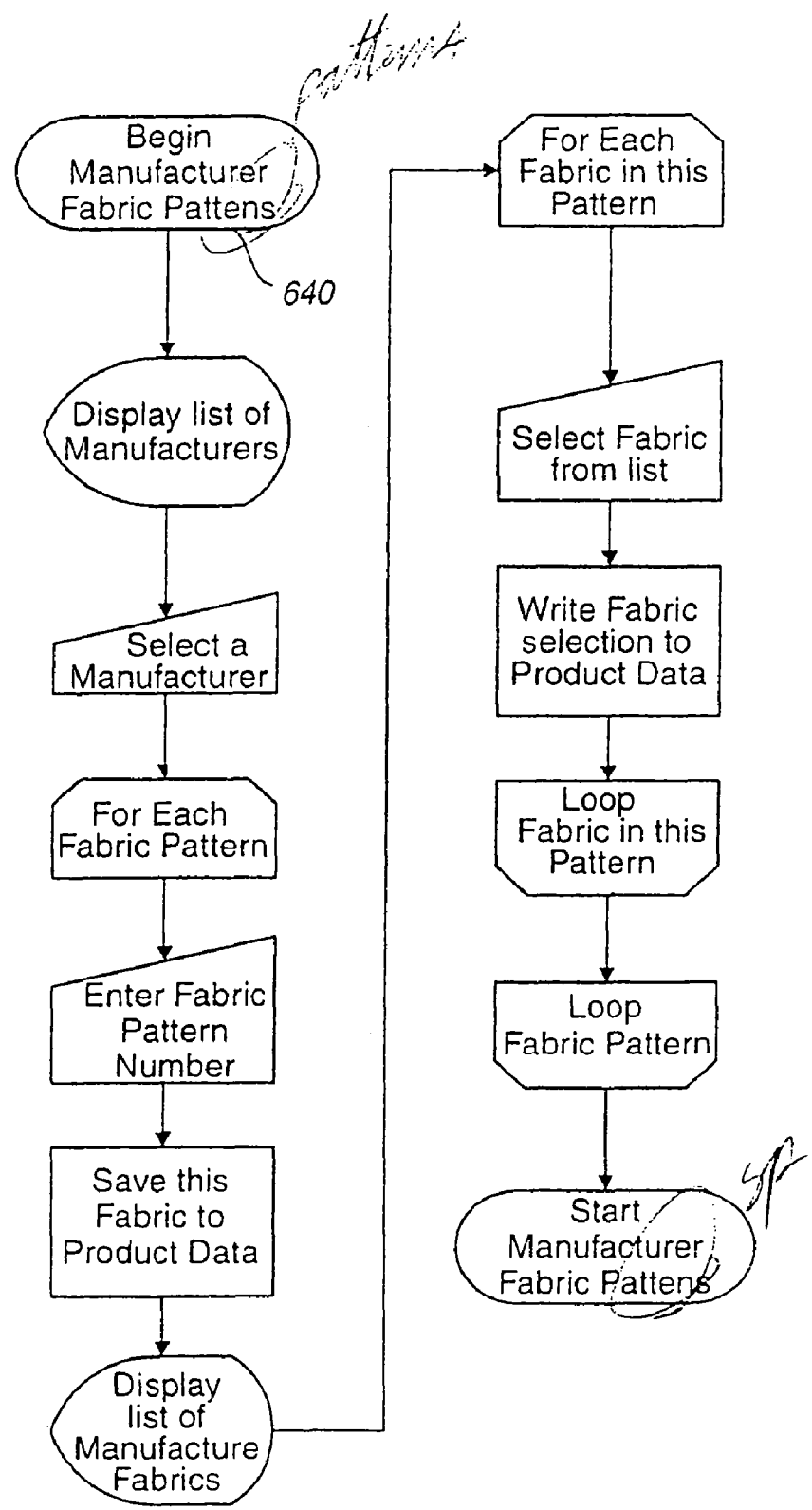
FIG. 30 is a flowchart for obtaining manufacturer fabric patterns.

As depicted in FIG. 29, a particular manufacturer is selected from a list 630. Then, the name of each fabric color that the manufacturer uses is entered. Once the fabric colors are entered, the base information (without regard for color) on each fabric is entered. Generally this information consists of the name of the fabric, the grade of the fabric and the cleaning code. Then each color of the base fabric is entered by providing any prefix or suffix which is applied to the base fabric name, to denote the color, as is the selection of a fabric color from the previously provided options. Finally, this particular color of the fabric is linked to the corresponding color of a particular mill fabric. As is outlined in FIG. 30, a particular manufacturer is again selected from a list 640. The new pattern number is entered and a list of all fabrics is presented. The user then selects each fabric which belongs to this fabric pattern. The process is repeated for each fabric pattern.

Figure 31:
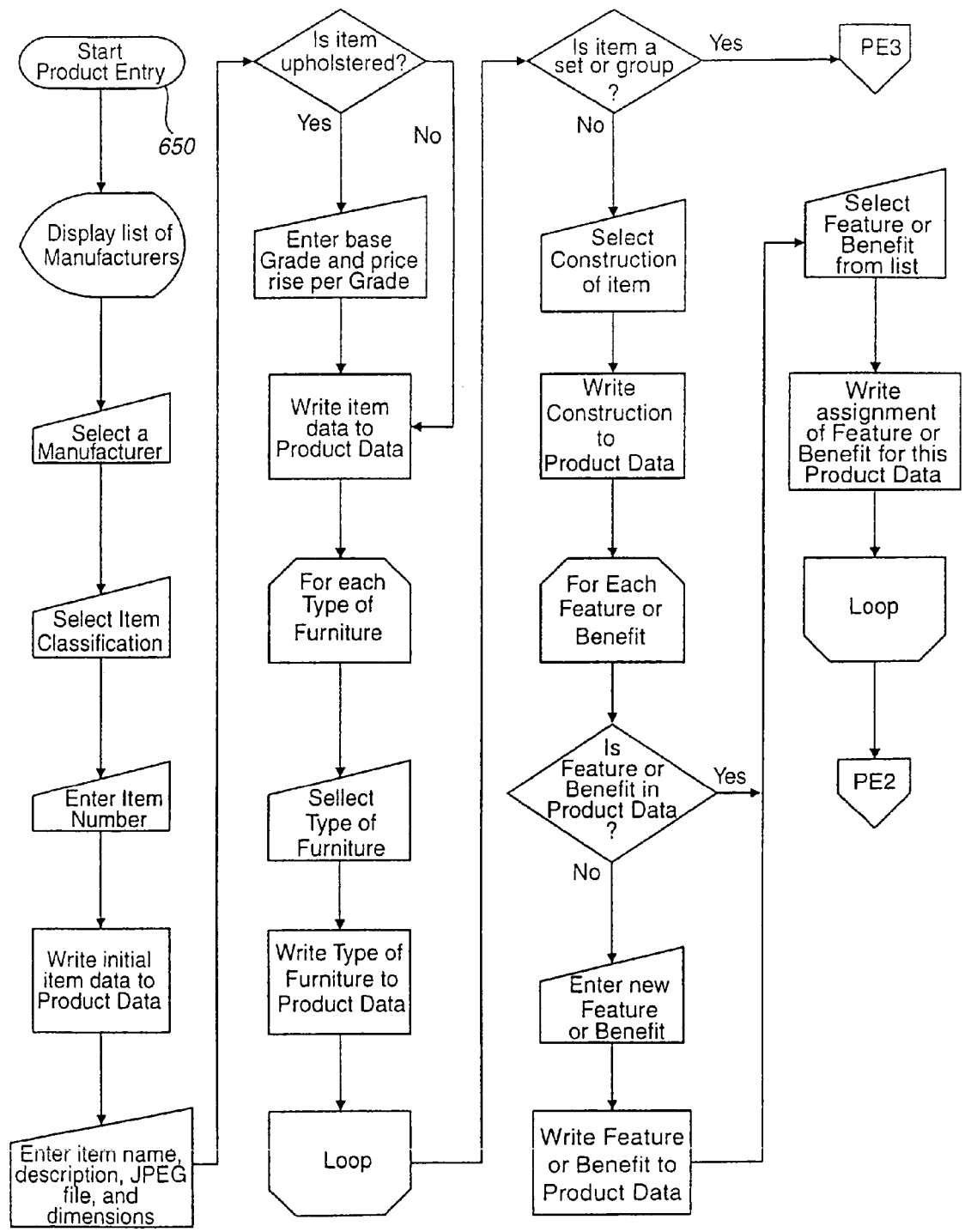
FIGS. 31-33 are flowcharts for obtaining product entry data.

As depicted in FIG. 31, a particular manufacturer is selected again from a list 650. The item number is entered and a selection is made of the product's class, individual item or set. This information is saved and the remaining options presented. User then enters the item name, description, name of the JPEG file and applicable dimensions. If the product is upholstered, a base fabric grade and price increase per grade are also entered.

A particular product may be classified for use within many different rooms or some other criteria. Each of these possible type selections are chosen from a presented list of choices. At this point, if the item was classified as a set, a user would go to the flowchart on FIG. 33. Otherwise, the product is an individual item and the construction of the product is selected from a list of choices.

Features and benefits may be entered to further enhance the data available to the final user. A particular feature or benefit needs to be entered only once per manufacturer. They are stored by their heading for use with any products from that particular manufacturer. If the needed feature or benefit does not yet exist, it may be entered here and added to the product data database 170. Features or benefits may then be selected from a presented list of choices and those chosen for this product are then noted in the primary product data database 170.

Figure 32:
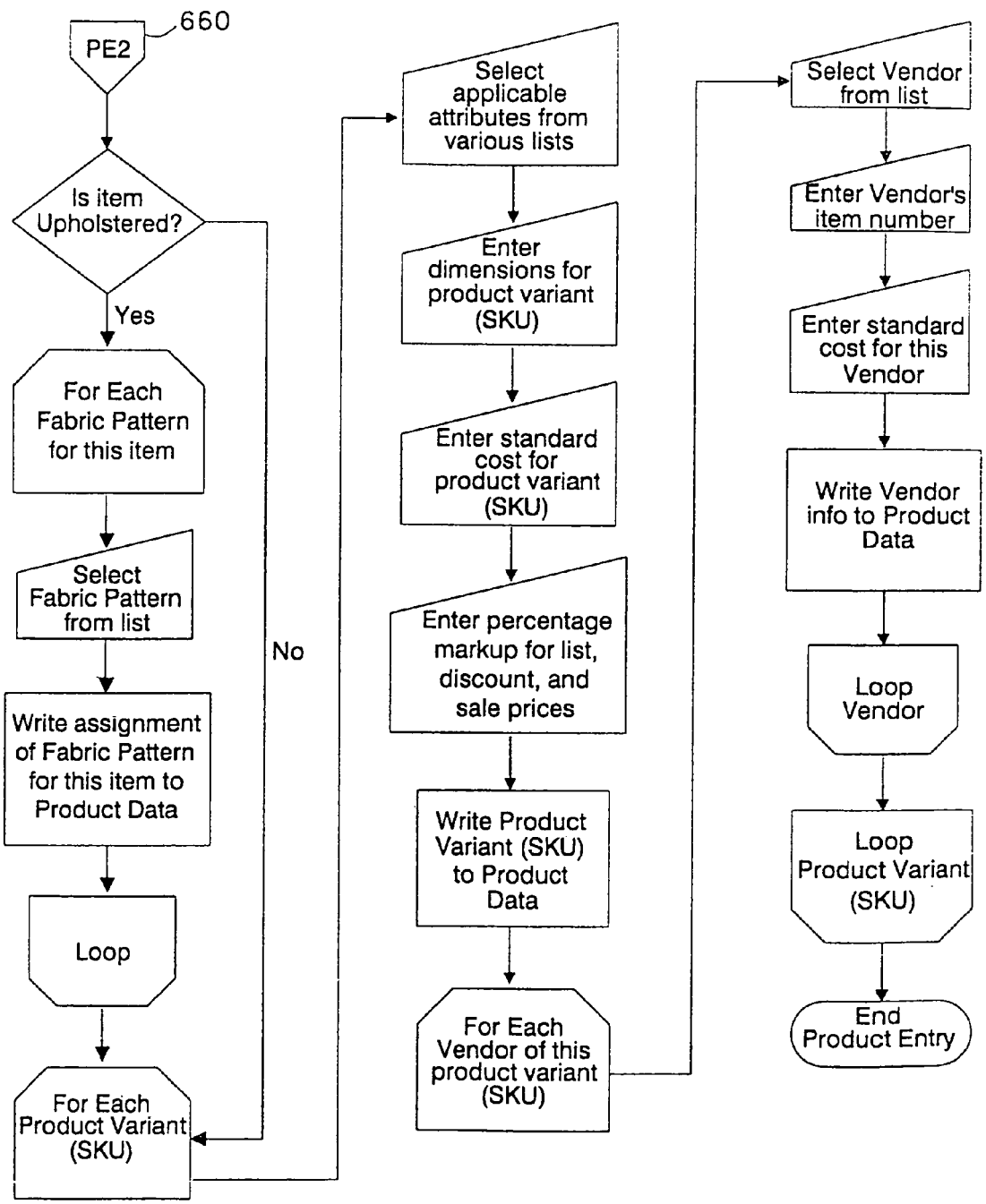

If an item is upholstered, the user now selects fabric patterns to be assigned to this product from a presented list 660, as is depicted in FIG. 32. Now the user may begin entering any product variant SKUs for this product. A product variant is determined by selecting items from various lists. These lists are for fabrics, finishes, colors and bed size. A check is then made to verify that the particular combination of selections for this product variant does not already exist.

If the product variant is unique, the user then enters the standard cost of this particular variant and also enters the percentage markups for list, discount and sale prices. The user is then required to enter the vendors from which this product variant may be purchased. The vendor is selected from a list and the vendor's item number and standard cost is entered.

Figure 33:
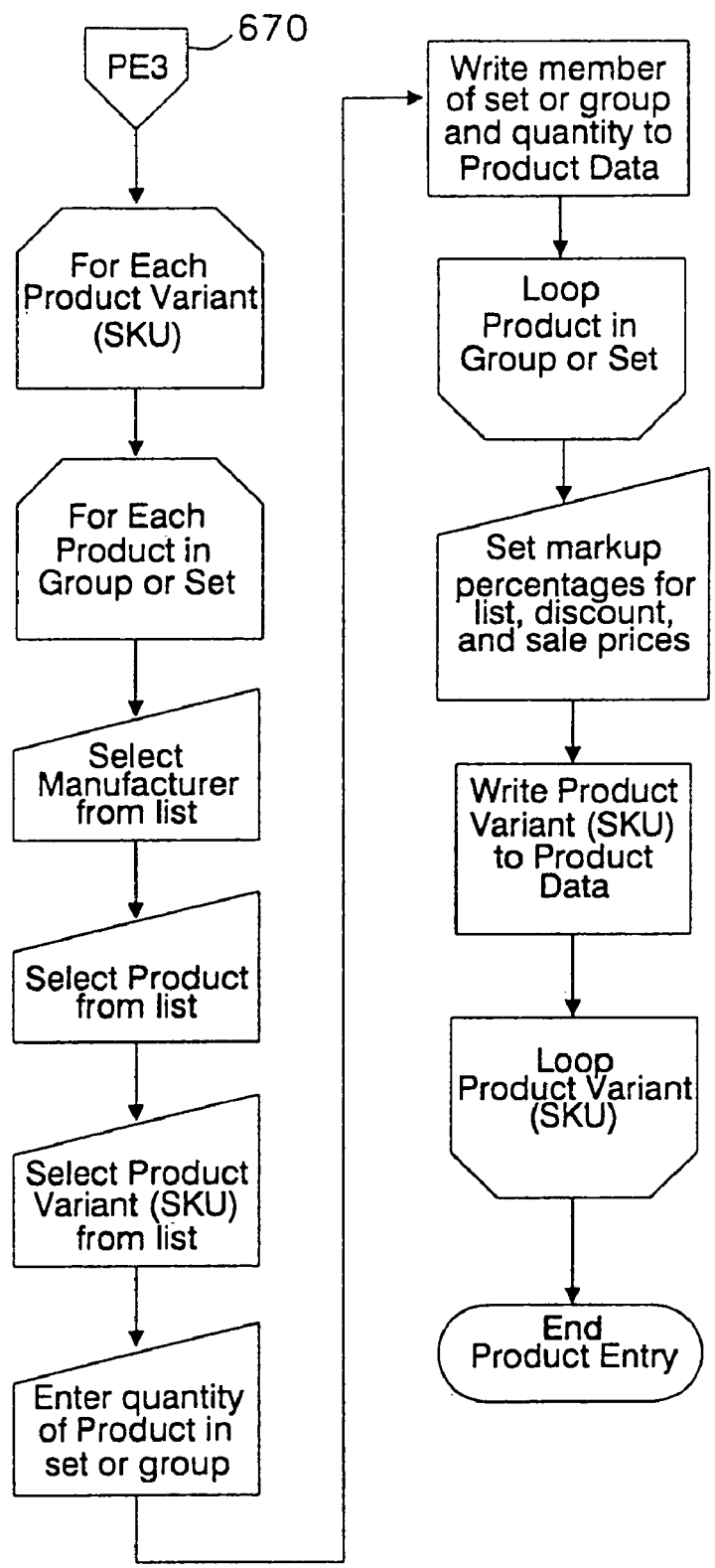

In continuing with the group or set from FIG. 31, the user now enters the product variant SKUs for the particular group or set 670, as depicted in FIG. 33. This is done by first selecting the manufacturer of one of the components. The user then selects the item number of the component and the specific product variant using this particular variant of the group or set. The quantity of the component is also provided. This is repeated for each component. Once all components are entered, the user may then enter the percentage mark-ups for the list and the discount and sale prices for this product variant of the group or set.

Figure 34:
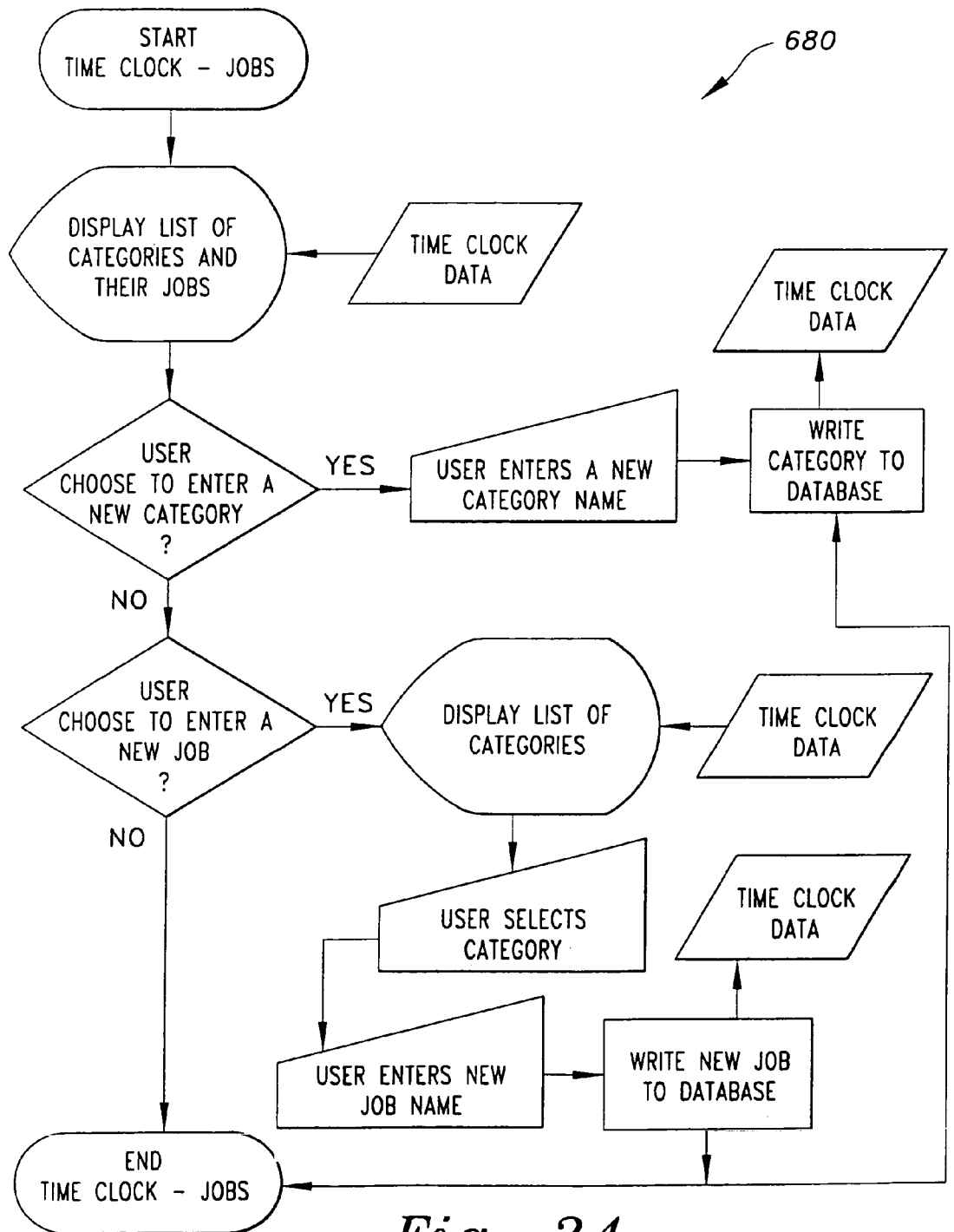
FIG. 34 is a flowchart for obtaining time clock application data for jobs.

According to FIG. 34, a list of current categories and their jobs are presented for review 680. If the user chooses to enter a new category, he enters the category name and it is saved to the database. If the user chooses to enter a new job, a list of categories is presented. The user selects the category for the new job and enters the name of the new job. All entries are saved to the datacenter 30.

Figure 35A:
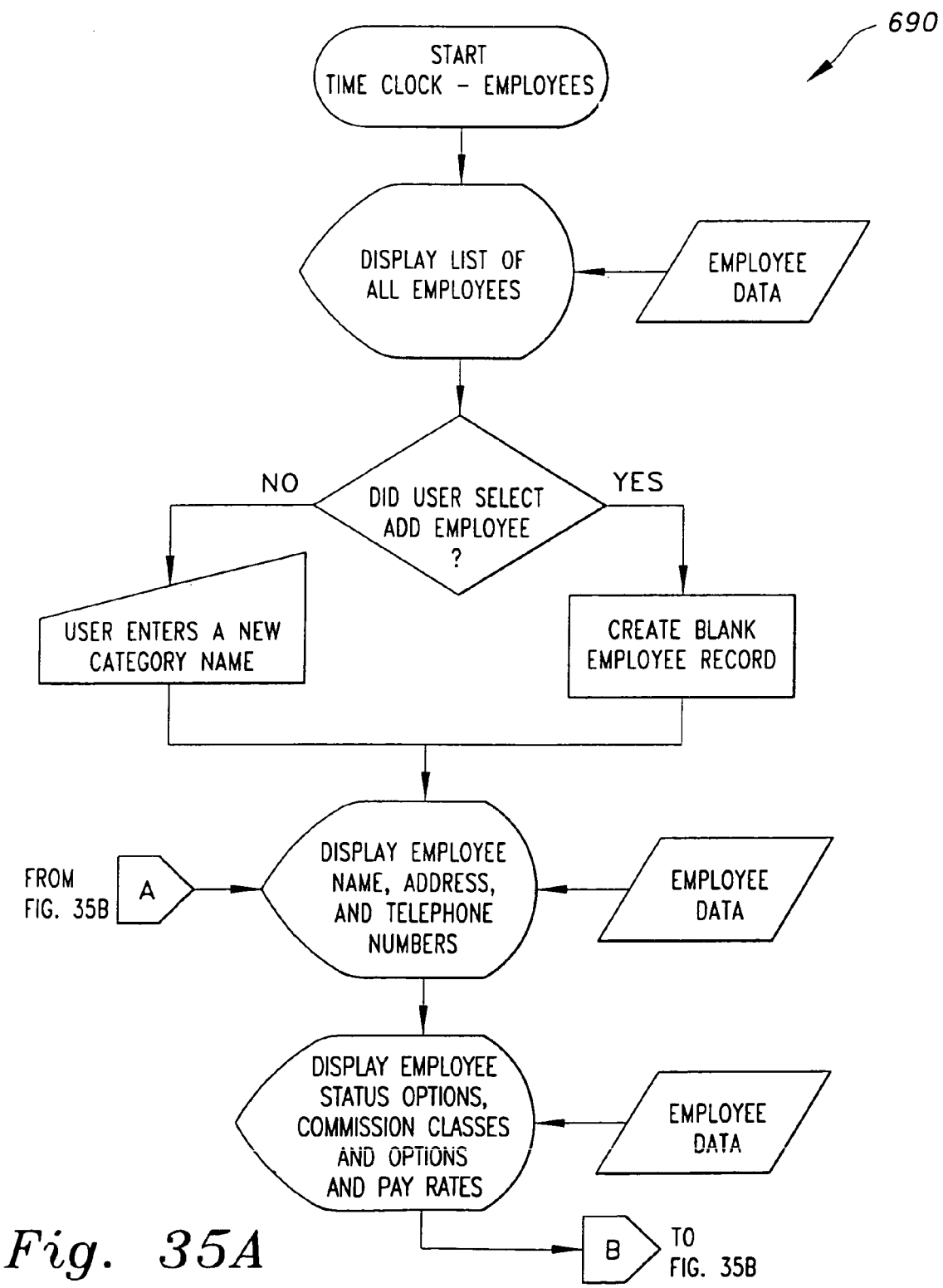
FIGS. 35A-35C are a flowchart for obtaining time clock application data for employees.
Figure 35B:
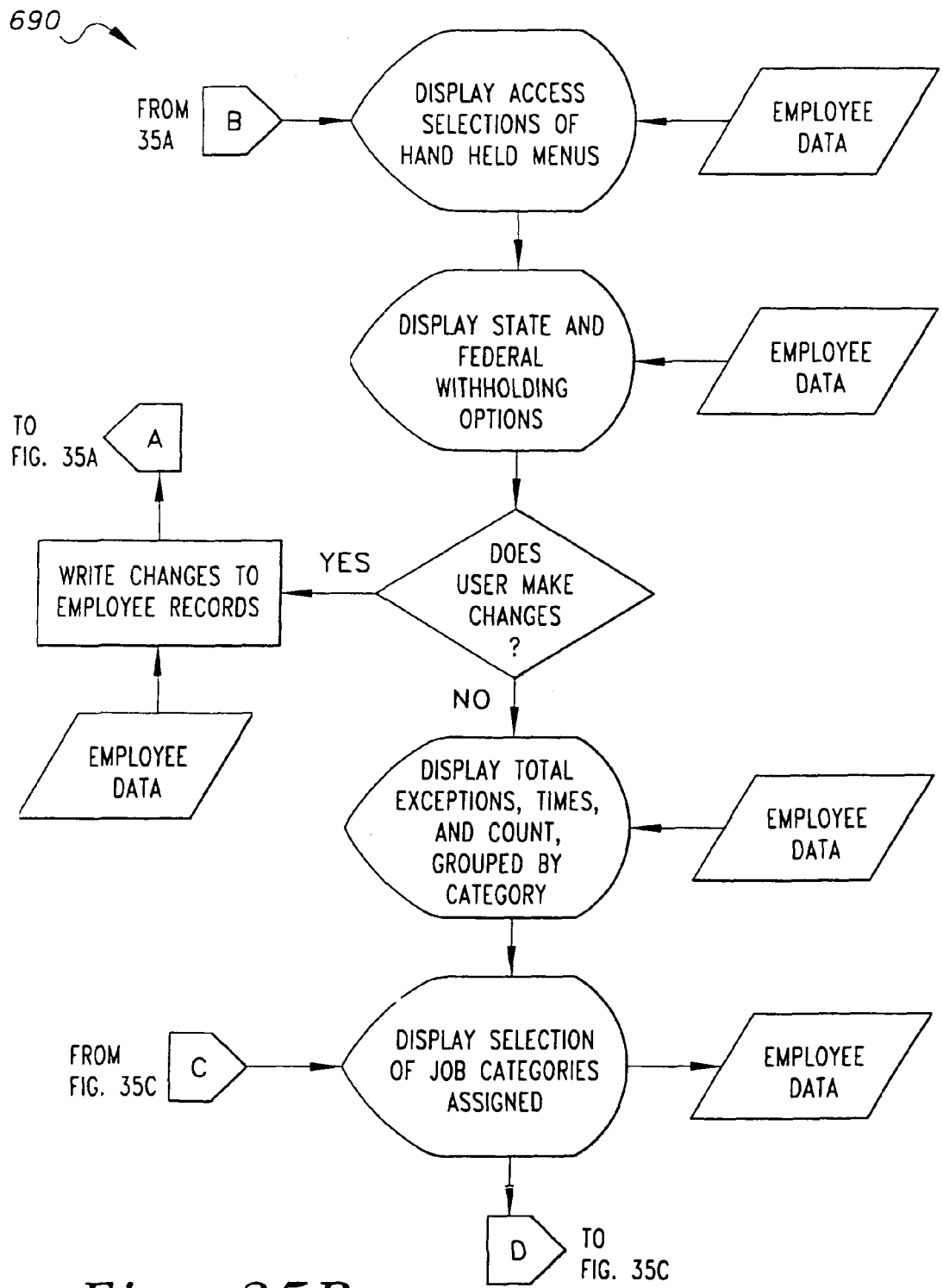
Figure 35C:
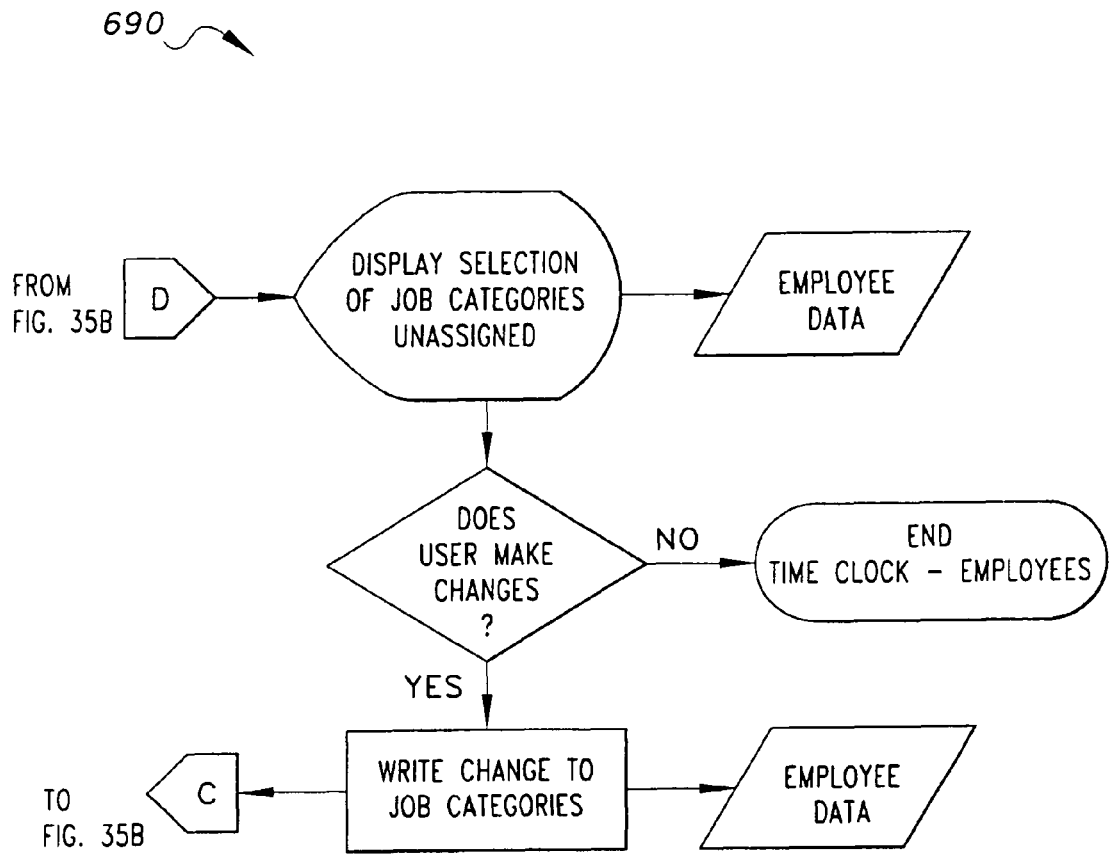

According to FIGS. 35A-35C, a user is presented a list of employees 690. The user may either select an employee to review and edit or choose to add an employee and create a blank record. The user is then presented with fields for the employee's name, address and telephone numbers. Also presented are the employee's status options and pay rates, as well as set commissions rates per product class. Another area presents choices for the user's hand held menus. Another contains the state and federal withholding options for the employee. The user may elect to make changes to any and all of this data and those changes are then saved to the employee's record and the data refreshed.

An additional area is presented with a summary of the schedule exceptions for this employee, grouped by the exception category. The final area lists selections for the assigned and unassigned job categories for this employee. User may choose to move a category from one list to the other, the change is saved and the lists are refreshed.

Figure 36:
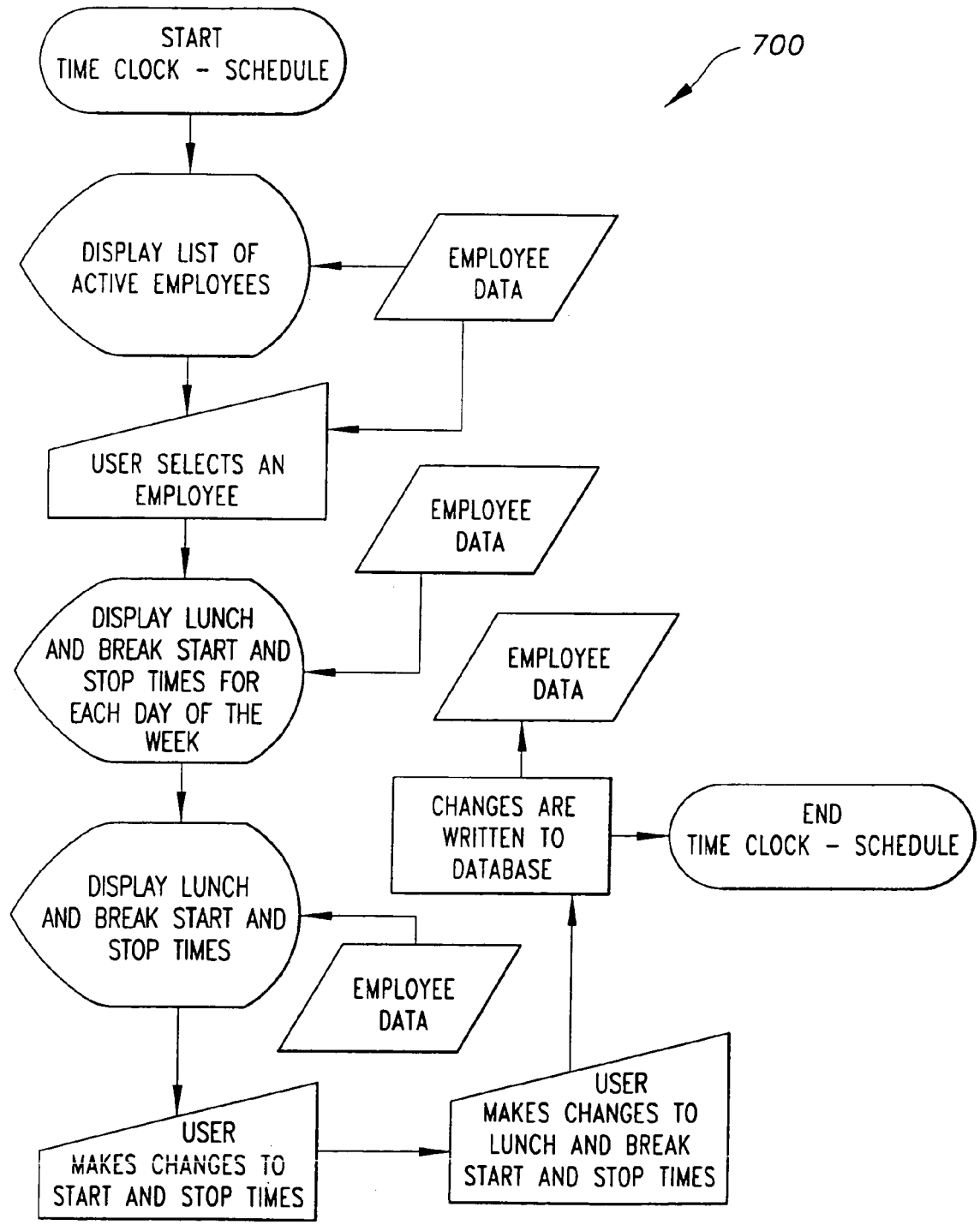
FIG. 36 is a flowchart for obtaining time clock application data for employees and their schedules.

According to FIG. 36, a user is presented with a list of active employees and selects one 700. The user is then presented with the generic weekly schedule for this employee. User may then make changes to the start and stop times for any day of the week and save those changes to the employee's record.

Figure 37:
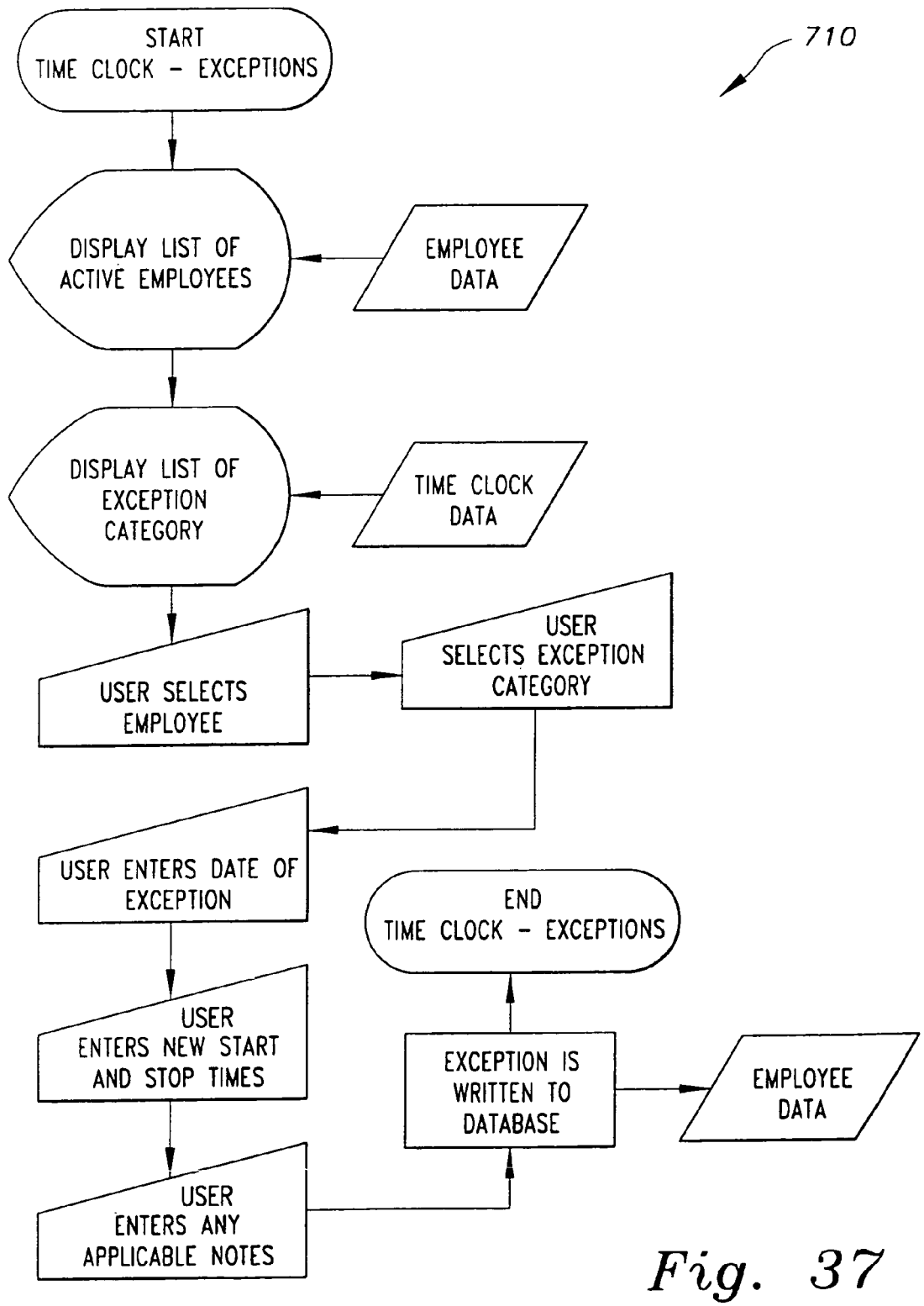
FIG. 37 is a flowchart for obtaining time clock application data for employee exceptions.
Figure 38A:
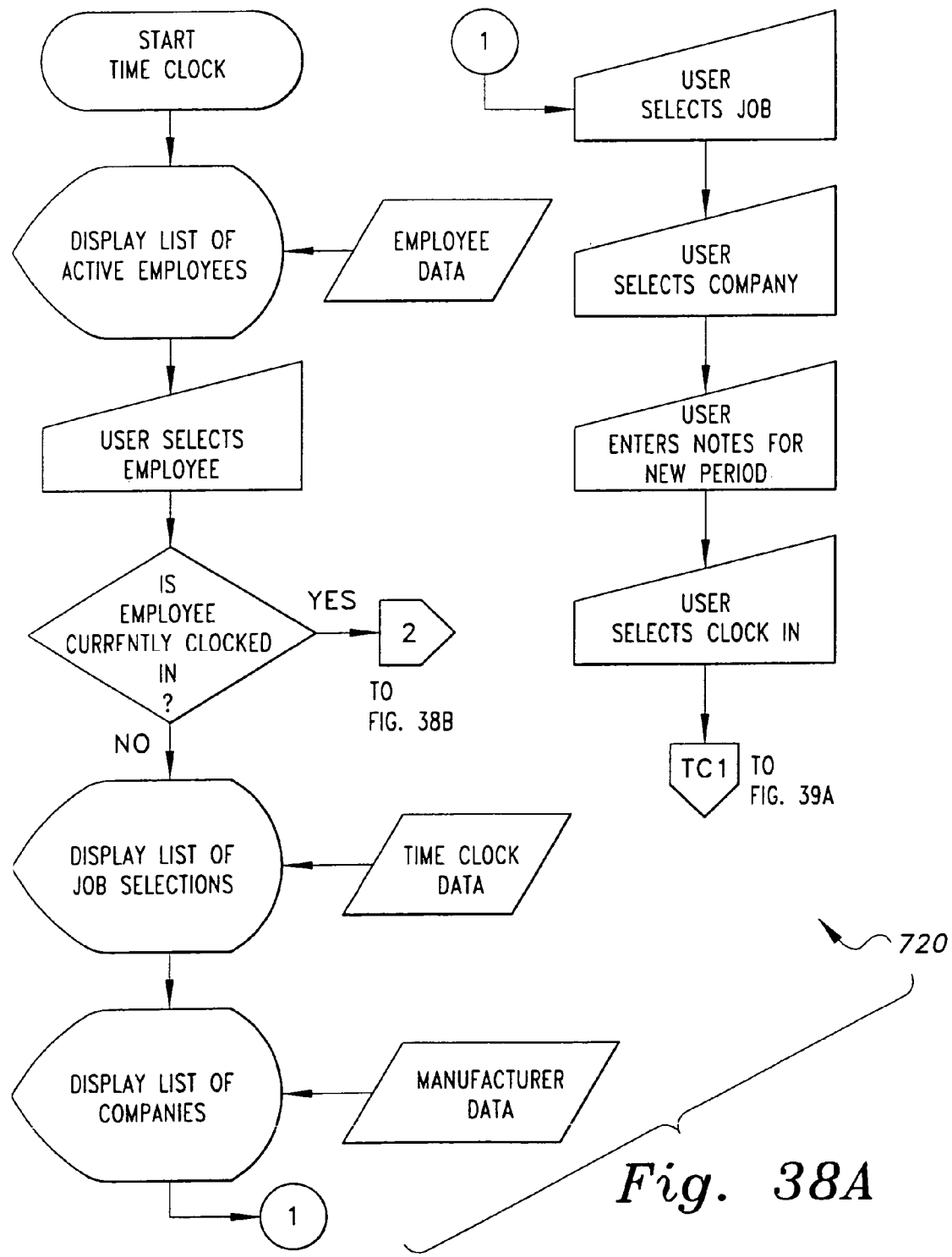
FIGS. 38A-38B and FIGS. 39A-39B are flowcharts for obtaining time clock application data for employees' times for clocking-in and clocking-out.
Figure 38B:
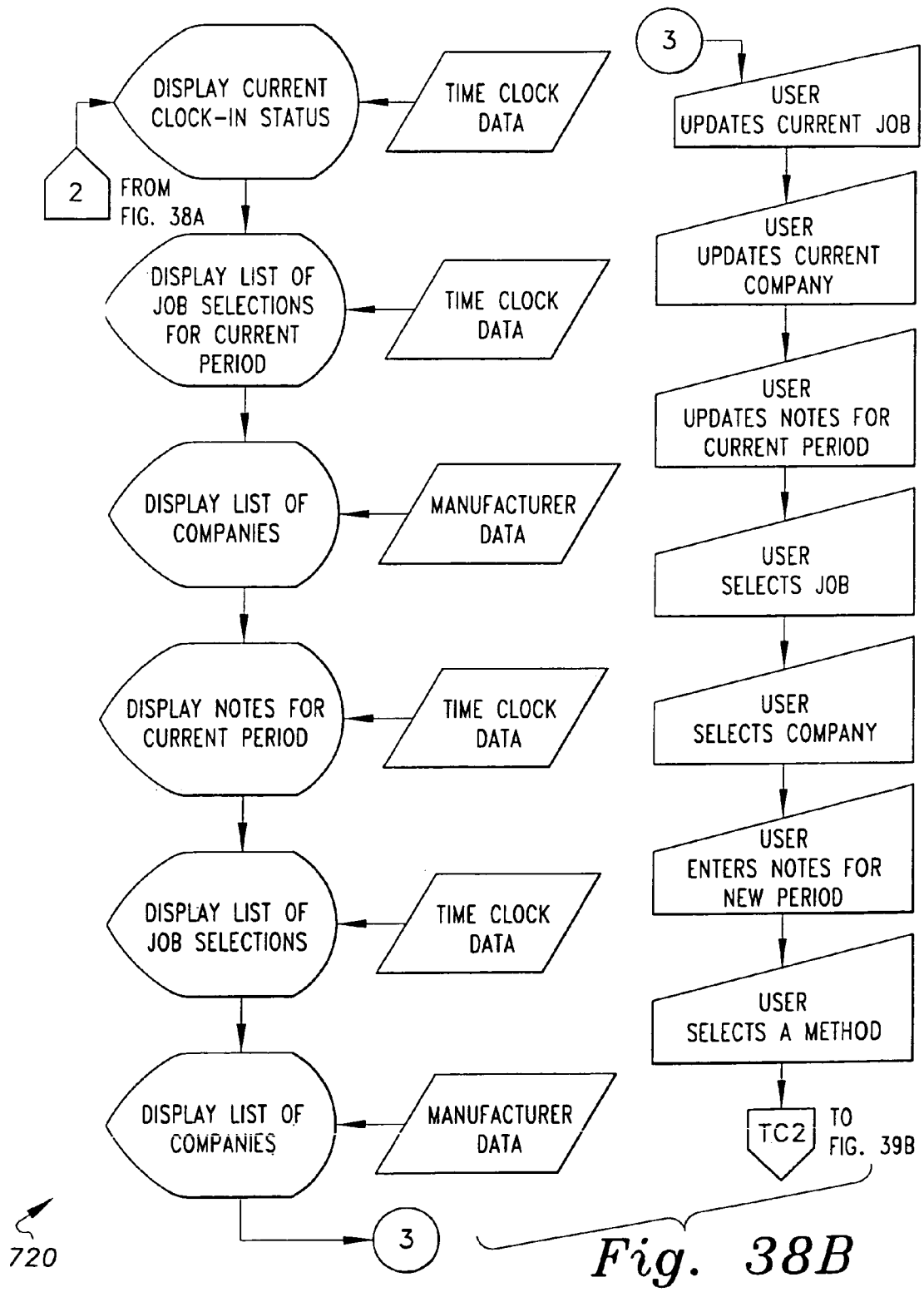
Figure 39A:
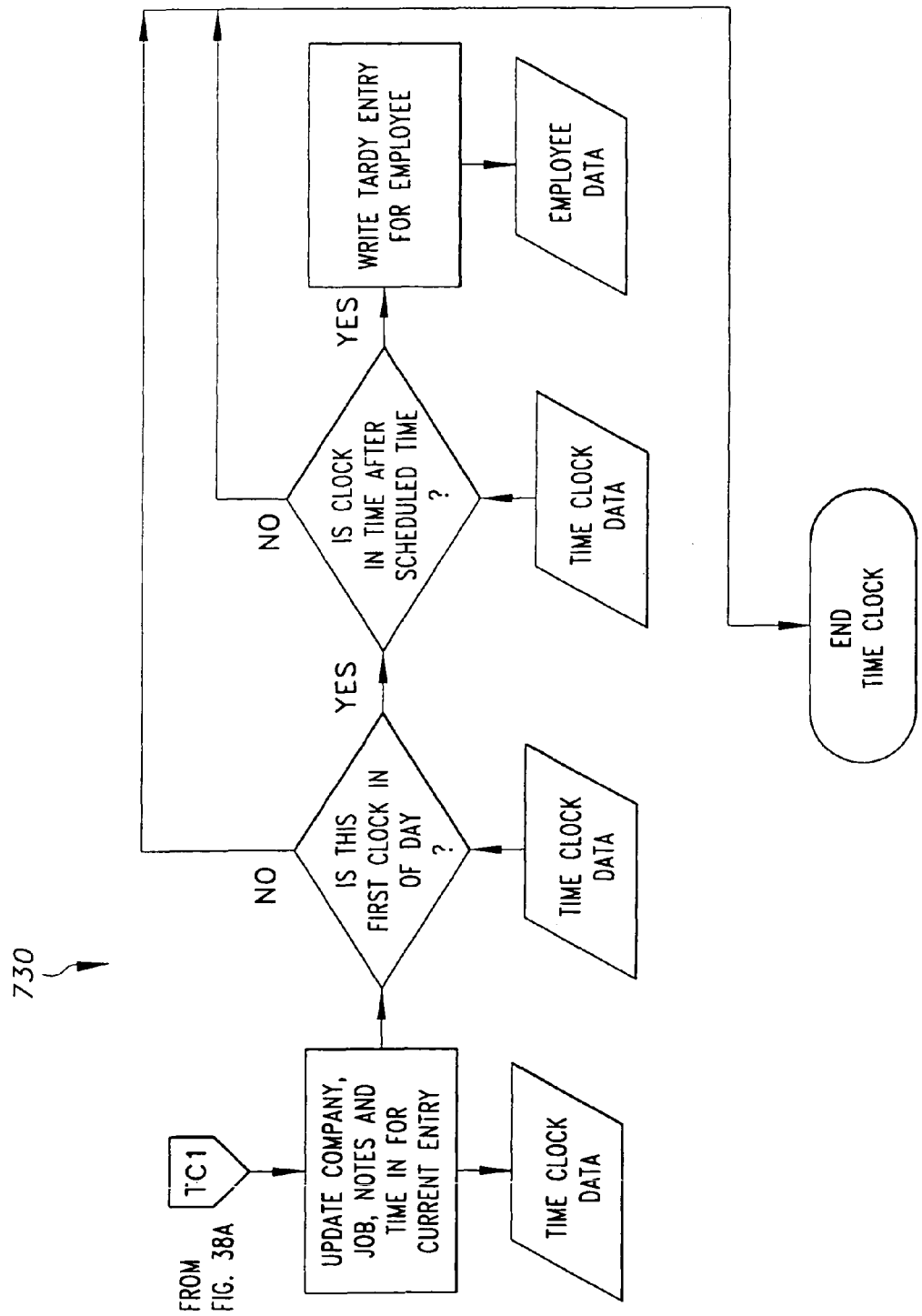
Figure 39B:
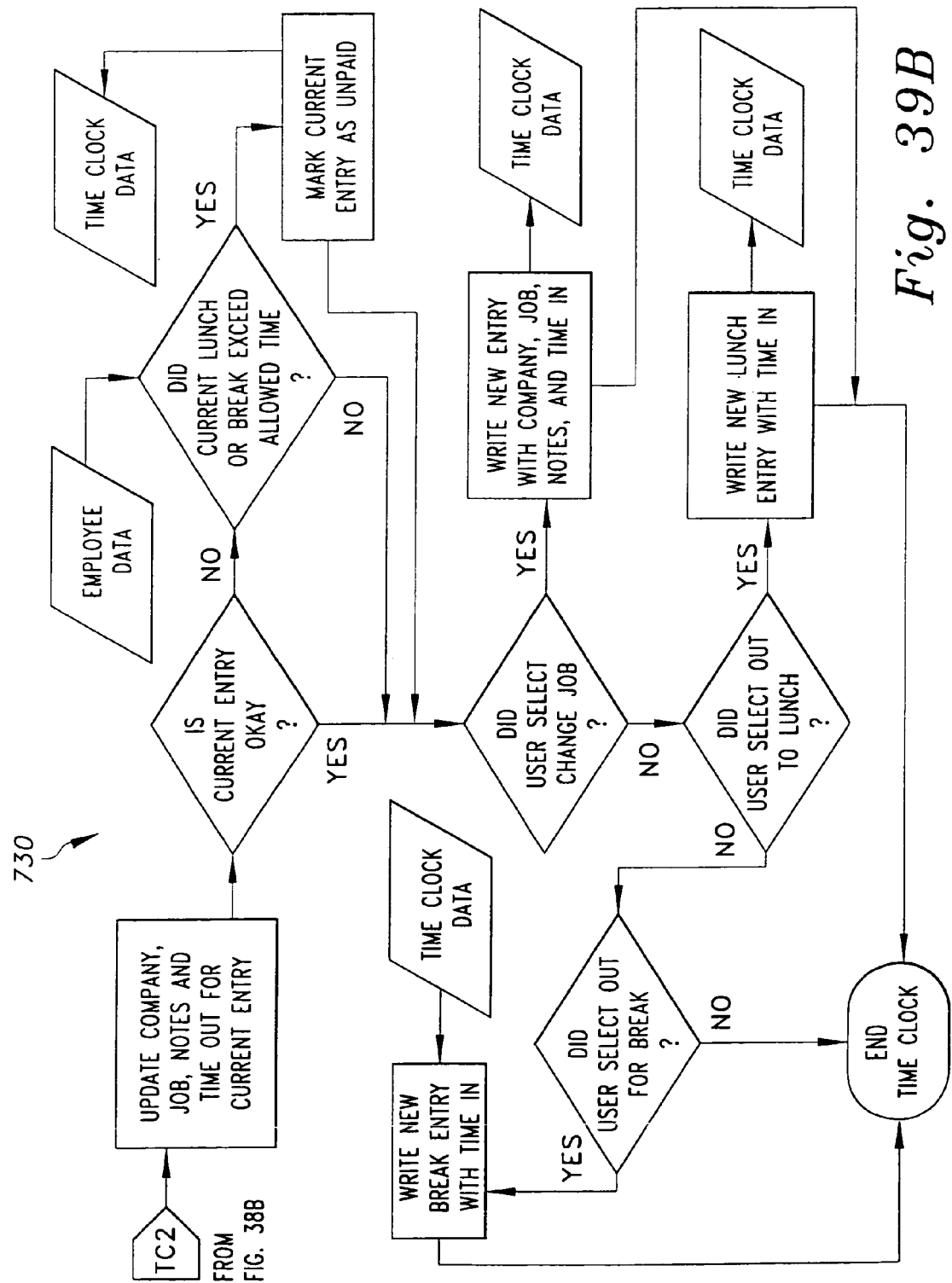

As outlined in FIG. 37, user is presented with a list of active employees and a list of exception categories 710. The user selects the employee and appropriate exception category. The user then enters the date for the exception and the new start and stop times. User may also enter any notes deemed appropriate. The exception is then saved to the employee's record.

As outlined in FIGS. 38A-38B and 39A-39B, a list of active employees is presented, where a user selects an employee 720,730. If the employee is not currently clocked in, selections are presented for the job and company. User makes selections and enters any notes if necessary. User chooses to clock in and a new entry is made in the datacenter 30 for this time period, including the job, company and notes as entered by the user. A check is then made to see if this is the first clock-in of the day. If so, another check is made to see if the clock-in occurred after the expected clock-in time on the employee's schedule. If the clock-in was late, a tardy entry is recorded in the employee's record.

If the employee is currently clocked-in, job, company and notes for the current time period are present for review. Selections for job, company and notes are also provided for a possible new time period. The user makes changes to the current period as needed, and enters data for the new period if applicable. The user then makes a selection for action. The current time period is updated with any changes the user may have entered and is closed out.

If the current period was for lunch or break, a check is made to see if the lunch or break was within the length specified in the employee's record. If the user selects to change a job, any selections for the new period are recorded in the datacenter 30. If the user selects "out for lunch", a new period is created and flagged accordingly. If the user selects "out for break", a new period is created and flagged accordingly.

Figure 40A:
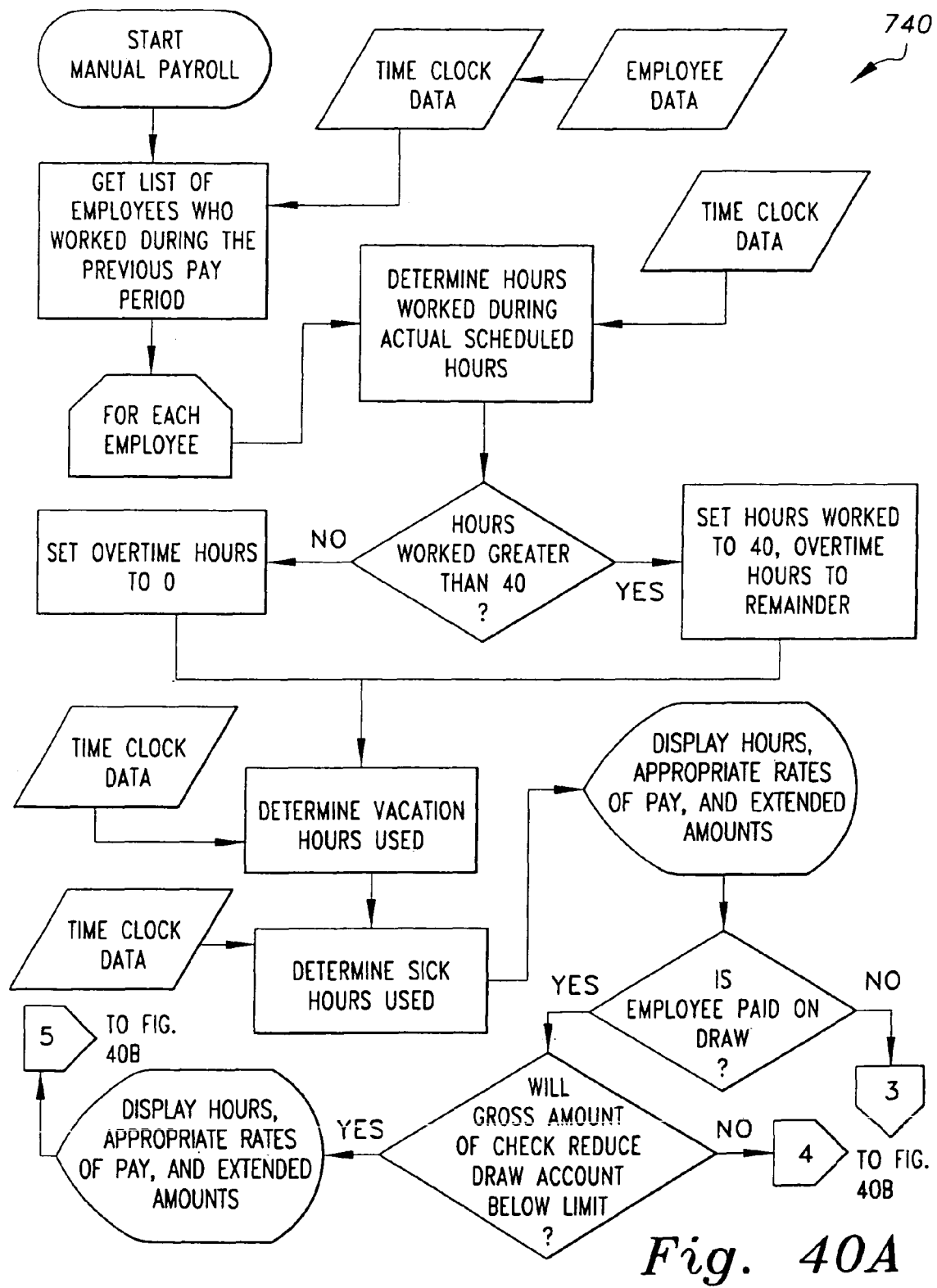
FIGS. 40A-40B are a flowchart for obtaining manual payroll data.
Figure 40B:
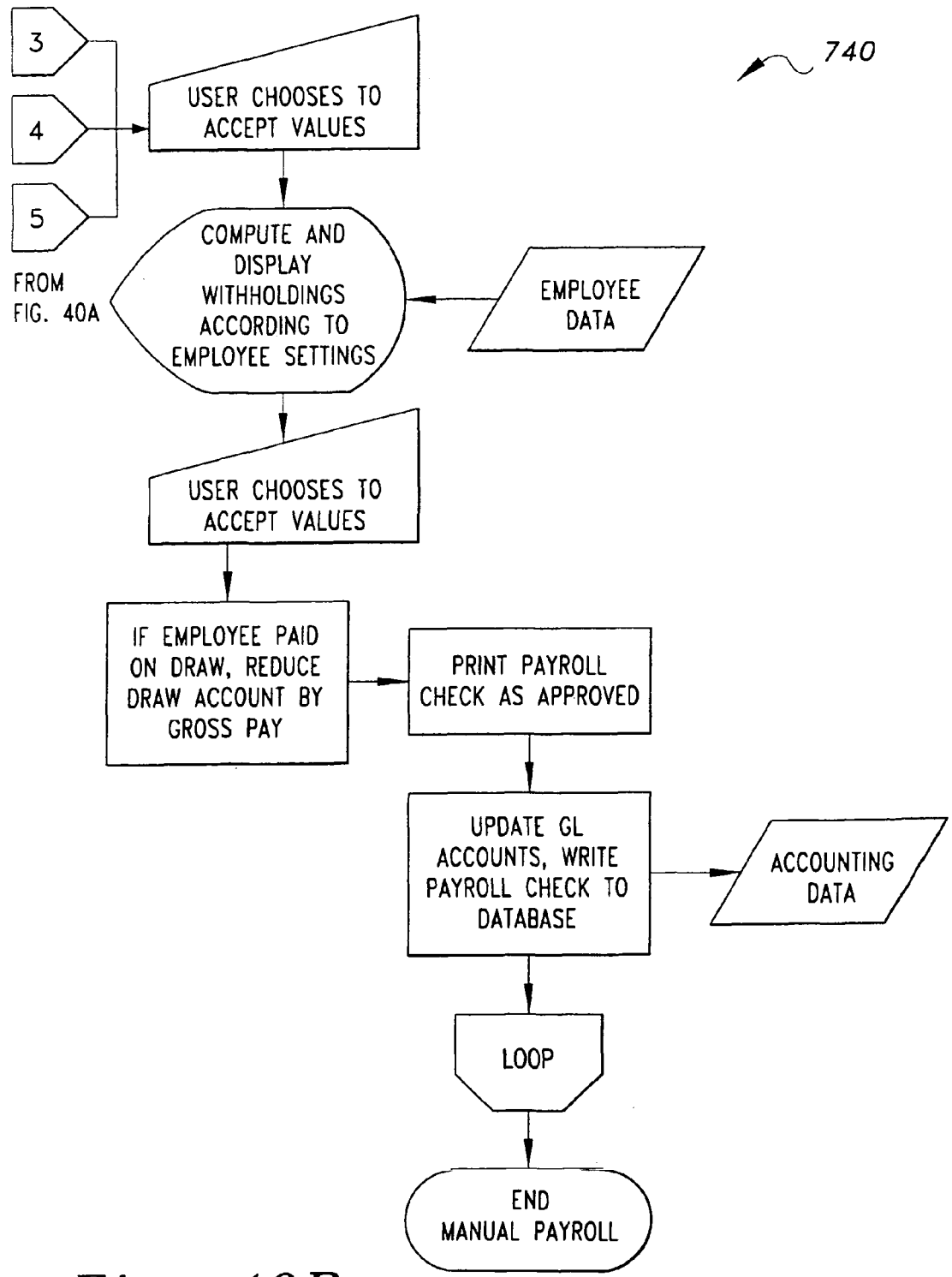

As outlined in FIGS. 40A-40B, the system 10 retrieves a list of employees who worked during the previous pay period 740. For each employee, the system 10 determines the total hours worked within the constraints of the employee's schedule. If the hours are greater than 40, the hours are set to 40 and the overtime hours are set to the remainder. Otherwise, overtime hours are set to 0.

The system 10 also determines the total of any vacation and sick-time used during the pay period. If the employee is paid on a commissions draw, a check is made to see if the draw account balance will be reduced below the draw limit with this check. If so, an adjustment is recorded to the gross pay so that the draw account not be reduced below the limit. Then, based on the employee's settings, the withholdings are computed. A payroll check is then printed as computed, the draw account reduced if needed, the general ledger account values are written and the details of the check are recorded. The process repeats for each employee in the selection.

Figure 41A:
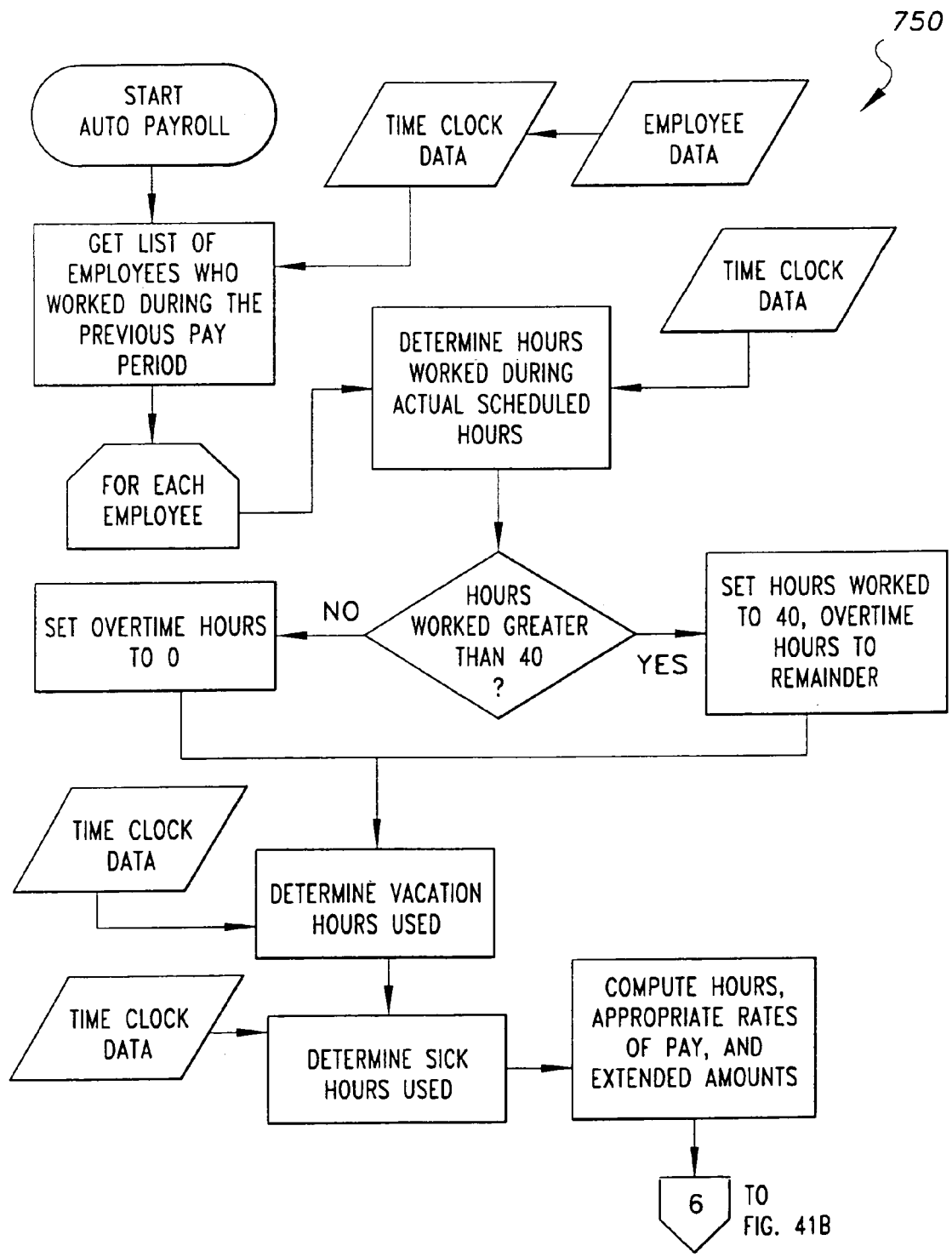
FIGS. 41A-41B are a flowchart for obtaining automatic payroll data.
Figure 41B:
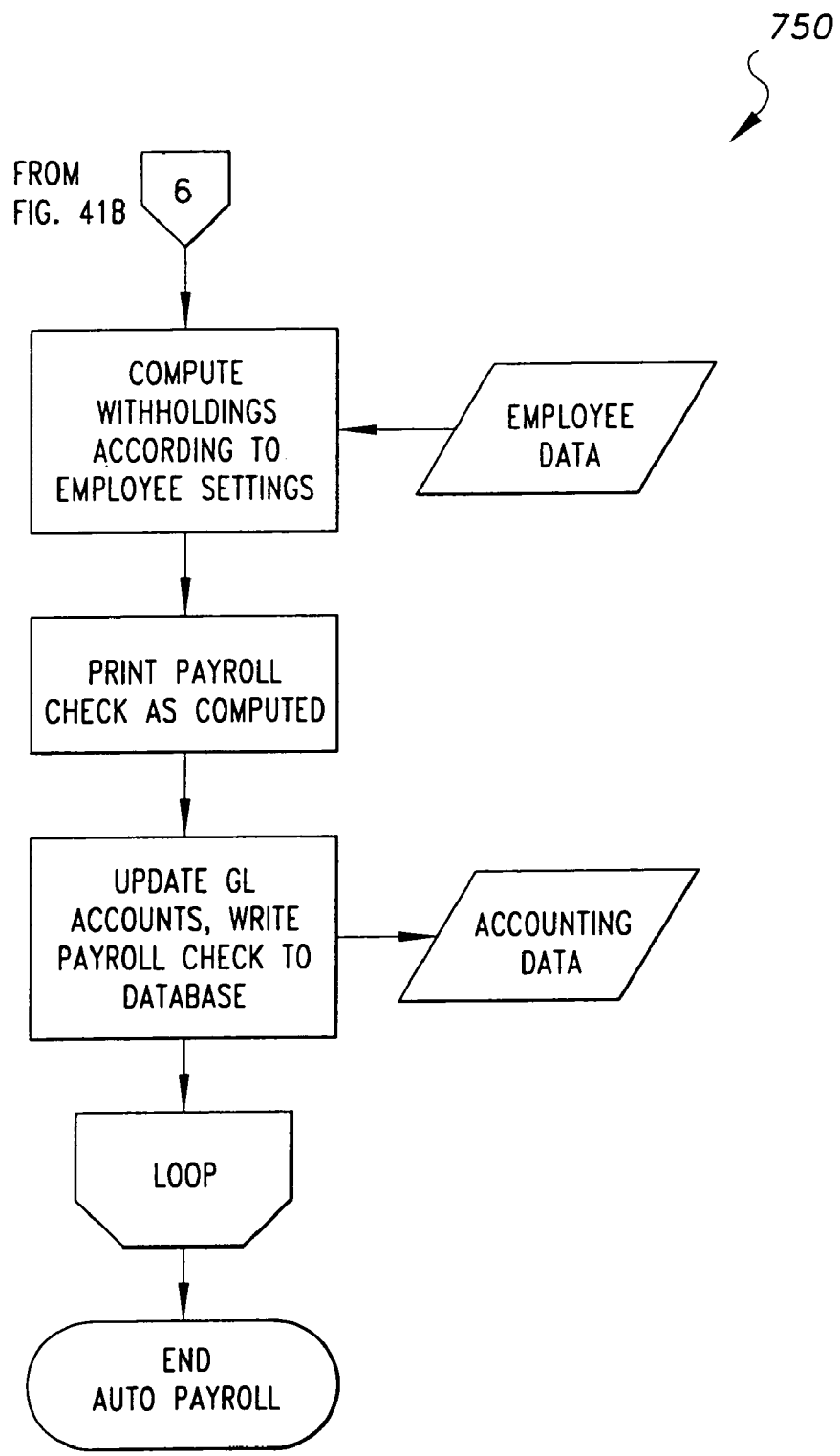

According to FIGS. 41A-41B, the system 10 retrieves a list of employees who worked during the previous pay period 750. For each employee, the system 10 determines the total hours worked within the constraints of the employee's schedule. If the hours are greater than 40, the hours are set to 40 and the overtime hours are set to the remainder. Otherwise overtime hours are set to 0.

The system 10 also determines the total of any vacation and sick-time used during the pay period. The various hours are then displayed with the appropriate rates of pay and extended amounts. The user chooses to accept the values. Then, based on the employee's settings, the withholdings are displayed. The user chooses to accept the values. A payroll check is then printed as approved, the general ledger account values are written and the details of the check are recorded. The process repeats for each employee in the selection.

Figure 42A:
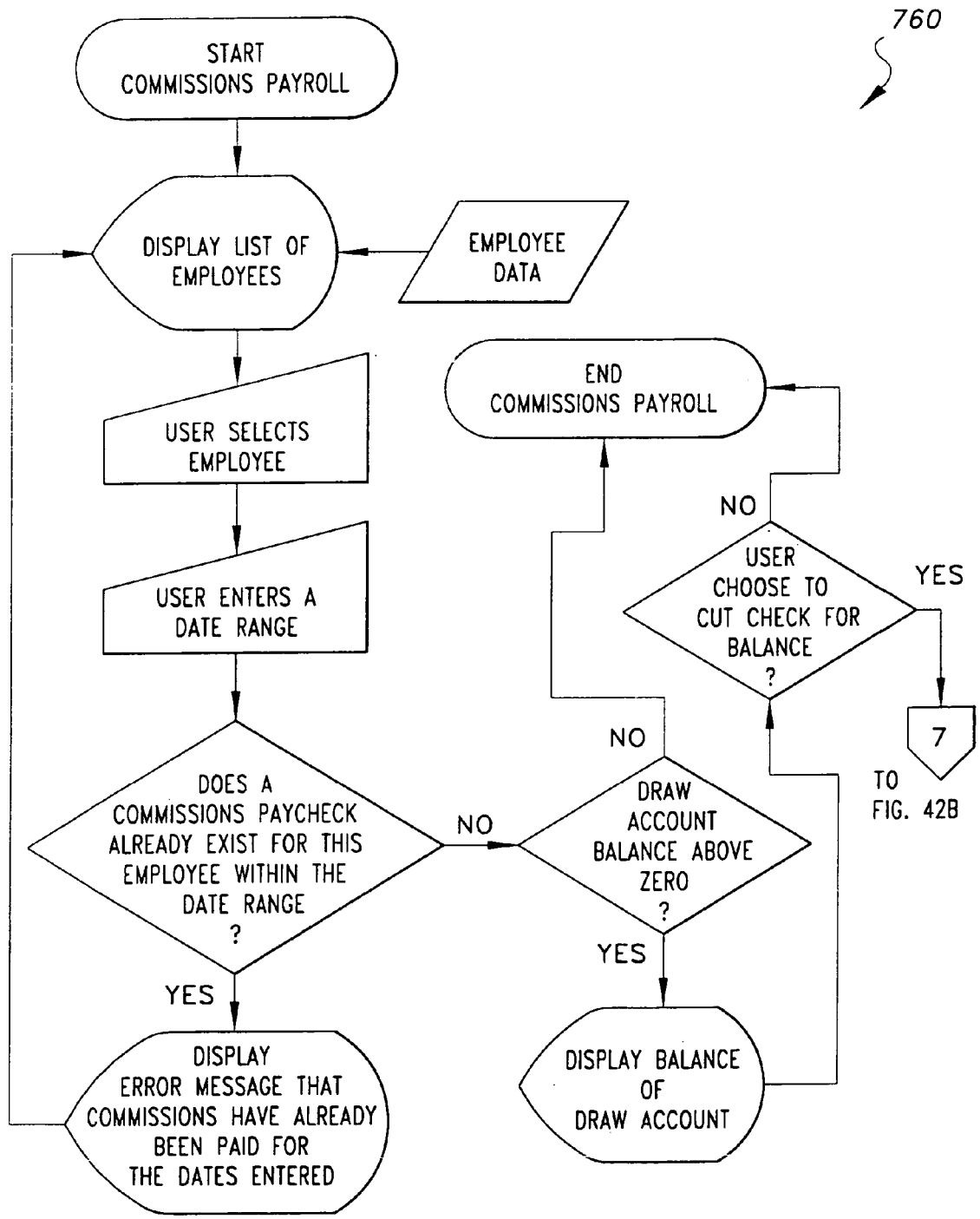
FIGS. 42A-42B are a flowchart for obtaining commissions payroll.
Figure 42B:
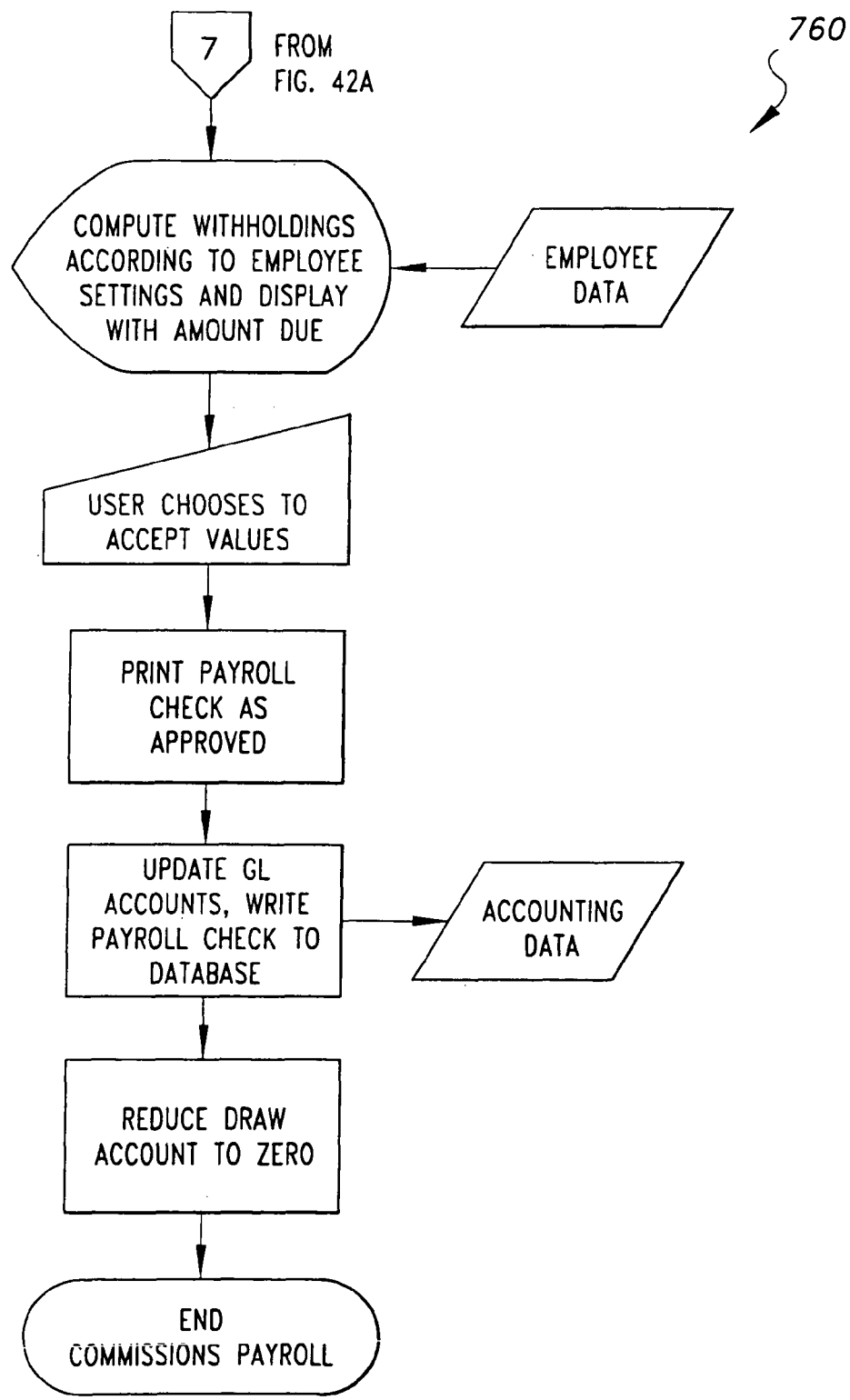

According to FIGS. 42A-42B, the system 10 displays a list of employees 760. The user selects an employee and enters a date range. The system 10 checks to see if a commissions check has already been issued to the employee for the time period, and if so, returns an error. The system 10 now checks to see if the employee's draw account is above 0. If so, the balance is displayed and the user is asked if a check needs to be cut for the balance. If the user selects to cut the check, the withholdings are calculated according to the employee's preferences and the results displayed. If the user chooses to accept the values, a payroll check is printed as approved, appropriate general ledger entries are made and the draw account is reduced to zero.

Figure 43:
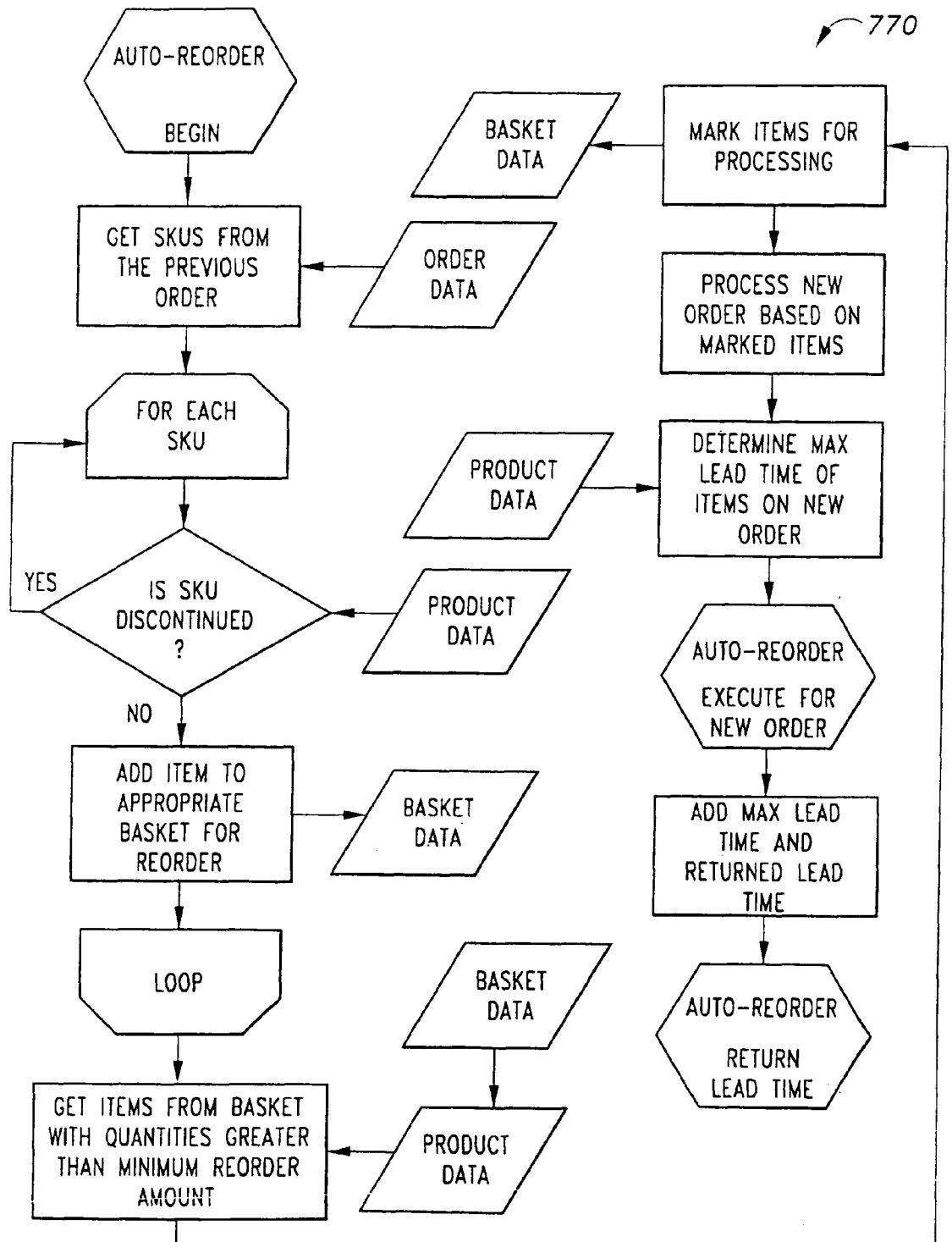
FIG. 43 is a flowchart for using the auto-reorder system.

FIG. 43 depicts auto-reorder system procedures 770. The auto-reorder system retrieves a list of SKUs from the order which called the function. For each SKU, a check is made to see if it is discontinued. If not, the item is added to the appropriate basket 290 for reorder. This is repeated for each SKU.

Next the auto-reorder system retrieves line items from the affected basket 290, which now have quantity greater than the minimum reorder amount. Those items are marked for processing and the basket 290 is processed. Maximum lead times for the new order are computed and the auto-reorder function is recursively called for the new order. Any returned value is added to the computed lead time and returned from this function.

Figure 44:
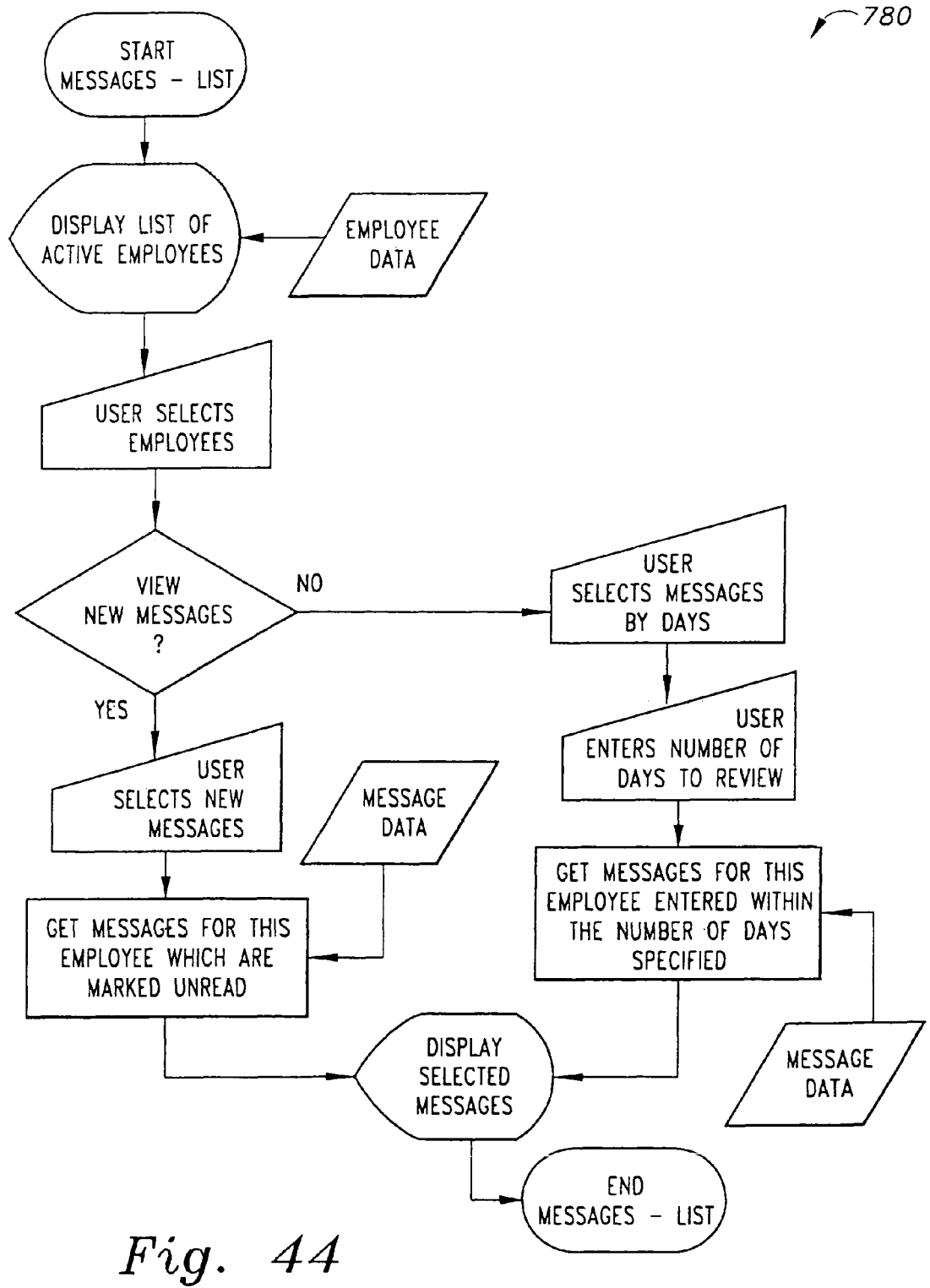
FIGS. 44 and 45 are flowcharts for using the message module.
Figure 45:
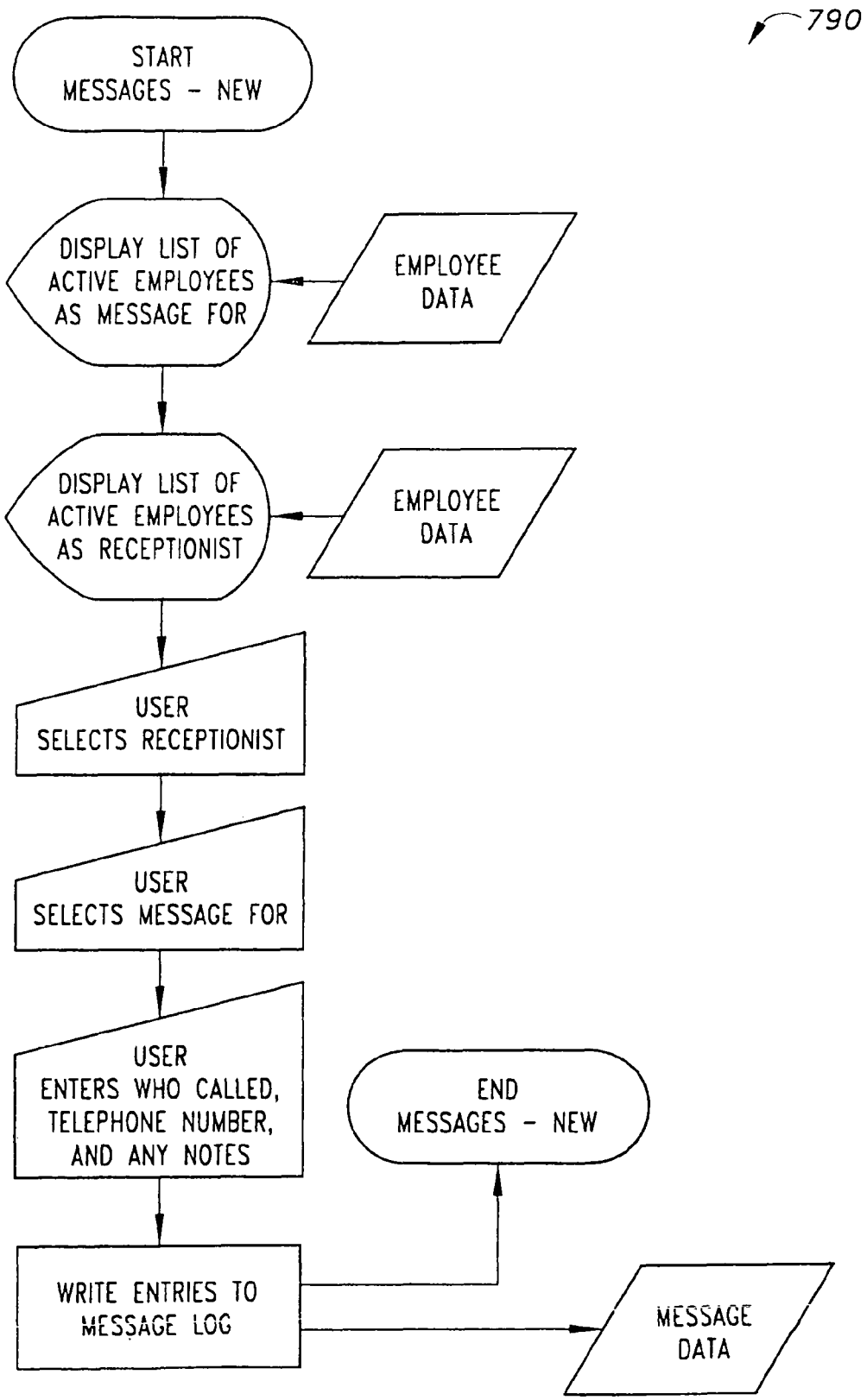

FIGS. 44 and 45 are flowcharts for using the message module 780,790. As presented in FIG. 44, the user is presented a list of active employees. The user selects an employee and a viewing method. If the user selected new messages, then the system displays those messages which are marked unread. Otherwise, the user selected to view the messages for the previous number of days are entered.

FIG. 45 presents a user that is presented two lists of active employees, one for the message recipient and one for the receptionist. The user selects the receptionist and recipient, then enters the caller's name, telephone number and message. The message is saved in the log.

It is to be understood that the present invention is not limited to the embodiments described above, but encompasses any and all embodiments within the scope of the following claims.

I claim:

1. A computerized ordering, warehousing, inventory, sales, delivery and communications method utilizing the Internet used by different entities in the retail and wholesale industries for desired products, comprising the steps of:
   establishing a primary product database and storing said primary product database in computer readable memory associated with a datacenter;
   establishing a plurality of search data subsets associated with said primary product database, the search data subsets including an item number data subset, an SKU number data subset and a search category data subset;
   remotely accessing the datacenter via a computer network and searching for desired products in said primary product database by searching at least one of the search data subsets, wherein the item number, the SKU number and the provided search category data subsets are stored within the primary product database of the computer readable memory;

displaying the desired products and product attributes found by the search, which includes a SKU number, a manufacturer, a JPEG image, a list price, a discount price, a sale price, assembling components, a fabric name, a fabric number, a fabric style, a color, a grade, a finish, a cleaning code and instructions, matching products, a bed size, item variants and inventory information selected;

establishing a selection basket;

selecting desired products and storing selected product data in the computer readable memory representing the desired products in the selection basket;

establishing data sub-sets for the desired products in the selection basket, including a data sub-set representing available quantities of the desired products and a data sub-set representing prices of the desired products, the data sub-sets being stored in the computer readable memory;

providing a user with the option to delete at least one of the desired products from the selection basket;

providing the user with the option to update at least one of the desired products from the selection basket;

selectively exchanging and updating inventory, raw material, purchase order, sales order and selection basket data with the datacenter, the inventory, raw material, purchase order, sales order and selection basket data being stored in the computer readable memory;

starting a manufacturer's production order and storing the manufacturer's production order in the product database stored in the computer readable memory;

editing the final product, said step of editing comprising the steps of:
  reviewing a list of production orders stored in the computer readable memory;
  selecting a production order for review;
  getting a new production job number and date, and assigning any remaining quantities of any line items produced;
  getting a location to print barcode labels; and
  printing barcode labels for the final product;

scanning the final product;

determining a customer's credit worthiness for the amount of a sales order;

determining a delivery schedule;

establishing routing and loading procedures for the product; and establishing shipping and receiving procedures.

2. The computerized method according to claim 1, wherein starting a manufacturer's production order further comprises the steps of:
  processing said production order into a final product; and
  confirming the final product.

3. The computerized method according to claim 1, wherein scanning the final product further comprises the steps of:
  scanning the final product's serial number, inventory location and slot; and
  adjusting reserve inventory, General Ledger and raw inventory.

4. The computerized method according to claim 1, wherein determining a customer's credit worthiness for the amount of a sales order further comprises the steps of:
  determining if the sales order has been released;
  determining if the customer's credit worthiness is acceptable;
  releasing the sales order for shipping; and
  communicating to the customer acceptance or reasons for decline of credit worthiness.

5. The computerized method according to claim 1, wherein determining a delivery schedule further comprises the steps of:
  displaying sales orders for delivery;
  obtaining a date and a truck for delivery; and
  updating sales order with the date and truck.

6. The computerized method according to claim 1, wherein establishing routing and loading procedures for the final product further comprises the steps of:
  getting stop numbers, arrival and departure times;
  selecting a list of dates and trucks with pending deliveries;
  selecting sales orders and delivery stops;
  selecting SKUs to load and scanning serial numbers and truck being loaded;
  selecting a correct stop for unloading the SKUs and scanning the serial number of the unloaded product.

7. The computerized method according to claim 1, wherein establishing shipping and receiving procedures further comprises the steps of:
  selecting a sales order with pending pickups;
  selecting SKUs to ship;
  scanning serial numbers of product being loaded and updating General Ledger items;
  getting the location of the inventory;
  selecting a bill of lading;
  scanning the serial numbers and inventory slots of the products unloaded; and
  updating applicable General Ledger entries.

8. The computerized method according to claim 1, wherein a built in time clock is provided, the computerized method further comprising the steps of:
  displaying a list of categories and their jobs;
  displaying a list of all employees;
  presenting a generic weekly schedule for a chosen employee;
  presenting exceptions regarding an employee;
  determining the total hours worked within the constraints of an employee's schedule and generating a manual payroll check;
  determining the total hours worked within the constraints of an employee's schedule and generating an automatic payroll check; and
  determining an employee's commissions within the constraints of the employee's schedule and generating a commissions check.

* * * * *